US012763929B2

(12) United States Patent
Yeomans et al.

(10) Patent No.: US 12,763,929 B2
(45) Date of Patent: Oct. 13, 2026

(54) KEY EXCHANGE PROTOCOL FOR QUANTUM NETWORK

(71) Applicant: ARQIT LIMITED, London (GB)

(72) Inventors: Andrew Yeomans, Hertfordshire (GB); Michael Murphy, Greater London (GB); Oliver Cohen, Hampshire (GB); Omar Iqbal, Hampshire (GB); James Brown, Oxfordshire (GB)

(73) Assignee: Arqit Limited, London (GB)

( * ) Notice: Subject to any disclaimer, the term of this patent is extended or adjusted under 35 U.S.C. 154(b) by 216 days.

(21) Appl. No.: 18/274,655

(22) PCT Filed: Jan. 28, 2022

(86) PCT No.: PCT/GB2022/050243

§ 371 (c)(1),
(2) Date: Jul. 27, 2023

(87) PCT Pub. No.: WO2022/162390

PCT Pub. Date: Aug. 4, 2022

(65) Prior Publication Data

US 2024/0313949 A1 Sep. 19, 2024

(30) Foreign Application Priority Data

Jan. 29, 2021 (GB) ...................................... 2101310
May 14, 2021 (GB) ...................................... 2106980

(51) Int. Cl.
*H04L 9/08* (2006.01)

(52) U.S. Cl.
CPC .......... *H04L 9/0819* (2013.01); *H04L 9/0855* (2013.01)

(58) Field of Classification Search
CPC ... H04L 9/0852; H04L 9/0858; H04L 9/0855; H04L 63/061; H04L 9/083; H04L 9/0822;
(Continued)

(56) References Cited

U.S. PATENT DOCUMENTS 5,764,765 A * 6/1998 Phoenix ................ H04L 9/0858 380/256
6,748,083 B2 * 6/2004 Hughes ................. H04L 9/0858 380/278

(Continued)

FOREIGN PATENT DOCUMENTS

CN 112019331 1/2020
CN 111385090 7/2020

(Continued)

OTHER PUBLICATIONS

Junyong Wang et al., "Modeling research of satellite-to-ground quantum key distribution constellations", Acta Asronautica, Pergamon Press, Elmsford, GB, vol. 180, Jan. 1, 2021, pp. 470-481, XP06471399, ISSN: 0094-5765, DOI: 10.1016/J. Actaastro.2020.12.039 [retrieved on Jan. 1, 2021], paragraph [0002]-paragraph [0003].

(Continued)

*Primary Examiner* — Sharif E Ullah
(74) *Attorney, Agent, or Firm* — Dentons US LLP

(57) ABSTRACT

A method for performing a key exchange between a first device, a second device, and an intermediary device, wherein the intermediary device: transmits to the first device a first secret symbol string over a first quantum channel and a first basis set over a first channel, transmits to the second device a second secret symbol string over a second quantum channel and a second basis set over a second channel, and generates a third symbol string by combining the first and second secret symbol strings and transmits data representative of the third symbol string to the second device, whereby the first and second devices perform a quantum key exchange and sifting based on the first and second secret symbol strings and first and second basis sets, and a fourth set of symbols is generated by the second device by com- (Continued)

bining the second secret symbols with the third symbol string.

14 Claims, 20 Drawing Sheets

(58) Field of Classification Search
CPC ....... H04L 9/3226; H04L 9/0891; H04L 9/14; H04L 9/0827; H04L 2209/24; H04L 9/08; H04L 9/0819; H04L 9/088; H04L 9/0844; H04L 9/0618; H04W 12/041; H04W 12/0431; H04W 12/0433; H04W 12/04; H04W 12/61; H04W 12/63; H04W 12/71; G06F 21/31; G06F 21/44; G06F 7/588; G06F 21/72; G06F 21/86
USPC ........ 713/171, 150, 163, 181; 726/2, 21, 36; 380/255, 264, 276
See application file for complete search history.

(56) References Cited

U.S. PATENT DOCUMENTS

| | | | | |
|---|---|---|---|---|
| 7,437,081 | B2 * | 10/2008 | Mitchell | H04B 10/70 398/154 |
| 8,761,401 | B2 * | 6/2014 | Sprunk | H04L 9/0844 380/278 |
| 8,782,774 | B1 * | 7/2014 | Pahl | H04L 9/0841 726/4 |
| 8,855,316 | B2 * | 10/2014 | Wiseman | H04L 9/0855 380/278 |
| 9,628,268 | B2 * | 4/2017 | Kiang | G06F 21/6218 |
| 9,960,465 | B2 * | 5/2018 | Dudley | H01M 50/204 |
| 10,057,058 | B2 * | 8/2018 | Murakami | H04L 9/0858 |
| 2005/0138352 | A1 * | 6/2005 | Gauvreau | H04L 9/3247 713/153 |
| 2007/0065154 | A1 * | 3/2007 | Luo | H04L 9/0852 398/141 |
| 2007/0076884 | A1 * | 4/2007 | Wellbrock | H04L 9/0855 380/263 |
| 2007/0195774 | A1 * | 8/2007 | Sherman | H04L 69/16 370/392 |
| 2011/0206204 | A1 * | 8/2011 | Sychev | H04J 14/06 380/256 |
| 2011/0213979 | A1 * | 9/2011 | Wiseman | H04L 9/0844 713/171 |
| 2014/0010234 | A1 * | 1/2014 | Patel | H04L 45/74 370/392 |
| 2014/0068765 | A1 * | 3/2014 | Choi | H04L 63/1416 726/23 |
| 2014/0133652 | A1 * | 5/2014 | Oshida | H04L 9/0897 380/255 |
| 2016/0241396 | A1 * | 8/2016 | Fu | H04L 9/0836 |
| 2016/0359626 | A1 * | 12/2016 | Fu | H04L 9/0858 |
| 2016/0366094 | A1 * | 12/2016 | Mason | H04L 61/5038 |
| 2017/0214525 | A1 * | 7/2017 | Zhao | H04W 12/0431 |
| 2017/0230173 | A1 * | 8/2017 | Choi | H04L 9/0861 |
| 2018/0176091 | A1 * | 6/2018 | Yoon | H04L 5/1446 |
| 2019/0036821 | A1 * | 1/2019 | Levy | G06F 12/0868 |
| 2019/0349392 | A1 * | 11/2019 | Wetterwald | H04L 43/0852 |
| 2020/0084222 | A1 * | 3/2020 | William | H04L 63/12 |

FOREIGN PATENT DOCUMENTS

| | | |
|---|---|---|
| EP | 1848142 | 10/2007 |
| GB | 2581528 | 8/2020 |
| GB | 2590064 | 6/2021 |
| WO | 2019128785 | 7/2019 |

OTHER PUBLICATIONS

Donghai Huang et al., "Quantum Key Distribution Over Double-Layer Quantum Satellite Networks", IEEE Access, IEEE, USA, vol. 8, Jan. 13, 2020, pp. 16087-16098, XP011768438, DOI: 10.1109/ACCSS.2020.296683 [retrieved on Jan. 24, 2020].

Jing Wang et al., "A Guide to Global Quantum Key Distribution Networks", Arxiv.Org, Cornell University Library, 201 Olin Library Cornell University Ithaca, NY 14853, Dec. 28, 2020, XP081847709, pp. 1-17.

Facultad De Informatica: "ISG QKD 017 NW architectures", ETSI Draft; QKD(20) 029025, European Telecommunications Standards Institute (ETSI), 650, Route Des Lucioles; F-06921 Sophia-Antipolis; France, vol. ISG QKD Quantum Key Distribution, No. 0.8, Dec. 13, 2020, pp. 1-48, XP014388658, Retrieved from the Internet: URL: ftp://docbox.et al.org/ISG/QKD(20) 029025_ISG_QKD_017_NW_architectures.zip QKD-017nwkArchv008.docx [retrieved on Dec. 13, 2020] paragraph [0004]-[0006].

S. Pirandola et al., "Advances in Quantum Cryptography", Arxiv.Org, Cornell University Library, 201 Olin Library Cornell University Ithaca, NY 14853, Jun. 4, 2019, XP081373072, paragraph [000I]-paragraph [0XII].

Miralem Mehic, et al., "Quantum Key Distribution: A Networking Perspective", ACM Computing Surveys, ACM, New York, NY, US, vol. 53, No. 5, Sep. 28, 2020, pp. 1-41, XP058666929, ISSN: 0360-0300, DOI: 10.1145/3402192, paragraph [0002]-paragraph [0006].

Yu-Ao Chen et al., "An integrated space-to-ground quantum communication network over 4,600 kilometres", Nature, vol. 589, No. 7841, Jan. 14, 2021, pp. 214-219, XP037335153, ISSN: 028-0836, DOI: 10.1038/S41586-020-03093-8, p. 1-p. 3.

Robert Bedington et al., "Progress in satellite quantum key distribution", NPJ Quantum Information, vol. 3, No. 1, Aug. 9, 2017, pp. 1-13, XP055725509, DOI: 10.1038/s41534-07-0031-5, p. 1-p. 4.

Yoshimichi Tanizawa, et al., "A Routing Method Designed for a Quantum Key Distribution Network," 2016 Eighth International Conference on Ubiquitous and Future Networks (ICUFN), Jul. 2016, Vienna, Austria, INSPEC accession No. 16227543.

Search Report GB Application No. 2106980.2 dated Jun. 27, 2022.

Search Report GB Application No. 2101310.7 dated Jun. 27, 2022.

International Search Report from PCT/GB2022/050243 dated Apr. 28, 2022.

Written Opinion ofthe ISA from PCT/GB2022/050243 dated Apr. 28, 2022.

Philip Chan et al., "Quantum Key Distribution," Arxiv.org Cornell University Library, 201 Olin Library Cornell University, Ithaca, NY 14853, Nov. 8, 2011, XP080540422.

"Quantum Key Distribution (QKD) Network Architectures," ETSI Draft Specification; QKD-017NWKARCHV004 European Telecommunications Standards Institute (ETSI), 650, Route Des Lucioles; F-06921 Sophia-Antipolis, France, No. V0.0.4, Jun. 3, 2020, pp. 1-43, XP014374038.

Facultad De Informatica; "ISG QKD 017 NW Architectures," ETSI Draft; QKD (20) 028D007 European Telecommunications Standards Institute (ETSI), 650, Route Des Lucioles; F-06921 Sophia-Antipolis; France, No. 0.0.7, Sep. 6, 2020, pp. 1-46, XP014378427.

Guerrini Stefano et al., "Secure Key Throughput of Intermittent Trusted-Relay QKD Protocols," 2018 IEEE Globecom Workshops (GC WKSHPS) IEEE, Dec 9, 2018, pp. 1-5, XP033519221.

William Stacey et al., "The Security of Quantum Key Distribution using a Simplified Trusted Relay," Arxiv.org Cornell University Library, 201 Olin Library Cornell University Ithaca, NY 14853, Aug. 19, 2014, XP081391156.

Examination Report of EP Application No. 22703960.9 dated Mar. 27, 2026.

* cited by examiner

KEY EXCHANGE PROTOCOL FOR QUANTUM NETWORK

This application is the National Stage filing under 35 U.S.C. 371 of International Application No. PCT/GB2022/050243, filed Jan. 28, 2022, claims the benefit of GB Application Nos. 2101310.7, filed Jan. 29, 2021 and 2106980.2, filed May 14, 2021, the contents of which are all hereby incorporated by reference herein in their entirety.

CLAIM OF PRIORITY AND INCORPORATION BY REFERENCE

The present application claims the benefit under of U.K. patent application No.: 2101310.7 entitled "QKD SWITCHING SYSTEM" and filed on 29 Jan. 2021, the disclosure of which is incorporated herein by reference in its entirety.

TECHNICAL FIELD

The present application relates to a system, apparatus and method for key exchange chaining between two or more devices connected together via one or more other devices.

BACKGROUND

Quantum key distribution (QKD) protocols are secure communication methods that implements a cryptographic protocol involving components of quantum mechanics of quantum channels for distributing cryptographic keys to parties. It enables at least two parties to produce a shared random secret key, cryptographic key or shared key/final shared key known only to them. The final shared key may be used for, without limitation, for example cryptographic operations by said at least two parties and/or secure communications between said parties using the final shared key to encrypt and decrypt said communication sessions/channel and/or messages therebetween.

In a quantum network, the endpoints communicate with each other using end-to-end quantum cryptography. This creates an unconditionally secure encrypted channel between two endpoints that ensures perfect secrecy and is resistant to attack by quantum computers. Efforts have been underway for many years to realise a large-scale quantum network. These take may take several forms including, without limitation, for example: 1) Terrestrial fibre networks, where the limit for point-to-point connections is around 100 km due to optical losses in the optical fibre for each quantum channel. Existing terrestrial networks use intermediate repeater nodes, or intermediary devices, to extend this distance but at the cost that the intermediate nodes (or intermediary devices) have to be trusted with knowledge about the final key; 2) Satellite networks, which operate at global scale but suffer from the same issue that the satellite needs to be trusted with information about the final shared key. Lower bitrates and physical availability also means that satellites are impractical for connecting large numbers of endpoints. These quantum networks so far number only a handful of endpoints, but typical classical networks consist of many thousands (if not millions) of endpoints. These networks often use a hub- and spoke topology, where a smaller number of regional hubs connect to larger number of endpoints. For quantum networks to become practical they need to flexibly support a hub-and-spoke topology at global scale, but without the downside of intermediate trusted nodes/devices.

There is a desire for a more improved and/or flexible key exchange methodology for securely sharing a final shared key between endpoint devices via one or more intermediary devices (or nodes) using any one or more key exchange protocols for securing the communication links between intermediary nodes/devices and endpoints, whilst delivering a certain level of trust (e.g. from fully trusted to trustless/untrusted) depending on the capabilities of the one or more intermediary devices/nodes/endpoint devices. There is also a desire for a key exchange methodology requiring a reduced level of trust (e.g. untrusted) in relation to the intermediate nodes/devices.

The embodiments described below are not limited to implementations which solve any or all of the disadvantages of the known approaches described above.

SUMMARY

This Summary is provided to introduce a selection of concepts in a simplified form that are further described below in the Detailed Description. This Summary is not intended to identify key features or essential features of the claimed subject matter, nor is it intended to be used to determine the scope of the claimed subject matter; variants and alternative features which facilitate the working of the invention and/or serve to achieve a substantially similar technical effect should be considered as falling into the scope of the invention disclosed herein.

The present disclosure provides method(s), apparatus and system(s) of key exchange chaining between a first device and a second device via one or more intermediary devices or a plurality of intermediary devices. The first device exchanges intermediate key information, such as, without limitation, for example a shared key, or an intermediate set of symbols and the like, with a first intermediary device that the first device is connected to over a first communication link, where the exchange of intermediate key information is based on a first key exchange protocol. The intermediary devices that connect the first device to the second device also exchange shared keys between themselves using one or more key exchange protocols depending on their capabilities or the level of trust. The first intermediary device securely sends the intermediate key information to the second device, where the shared keys of the intermediary devices are used to secure the intermediate key information transmission to the second device, where the second device retrieves the intermediate key information and performs a shared final key exchange with the first device based on the first key exchange protocol and the intermediate key information.

In a first aspect, the present disclosure provides a computer-implemented method of key exchange between a first endpoint device and a second endpoint device communicatively coupled over communication links via one or more intermediary devices, wherein the first endpoint device is coupled by a first communication link to a first of the one or more intermediary devices, and the second endpoint device and the one or more intermediary devices form a group of devices, wherein each of the one or more intermediary devices is communicatively coupled to at least one other of the one or more intermediary devices via at least one of the communication links and the second endpoint device is coupled to a last of the one or more intermediary devices in the group via a second communication link, the method comprising: exchanging intermediate key information between the first intermediary device and the first endpoint device based on a first key exchange protocol; and securely sending data representative of the exchanged intermediate key information from the first intermediary device to the second endpoint device via the intermediary device(s), the secure communications over the communication links of the group of devices based on shared keys exchanged using one or more key exchange protocols over the communication links of the group of devices; wherein the first and second endpoint devices use a further communication channel therebetween for processing and transforming said intermediate key information into the final shared key.

As an option, the computer-implemented method according to the first aspect, wherein there are N intermediary devices, N>0, and the first endpoint device, the N intermediary devices and the second endpoint device form a chain, line network or linear array topology with the first endpoint device being communicatively coupled to the second endpoint device via said N intermediary devices, wherein the first endpoint device is connected via a first communication link to the first of the N intermediary devices in the chain, and the second device is connected via a second communication link to an N-th intermediary device in the chain, each of the N intermediary devices coupled to an adjacent intermediary device via a further communication link.

As another option, the computer-implemented method according to the first aspect, wherein the first key exchange protocol is configured for detecting eavesdroppers during the exchange of the final shared key.

As a further option, the computer-implemented method according to the first aspect, wherein the shared keys for a device are shared keys between said device and any adjacent or neighboring device connected to said device by one of the communication links.

Optionally, the computer-implemented method according to the first aspect, wherein said each shared key is used for securing the communication of the intermediate key information from one device to next.

As an option, the computer-implemented method according to the first aspect, wherein each intermediary device sends its shared key to the second endpoint device, and only encrypts any incoming communications associated with the intermediate key information with its shared key before forwarding towards the second endpoint device via its nearest neighbour device, wherein the second endpoint device uses the shared keys to decrypt the encrypted intermediate key information.

As an option, the computer-implemented method according to the first aspect, wherein each intermediary device sends its shared key to the second endpoint device, and passes through any incoming communications associated with the intermediate key information via its nearest neighbour device, wherein the second endpoint device uses the shared keys to decrypt the encrypted intermediate key information.

As another option, the computer-implemented method according to the first aspect, wherein each intermediary device cryptographically combines a pair of shared keys exchanged with its nearest neighbour devices, and sends the combined pair of shared keys to the second endpoint device, and the first device cryptographically combining the intermediate key information with a shared key exchanged with an adjacent intermediary device prior to securely communicating the cryptographically combined intermediate key information to the second device, wherein the second endpoint device uses the received cryptographically combined shared keys to decrypt the encrypted or cryptographically combined intermediate key information.

As a further option, the computer-implemented method according to the first aspect, wherein cryptographically combining a pair of shared keys comprises performing a one time pad or exclusive OR operation on the pair of shared keys, and cryptographically combining the intermediate key information with a shared key comprises performing a one time pad or exclusive OR operation on the intermediate key information and the shared key.

As an option, the computer-implemented method according to the first aspect, wherein each intermediary device has exchanged a shared key with its nearest neighbour devices using a key exchange protocol, said each intermediary device apart from the first intermediary device having a first and second shared key sends its shared key to the second endpoint device, and only encrypts any incoming communications associated with the intermediate key information with its shared key before forwarding towards the second endpoint device via its nearest neighbour device, wherein the second endpoint device uses the shared keys to decrypt the encrypted intermediate key information.

Optionally, the computer-implemented method according to the first aspect, wherein the one or more key exchange protocols used between one or more of the devices in the group of devices for secure communications therebetween are selected from a group of key exchange protocols based on a desired or required trust level in relation to the one or more intermediary devices of the group of devices.

As an option, the computer-implemented method according to the first aspect, wherein when the level of trust is a trust level that is considered an untrusted level, then the one or more key exchange protocols selected include QKD protocols for use in sharing keys with untrusted parties.

As a further option, the computer-implemented method according to the first aspect, wherein the shared keys for an intermediary device of the one or more intermediary devices of the group of devices are shared keys between said intermediary device and one or more other intermediary devices of the intermediary devices that are adjacent or neighboring the intermediary device in the line network or linear array topology.

As a further option, the computer-implemented method according to the first aspect, wherein the first communication link includes a first quantum channel and a first classical channel and the first key exchange protocol is a quantum key distribution protocol.

As another option, the computer-implemented method according to the first aspect, wherein each of the second communication link and the communication links between the intermediary devices includes a quantum channel and a classical channel and the one or more key exchange protocols is a quantum key distribution protocol different to the first key exchange protocol.

Optionally, the computer-implemented method according to the first aspect, wherein the first key exchange protocol comprises a key exchange protocol selected from the group of: a QKD protocol from the Bennett and Brassard 1984, BB84, family of QKD protocols; the BB84 QKD protocol; modified versions of the BB84 protocol configured to ensure the QKD linking apparatus is unable to derive the resulting exchanged QKD keys between the endpoint devices; a modified or hybrid-BB84 based version of the BB84 protocol configured in which at least the first device transmits or receives a first set of random symbols over a first quantum channel with the first intermediary device, but withholds the basis set used by the first device for the transmitting or receiving the first set of random symbols over the first quantum channel, wherein the first intermediary device is unable to derive the validly transmitted or received first set of random symbols by the first device or an exchanged shared key with a second device based on the validly transmitted or received first set of random symbols by the first device; a modified or hybrid-BB84 based version of the BB84 protocol configured in which at least the first device transmits or receives a first set of random symbols over a first quantum channel with the first intermediary device, but withholds the basis set used by the first device for the transmitting or receiving of the first set of random symbols over the first quantum channel, and at least the second device transmits or receives a second set of random symbols over a second quantum channel with the first intermediary device, but withholds the basis set used by the second device for the transmitting or receiving of the second set of random symbols over the second quantum channel, wherein the intermediary device is unable to derive: the validly transmitted or received first set of random symbols by the first device, the validly transmitted or received second set of random symbols by the second device, and the resulting shared key exchanged between the first and second devices based on the validly transmitted or received first set of random symbols and the validly transmitted or received second set of random symbols; the Bennet 1992, B92, QKD protocol; the Six-State Protocol, SSP, QKD protocol; the Scarani Acin Ribordy Gisin 2004, SARG04, QKD protocol; the Doherty Parrilo Spedalieri 2002, DPS02, QKD protocol; the differential phase shift, DPS, QKD protocol; the Eckert 1991, E91, QKD protocol; the coherent one-way, COW, QKD protocol; the Khan Murphy Beige 2009, KMB09, QKD protocol; the Esteban Serna 2009, S09, QKD protocol; the Serna 2013, S13, QKD protocol; the A Abushgra K Elleithy 2015, AK15, QKD protocol; any one or more other entanglement based QKD protocols; any one or more future QKD protocols; and any other suitable QKD protocol for exchanging QKD keys between endpoint devices using quantum transmissions and classical transmissions.

As a further option, the computer-implemented method according to the first aspect, wherein exchanging intermediate key information between the first intermediary device and the first endpoint device based on the first key exchange protocol further comprising: the first key exchange protocol configured for performing at least the steps of: transmitting or receiving, by the first intermediary device, a first set of random symbols over a first quantum channel with the first endpoint device; transmitting, from the first intermediary device to the first endpoint device, the basis set used by the first intermediary device for transmitting or receiving the first set of random symbols over the first quantum channel; generating, by the first intermediary device, first endpoint device intermediate key information comprising data representative of a first intermediate set of symbols based on the validly transmitted or received first set of symbols using the transmitting or receiving basis set used by the first intermediary device when transmitting or receiving the first set of symbols over the first quantum channel; wherein the first endpoint device withholds the first transmitting or receiving basis set used by the first endpoint device for transmitting or receiving the first set of random symbols over the first quantum channel with the first intermediary device.

As another option, the computer-implemented method according to the first aspect, wherein the first key exchange protocol is a modified or hybrid-BB84 based version of the BB84 protocol.

As an option, the computer-implemented method according to the first aspect, wherein determining the final shared key, by the first and second endpoint devices, based on the exchanged first endpoint device intermediate key information securely sent via the one or more intermediary devices to the second endpoint device, further comprising: exchanging, between the first and second endpoint devices over a secure communication channel therebetween, the basis set used by the first endpoint device for transmitting or receiving the first set of random symbols; determining, by the second endpoint device using the basis set used by the first endpoint device for transmitting or receiving the first set of random symbols and the first endpoint device intermediate key information, a common set of symbols corresponding to at least a portion of the first set of random symbols transmitted or received by the first endpoint device; exchanging, by the first and second devices over the secure communication channel therebetween, a shared key based on the common set of symbols and the first set of random symbols transmitted or received by the first endpoint device.

As another option, the computer-implemented method according to the first aspect, wherein each of the communication links between the group of devices includes a quantum channel and a classical channel and the one or more key exchange protocols used to exchange the shared keys between the corresponding devices of the group of devices are one or more quantum key distribution protocols.

As another option, the computer-implemented method according to the first aspect, wherein each of the communication links between the one or more intermediary devices includes a quantum channel and a classical channel and the one or more key exchange protocols selected to be used to exchange the shared keys between the corresponding intermediary devices of the one or more intermediary devices are quantum key distribution protocols.

Optionally, the computer-implemented method according to the first aspect, wherein the one or more key exchange protocols comprises one or more key exchange protocols selected from the group of: a QKD protocol from the Bennett and Brassard 1984, BB84, family of QKD protocols; the BB84 QKD protocol; modified versions of the BB84 protocol configured to ensure the QKD linking apparatus is unable to derive the resulting exchanged QKD keys between the endpoint devices; a modified or hybrid-BB84 based version of the BB84 protocol configured in which at least the first device transmits or receives a first set of random symbols over a first quantum channel with the first intermediary device, but withholds the basis set used by the first device for the transmitting or receiving the first set of random symbols over the first quantum channel, wherein the first intermediary device is unable to derive the validly transmitted or received first set of random symbols by the first device or an exchanged shared key with a second device based on the validly transmitted or received first set of random symbols by the first device; a modified or hybrid-BB84 based of the BB84 protocol configured in which at least the first device transmits or receives a first set of random symbols over a first quantum channel with the first intermediary device, but withholds the basis set used by the first device for the transmitting or receiving of the first set of random symbols over the first quantum channel, and at least the second device transmits or receives a second set of random symbols over a second quantum channel with the first intermediary device, but withholds the basis set used by the second device for the transmitting or receiving of the second set of random symbols over the second quantum channel, wherein the intermediary device is unable to derive: the validly transmitted or received first set of random symbols by the first device, the validly transmitted or received second set of random symbols by the second device, and the resulting shared key exchanged between the first and second devices based on the validly transmitted or received first set of random symbols and the validly transmitted or received second set of random symbols; the Bennet 1992, B92, QKD protocol; the Six-State Protocol, SSP, QKD protocol; the Scarani Acin Ribordy Gisin 2004, SARG04, QKD protocol; the Doherty Parrilo Spedalieri 2002, DPS02, QKD protocol; the differential phase shift, DPS, QKD protocol; the Eckert 1991, E91, QKD protocol; the coherent one-way, COW, QKD protocol; the Khan Murphy Beige 2009, KMB09, QKD protocol; the Esteban Serna 2009, S09, QKD protocol; the Serna 2013, S13, QKD protocol; the A Abushgra K Elleithy 2015, AK15, QKD protocol; any one or more other entanglement based QKD protocols; any one or more future QKD protocols; and any other suitable QKD protocol for exchanging QKD keys between endpoint devices using quantum transmissions and classical transmissions.

As a further option, the computer-implemented method according to the first aspect, wherein the one or more key QKD exchange protocols used between one or more of the devices in the group of devices for secure communications therebetween are selected from a group of key exchange protocols based on a desired or required trust level in relation to the one or more intermediary devices of the group of devices.

As another option, the computer-implemented method according to the first aspect, wherein when the level of trust is a trust level that is considered an untrusted level, then the one or more key exchange protocols selected include QKD protocols for use in sharing keys with untrusted parties.

As an option, the computer-implemented method according to the first aspect, wherein the first key exchange protocol and the one or more key exchange protocols are entanglement based QKD protocols, wherein: exchanging intermediate key information between the first intermediary device and the first endpoint device based on a first key exchange protocol further comprising distributing one or more Einstein-Podolsky-Rosen, EPR, pair(s) between the first intermediary device and the first endpoint device; distributing one or more EPR pair(s) between each of the one or more intermediary devices; distributing one or more EPR pair(s) between a last of the one or more intermediary devices and the second device; securely sending data representative of the exchanged intermediate key information further comprising: performing, at the first intermediary device, a Bell State Measurement, BSM, on corresponding EPR pairs held by the first intermediary device; performing, at each other intermediary device, a Bell State Measurement, BSM, on corresponding EPR pairs held by each other intermediary device; and sending the BSM results from each of the intermediary devices to both the first and second endpoint devices; wherein the first and second endpoint devices process the BSM results and share EPR pairs for generating the final shared key.

As another option, the computer-implemented method according to the first aspect, wherein: each of the devices in the group of devices is connected to each of its nearest neighbour devices via a quantum channel, wherein each quantum channel is unidirectional depending on the selected one or more key exchange protocols used between said each device and its nearest neighbour devices; the first and the second endpoint devices have a classically-secured classical channel therebetween; each of the N intermediary devices have a classical channels with each of their nearest neighbour intermediary devices, the method further comprising: said exchanging first intermediate key information using the first key exchange protocol further comprising: transmitting or receiving, by the first intermediary device, a first set of random symbols over a first quantum channel with the first endpoint device; transmitting, from the first intermediary device to the first endpoint device, the basis set used by the first intermediary device for transmitting or receiving the first set of random symbols over the first quantum channel; generating, by the first intermediary device, first intermediate key information comprising data representative of a first intermediate set of symbols based on the validly transmitted or received first set of symbols using the transmitting or receiving basis set used by the first intermediary device when transmitting or receiving the first set of symbols over the first quantum channel; wherein the first endpoint device withholds the first transmitting or receiving basis set used by the first endpoint device for transmitting or receiving the first set of random symbols over the first quantum channel with the first intermediary device; said securely sending data representative of the exchanged first intermediate key information from the first intermediary device to the second endpoint device further comprising: encrypting the first intermediate key information with a shared key of a neighbouring device of the group of devices; sending the encrypted first endpoint device intermediate key information to the second endpoint device via said neighbouring device(s) over said communication link therebetween, wherein any remaining intermediary devices securely send the first intermediate key information to said second endpoint device over said communication links therebetween; wherein said second endpoint device receives the encrypted first intermediate key information and decrypts said encrypted first intermediate key information using a shared key exchanged with one of the intermediary devices to retrieve said first intermediate set of symbols determined by the first intermediary device; said determining of the final shared key, by the first and second endpoint devices further comprising: exchanging, between the first and second endpoint devices over a secure communication channel therebetween, the transmitting or receiving basis set used by the first endpoint device for transmitting or receiving the first set of random symbols; determining, by the second endpoint device using the transmitting or receiving basis set used by the first endpoint device for transmitting or receiving the first set of random symbols and the first intermediate set of symbols, a second set of symbols corresponding to at least a portion of the first set of random symbols transmitted or received by the first endpoint device; and exchanging, by the first and second devices over the classically-secured communication channel therebetween, a shared key based processing and transforming the first set of random symbols and second set of symbols.

Optionally, the computer-implemented method according to the first aspect, wherein the first intermediate key information further comprises data representative from the group of: said transmitting or receiving basis set used by the first intermediary device when transmitting or receiving said first set of random symbols over the first quantum channel with the first endpoint device; and said first set of random symbols transmitted or received by the first intermediary device when transmitting or receiving said first set of random symbols with the first endpoint device.

As a further option, the computer-implemented method according to the first aspect, wherein said exchanging, by the first endpoint device and second endpoint device over a secure communication channel therebetween, a shared key further comprising performing final key information reconciliation and privacy amplification on the second set of symbols determined by the second endpoint device and the first set of symbols transmitted or received by the first endpoint device resulting in a final shared symmetric key.

As another option, the computer-implemented method according to the first aspect, wherein the one or more key exchange protocols used for secure communications between the second endpoint device and the first intermediary device is the BB84 key exchange protocol.

As an option, the computer-implemented method according to the first aspect, wherein each of the communication links between the group of devices includes a quantum channel and a classical channel and wherein the BB84 key exchange protocol is used to exchange shared keys between the corresponding devices of the group of devices and their neighbour devices of the group of devices.

Optionally, the computer-implemented method according to the first aspect, wherein the first key exchange protocol and the one or more key exchange protocols are classical or post-quantum key exchange protocols.

As an option, the computer-implemented method according to the first aspect, wherein: exchanging intermediate key information between the first intermediary device and the first endpoint device based on the first key exchange protocol, wherein the intermediate key information is a first shared key between the first intermediary device and the first endpoint device; for each of the intermediary devices and the second endpoint device exchanging a shared key with each of the nearest neighbouring devices, wherein each of the intermediary devices have a pair of shared keys and the second endpoint device has a shared key exchanged with the intermediary device it is connected to, and the first intermediary device has a second shared key with another intermediary device it is connected to; securely sending data representative of the exchanged intermediate key information from the first intermediary device to the second endpoint device via the intermediary device(s) based on: encrypting, by the intermediary device, the intermediate key information with the second shared key of the intermediary device, and sending to the second endpoint device; for each other intermediary device, cryptographically combining their pairs of shared keys and sending to the second endpoint device; wherein the second endpoint device uses its shared key and the received cryptographically combined pairs of shared keys from the intermediary devices to decrypt the encrypted intermediate key information, the first and second endpoint devices use the further communication channel to share the knowledge that the first shared key has been received and decrypted by the second endpoint device, said first shared key comprising the final shared key.

As an option, the computer-implemented method according to the first aspect, wherein the first key exchange protocol or the one or more key exchange protocols comprises a classical or post-quantum key exchange protocol from the group of: classical symmetric key exchange protocols; Rivest/Shamir/Adelman (RSA) key exchange protocol; Diffie-Hellman key exchange protocol; Finite Field Cryptographic key exchange protocols; Digital Signature Algorithm (DSA) key exchange protocol; Elliptic Curve (EC) cryptographic key exchange protocol; ECDSA key exchange protocol and EC-DH (ECDH) key exchange protocol; Elliptic Curve Diffie Hellman ephemeral-Rivest/Shamir/Adelman (ECDHE-RSA) key exchange protocol; ECDHE-ECDSA key exchange protocols; Secure Hash Algorithm (SHA)-2 (384 bit); SHA-3; key exchange protocols based on, without limitation, for example Advanced Encryption Standard (AES) (256-bit) based protocols; Galois Counter Mode based protocols; Transport Layer Security (TLS), https, SSL, SSH based protocols; any one or more other classical key exchange protocols; any one or more future classical key exchange protocols; any other suitable classical key exchange protocol for exchanging a shared key between endpoint devices or intermediary devices and the like using classical transmissions; lattice-based cryptographic key exchange protocol(s); Ring-Learning With Errors (LWE)-based key exchange protocol(s); Nth degree-truncated polynomial ring units (NTRU)-based key exchange protocol(s); Stehle-Steinfeld variant of NTRU-based key exchange protocol(s); Bimodal Lattice Signature Scheme (BLISS)-based key exchange protocol(s); multi-variate-based cryptographic key exchange protocol(s); Rainbow or Unbalanced Oil and Vinegar (UOV)-based key exchange protocol(s); Hash-based cryptographic key exchange protocol(s); Lamport-based cryptographic key exchange protocol(s); Merkle-based cryptographic key exchange protocol(s); Code-based cryptographic key exchange protocol(s); McEliece-based cryptographic key exchange protocol(s); Niederreiter-based key exchange protocol(s), Courtois, Finiasz and Sendrier Signature-based key exchange protocol(s); random linear code encryption scheme (RLCE)-based key exchange protocol(s); Supersingular elliptic curve isogeny-based cryptographic key exchange protocol(s); symmetric key quantum resistance-based cryptographic key exchange protocol(s); any one or more other post-quantum key exchange protocols; any one or more future post-quantum key exchange protocols; and any other suitable post-quantum key exchange protocol for exchanging a shared key between endpoint devices or intermediary devices and the like using classical transmissions; any other suitable classical or post-quantum protocol for exchanging keys between endpoint devices and/or intermediary devices using classical transmissions.

As another option, the computer-implemented method according to the first aspect, wherein each classical communication channel is based on one or more types of communication channels from the group of: optical communication channel; free-space optical communication channel; wireless communication channel; wired communication channel; radio communication channel; microwave communication channel; satellite communication channel; terrestrial communication channel; optical fibre communication channel; optical laser communication channel; any other type of one or more optical, wireless and/or wired communication channel(s) for transmitting data between devices; and two or more optical, wireless and/or wired communication channel(s) that form a composite communication channel for transmitting data between devices.

As another option, the computer-implemented method according to the first aspect, wherein each quantum communication channel is based on one or more types of quantum communication channels from the group of: optical quantum communications; free-space optical quantum communications; optical fibre quantum communications; optical laser quantum communications; quantum entanglement communications; any other type of quantum communications for transmitting data over a quantum communication channel between devices.

Optionally, the computer-implemented method according to the first aspect, wherein one or more of the intermediary devices is a satellite apparatus, one or more terrestrial intermediary devices are satellite ground stations of hubs, and the first and second endpoint devices are connected via a terrestrial network to said satellite ground stations or hubs, wherein the first quantum communication channel between the first endpoint device and the first terrestrial intermediary device is a fibre optical quantum communication channel, the second quantum communication channel between the second endpoint device and the last terrestrial intermediary device is a fibre optical quantum communication channel, and the classical communication channel between the first and second endpoint devices is a non-quantum communications channel.

As an option, the computer-implemented method according to the first aspect, wherein one or more of the intermediary devices is a satellite and the first endpoint device and second endpoint device are satellites, wherein the first quantum communication channel between the first endpoint device and the first intermediary device is a free-space optical quantum communication channel, the second quantum communication channel between the second endpoint device and the last intermediary device is a free-space optical quantum communication channel, and the classical communication channel between the first and second endpoint devices is a non-quantum communications channel.

As another option, the computer-implemented method according to the first aspect, wherein the intermediary devices are satellites forming a satellite mesh network, the first endpoint device and second endpoint device are satellites, wherein the first quantum communication channel between the first endpoint device and the first intermediary device is a free-space optical quantum communication channel, the second quantum communication channel between the second endpoint device and the last intermediary device is a free-space optical quantum communication channel, and the classical communication channel between the first and second endpoint devices is a non-quantum communications channel.

As a further option, the computer-implemented method according to the first aspect, wherein one or more of the intermediary devices is a terrestrial communication apparatus, the first device and second endpoint device are terrestrial endpoint devices, wherein the first quantum communication channel between the first endpoint device and the first intermediary device is a fibre optic quantum communication channel, the second quantum communication channel is between the second endpoint device and the second intermediary device is a fibre optic quantum communication channel, and the classical communication channel between the first and second endpoint devices is a non-quantum communications channel or classical terrestrial communications channel.

Optionally, the computer-implemented method according to the first aspect, wherein the classical communications channels are encrypted communication channels.

As a further option, the computer-implemented method according to the first aspect, further comprising encrypting transmission data or messages prior to transmitting said data or messages to: the first endpoint device over the first classical communication channel; or the second endpoint device over the second classical communication channel.

As another option, the computer-implemented method according to the first aspect, wherein one or more authentication protocols are used by one or more of the intermediary devices and the first or second endpoint devices for authenticating the intermediary device(s), first or second endpoint devices prior to communicating over the classical or quantum communications channels.

As a further option, the computer-implemented method according to the first aspect, further comprising authenticating the first and second endpoint device prior to transmitting data to the first and second endpoint device over the classical communication channels, respectively.

In a second aspect, the present disclosure provides a computer-implemented method of key exchange between a first endpoint device and a second endpoint device communicatively coupled over communication links via one or more intermediary devices, wherein the first endpoint device is coupled by a first communication link to a first of the one or more intermediary devices, and the second endpoint device and the one or more intermediary devices form a group of devices, wherein each of the one or more intermediary devices is communicatively coupled to at least one other of the one or more intermediary devices via at least one of the communication links and the second endpoint device is coupled to a last of the one or more intermediary devices in the group via a second communication link, the method comprising: exchanging intermediate key information between the first intermediary device and the first endpoint device based on a first key exchange protocol, wherein the first key exchange protocol is a QKD protocol configured for exchanging the intermediate key information in which the first endpoint device withholds key exchange information from the first intermediary device; and securely sending data representative of the exchanged intermediate key information from the first intermediary device to the second endpoint device via the intermediary device(s), the secure communications over the communication links of the group of devices based on shared keys exchanged using one or more key exchange protocols over the communication links of the group of devices; wherein the first and second endpoint devices use a further communication channel therebetween for exchanging said withheld key exchange information and processing and transforming said intermediate key information with said key exchange information into the final shared key.

As an option, the computer-implemented method according to the second aspect, wherein: each of the devices in the group of devices is connected to each of its nearest neighbour devices via a quantum channel, wherein each quantum channel is unidirectional depending on the selected one or more key exchange protocols used between said each device and its nearest neighbour devices; the first and the second endpoint devices have a classically-secured classical channel therebetween; each of the N intermediary devices have a classical channels with each of their nearest neighbour intermediary devices, the method further comprising: said exchanging first intermediate key information using the first key exchange protocol further comprising: transmitting or receiving, by the first intermediary device, a first set of random symbols over a first quantum channel with the first endpoint device; transmitting, from the first intermediary device to the first endpoint device, the basis set used by the first intermediary device for transmitting or receiving the first set of random symbols over the first quantum channel; generating, by the first intermediary device, first intermediate key information comprising data representative of a first intermediate set of symbols based on the validly transmitted or received first set of symbols using the transmitting or receiving basis set used by the first intermediary device when transmitting or receiving the first set of symbols over the first quantum channel; wherein the first endpoint device withholds the first transmitting or receiving basis set used by the first endpoint device for transmitting or receiving the first set of random symbols over the first quantum channel with the first intermediary device; said securely sending data representative of the exchanged first intermediate key information from the first intermediary device to the second endpoint device further comprising: encrypting the first intermediate key information with a shared key of a neighbouring device of the group of devices; sending the encrypted first endpoint device intermediate key information to the second endpoint device via said neighbouring device(s) over said communication link therebetween, wherein any remaining intermediary devices securely send the first intermediate key information to said second endpoint device over said communication links therebetween; wherein said second endpoint device receives the encrypted first intermediate key information and decrypts said encrypted first intermediate key information using a shared key exchanged with one of the intermediary devices to retrieve said first intermediate set of symbols determined by the first intermediary device; said determining of the final shared key, by the first and second endpoint devices further comprising: exchanging, between the first and second endpoint devices over a secure communication channel therebetween, the transmitting or receiving basis set used by the first endpoint device for transmitting or receiving the first set of random symbols; determining, by the second endpoint device using the transmitting or receiving basis set used by the first endpoint device for transmitting or receiving the first set of random symbols and the first intermediate set of symbols, a second set of symbols corresponding to at least a portion of the first set of random symbols transmitted or received by the first endpoint device; and exchanging, by the first and second devices over the classically-secured communication channel therebetween, a shared key based processing and transforming the first set of random symbols and second set of symbols.

As another option, the computer-implemented method according to the second aspect, wherein the first intermediate key information further comprises data representative from the group of: said transmitting or receiving basis set used by the first intermediary device when transmitting or receiving said first set of random symbols over the first quantum channel with the first endpoint device; and said first set of random symbols transmitted or received by the first intermediary device when transmitting or receiving said first set of random symbols with the first endpoint device.

As a further option, the computer-implemented method according to the second aspect, wherein said exchanging, by the first endpoint device and second endpoint device over a secure communication channel therebetween, a shared key further comprising performing final key information reconciliation and privacy amplification on the second set of symbols determined by the second endpoint device and the first set of symbols transmitted or received by the first endpoint device resulting in a final shared symmetric key.

As a further option, the computer-implemented method according to the second aspect, wherein the one or more key exchange protocols used for secure communications between the second endpoint device and the first intermediary device is the BB84 key exchange protocol.

Optionally, the computer-implemented method according to the second aspect, wherein each of the communication links between the group of devices includes a quantum channel and a classical channel and wherein the BB84 key exchange protocol is used to exchange shared keys between the corresponding devices of the group of devices and their neighbour devices of the group of devices.

In a third aspect, the present disclosure provides an intermediary apparatus comprising a processor unit, a memory unit, and a communication interface, the processor unit connected to the memory unit and the communication interface, wherein the processor unit, memory unit and communication interface are adapted to implement the corresponding intermediary device steps of the computer-implemented method according to any of the first and/or second aspects.

In a fourth aspect, the present disclosure provides an apparatus comprising a processor unit, a memory unit, and a communication interface, the processor unit connected to the memory unit and the communication interface, wherein the processor unit, memory unit and communication interface are adapted to implement the corresponding steps of the computer-implemented method in relation to the first endpoint device or second endpoint device according to any of the first, second and/or third aspects.

In a fifth aspect, the present disclosure provides a system comprising: one or more an intermediary devices configured according to any of the first, second and/or third aspects; an first endpoint device comprising an apparatus according configured according to any of the first, second and/or fourth aspects; and a second endpoint device comprising an apparatus configured according to any of the first, second and/or fourth aspects; wherein the one or more intermediary devices, first endpoint device and second endpoint device are configured to communicate with each other for establishing a shared a cryptographic key between the first and second endpoint devices.

In a sixth aspect, the present disclosure provides a system comprising an intermediary device, a first device and a second device, wherein the intermediary device, first device and second device are configured to implement the corresponding steps of the computer-implemented method according to according to any of the first, second, third, fourth and/or fifth aspects.

As a further option, system according to the fifth or sixth aspects, wherein the system is a satellite quantum key distribution system comprising a plurality of satellites, each satellite including the functionality of an intermediary device, each satellite in communication with one or more ground receiving stations, and each ground receiving station including the functionality of the first and/or second endpoint devices.

In a seventh aspect, the present disclosure provides a computer-readable medium comprising computer code or instructions stored thereon, which when executed on a processor, causes the processor to perform the corresponding steps of the computer implemented method in relation to the intermediary device according to any of the first, second, third, fourth and/or fifth aspects.

In an eighth aspect, the present disclosure provides a computer-readable medium comprising computer code or instructions stored thereon, which when executed on a processor, causes the processor to perform the corresponding steps of the computer implemented method in relation to the first device according to any of the first, second, third, fourth and/or fifth aspects.

In a ninth aspect, the present disclosure provides a computer-readable medium comprising computer code or instructions stored thereon, which when executed on a processor, causes the processor to perform the corresponding steps of the computer implemented method in relation to the second device according to any of the first, second, third, fourth and/or fifth aspects.

In a tenth aspect, the present disclosure provides a computer-readable medium comprising computer code or instructions stored thereon, which when executed on one or more processor(s), causes the one or more processor(s) to perform the computer implemented method according to any of the first, second, third, and/or fourth aspects.

In an eleventh aspect, the present disclosure provides a key exchange system as herein described with reference to the accompanying drawings.

In a twelfth aspect, the present disclosure provides a key exchange process as herein described with reference to the accompanying drawings.

In a thirteenth aspect, the present disclosure provides a method as herein described with reference to the accompanying drawings.

In a fourteenth aspect, the present disclosure provides a n intermediary device as herein described with reference to the accompanying drawings.

In a fifteenth aspect, the present disclosure provides a n endpoint device as herein described with reference to the accompanying drawings.

In a sixteenth aspect, the present disclosure provides a computer program product as herein described with reference to the accompanying drawings.

In a seventeenth aspect, the present disclosure provides a key exchange chaining system comprising a plurality of intermediary devices, a first and second endpoint device connected thereto, wherein the first and second endpoint perform a key exchange chaining process as herein described with reference to the accompanying drawings for exchanging a final shared key therebetween.

In an eighteenth aspect, the present disclosure provides a key exchange chaining process for use in a key exchange chaining system as herein described with reference to the accompanying drawings.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

This application acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, byway of example, with reference to the following drawings, in which.

DETAILED DESCRIPTION

Figure 1A:
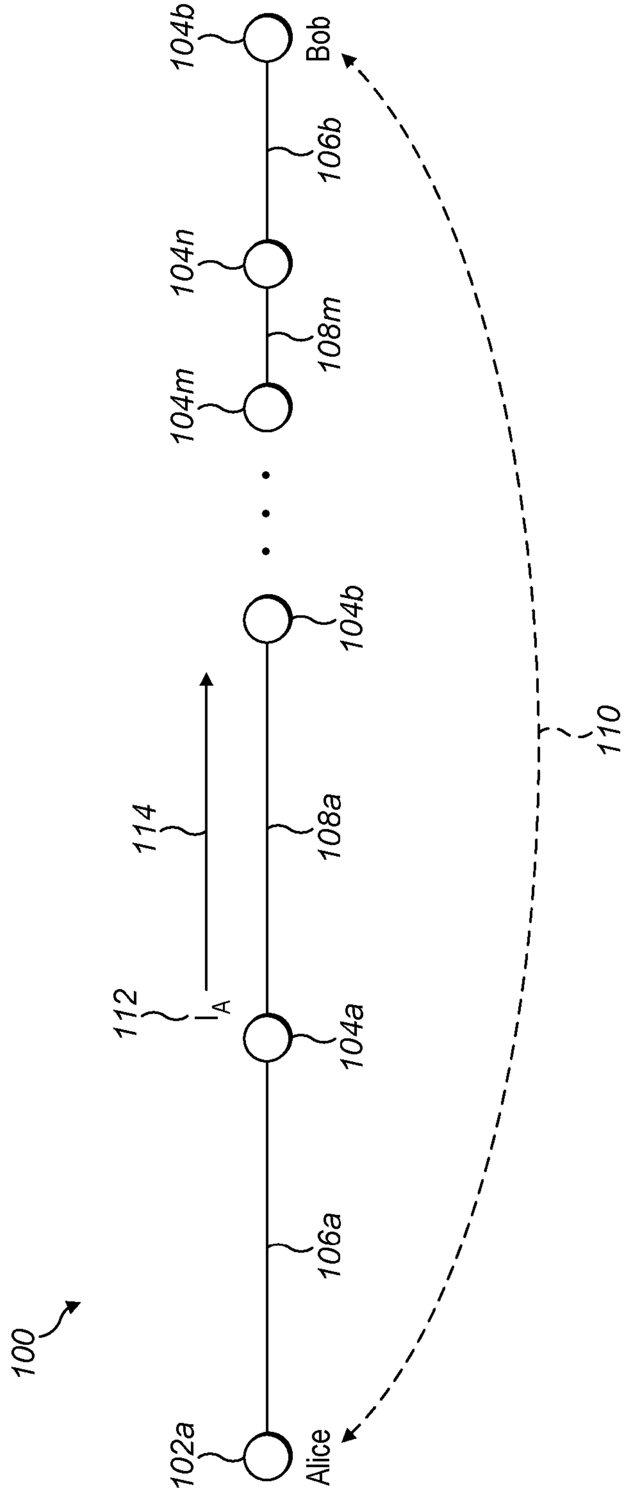
FIG. 1*a* is a schematic diagram illustrating an example key exchange system for implementing an example key exchange between first and second devices according to the invention.

Embodiments of the present invention are described below byway of example only. These examples represent the best mode of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

The present disclosure provides method(s), apparatus and system(s) of performing key exchange chaining between two or more devices connected together via one or more other devices. The key exchange is performed between a first device and a second device via one or more intermediary device(s) connected together via communication links in which a first key exchange protocol is used over a first communication link connecting a first of the intermediary device(s) with the first device, and second key exchange protocol from a set of key exchange protocols is used on a second communication link connecting the second device with a second of the intermediary device(s), where one or more key exchange protocols from the set of key exchange protocols may be used on communication links connecting any other intermediary device(s) between said first and second intermediary devices. The second device and said second intermediary device connected thereto exchange a shared key therebetween using said second key exchange protocol, and any of the first, second and other intermediary devices exchange shared keys therebetween using said one or more key exchange protocols. Thus, each of the intermediary devices have pairs of shared keys from adjacent or neighbour devices. The first device exchanges a final shared key with the second device based on: the first device exchanging first intermediate key information or a first intermediate shared key with the intermediary device connected via a communication link to said first device using the first key exchange protocol; the intermediary device securely forwarding the first intermediate key information (e.g. first intermediate shared key) to the second device connected to said at least one of the intermediary devices, where said second intermediary device uses the second key exchange protocol to securely provide said first intermediate key information to the second device. The first and second devices may use a further communication channel therebetween for processing and transforming said first intermediate key information for determining a final shared key between the first and second devices based on using, at least in part, the first key exchange protocol therebetween and the first intermediate key information. The first intermediate key information (or first intermediate shared key) may include a first intermediate set of symbols (e.g. n bit(s) per symbol are represented by $M=2^n$ different symbols, where $n \geq 1$) that are exchanged between the first device and the first intermediary device.

The first and second intermediary device may be the same intermediary device, when there is one intermediary device between the first and second devices. The first and second intermediary devices may be different intermediary devices. The intermediary devices may use one or more key exchange protocols from the set of key exchange protocols for exchanging a shared key with any adjacent neighbouring intermediary device. The first and second key exchange protocols may be different key exchange protocols. The first and second key exchange protocols may be based on the same key exchange protocol.

Further modifications and/or additions to the key exchange between the first and second devices may include, without limitation, for example the first device may be a first endpoint device and the second device may be a second endpoint device, where the key exchange is between the first endpoint device and the second endpoint device, which are communicatively coupled over communication links via N intermediary devices, $N>0$, where N is an integer. The first endpoint device is coupled by a first communication link to a first of the N intermediary devices. The second endpoint device and the N intermediary devices form a group of devices, where each of the N intermediary devices is communicatively coupled to at least one other of the N intermediary devices via at least one of the communication links. The second endpoint device is coupled to at least one of the N intermediary devices via a second communication link. The key exchange between the first endpoint device and the second endpoint device may include the first endpoint device exchanging first intermediate key information between the first intermediary device and the first endpoint device based on a first key exchange protocol. Once said first intermediate key information has been exchanged, the first intermediary device securely sends data representative of the exchanged first intermediate key information via the group of devices to the second endpoint device, e.g. from the first intermediary device to the second endpoint device via any one or more intermediary devices connected therebetween. The secure communication of the first intermediate key information over the communication links of the group of devices based on shared keys exchanged using one or more key exchange protocols of a set of key exchange protocols over the communication links of the group of devices. Once the second endpoint device has securely received the first intermediate key information from the first intermediary device, the first and second endpoint devices use a further communication channel therebetween for processing and transforming said first intermediate key information into final shared key. The first and second endpoint devices may use the first intermediate key information, at least in part, with the portion of the first key exchange protocol that enables a final shared key to be agreed between the first and second endpoint devices based on the first intermediate key information.

The first endpoint device, the N intermediary device(s) (e.g. $N>0$) and the second endpoint device may form a string or chain of devices, where each device in the string or chain of devices are connected to at least one adjacent device via a communication link of the communication links, where the first endpoint device and second endpoint device are communicatively coupled together via the N intermediary devices. The first endpoint device being connected by a first communication link to a first intermediary device of the string or chain of devices and the second endpoint device being connected by a second communication link to an N-th intermediary device. As an example, when N>1, then the first intermediary device and the N-th intermediary devices are different in which the first device is connected via a first communication link to a first of the N intermediary devices, where each of the N intermediary devices are connected via a communication link to at least one adjacent or neighbouring intermediary device, with the N-th intermediary device connected via a second communication link to the second device. In another example, when N=1, then the first and N-th intermediary devices are one and the same intermediary device in which the first device is connected via a first communication link to said intermediary device, and the second device is connected via a second communication link to said intermediary device.

The string or chain of devices including the first, second, and N intermediary devices may form a line network or linear array topology with the first endpoint device being communicatively coupled to the second endpoint device via said N intermediary devices. The string or chain of devices may be part of a communication or mesh network where one or more of the N intermediary devices may be connected via other communication links to other devices and/or intermediary devices in the communication or mesh network. That is, the string or chain of devices may simply be a connected portion or subnetwork (or linear subnetwork) of a larger communication network, where the connected portion or subnetwork containing the string or chain of device may be based on a linear array, linear network topology and the like.

The first and second key exchange protocols may be selected from the set of key exchange protocols. The set of key exchange protocols may include, without limitation, for example a plurality of classical key exchange protocols; a plurality of post-quantum resistant key exchange protocols; a plurality of quantum key exchange protocols; one or more classical key exchange protocols, one or more post-quantum resistant key exchange protocols, and/or one or more quantum key exchange/distribution protocols; any mixture of key exchange protocols from the families of classical, post-quantum resistant and/or quantum key exchange protocols and the like; and/or any other type of key exchange protocol for use in sharing and/or exchanging shared keys between the first device, second device, and one or more intermediary device(s); combinations thereof; modifications thereto; and/or as herein described; and/or as the application demands.

Examples of classical key exchange protocols may include, without limitation, classical key exchange protocols from the group of: Rivest/Shamir/Adelman (RSA) key exchange protocol; Diffie-Hellman key exchange protocol; Finite Field Cryptographic key exchange protocols; Digital Signature Algorithm (DSA) key exchange protocol; Elliptic Curve (EC) cryptographic key exchange protocol; ECDSA key exchange protocol and EC-DH (ECDH) key exchange protocol; Elliptic Curve Diffie Hellman ephemeral-Rivest/Shamir/Adelman (ECDHE-RSA) key exchange protocol; ECDHE-ECDSA key exchange protocols; key exchange protocols based on, without limitation, for example Secure Hash Algorithm (SHA)-2 (384 bit) and SHA-3; key exchange protocols based on, without limitation, for example Advanced Encryption Standard (AES) (256-bit) and/or Galois Counter Mode and the like; key exchange protocols such as, without limitation, for example Transport Layer Security (TLS), https, SSL, SSH; TLS using, without limitation, for example any one or more of ECDHE-RSA, AES (128-bit) GCM and SHA256; TLS using, without limitation, for example ECDHE-RSA with AES (256-bit) GCM and SHA (384-bit); any one or more other classical key exchange protocols; any one or more future classical key exchange protocols; and any other suitable classical key exchange protocol for exchanging a shared key between endpoint devices or intermediary devices and the like using classical transmissions; combinations thereof; modifications thereto; as herein described, and/or as the application demands.

Examples of post-quantum or quantum-resistant key exchange protocols may include, without limitation, one or more from the group of: lattice-based cryptographic key exchange protocol(s) including, without limitation, for example Ring-Learning With Errors (LWE)-based key exchange protocol(s), Nth degree-truncated polynomial ring units (NTRU)-based key exchange protocol(s), Stehle-Steinfeld variant of NTRU-based key exchange protocol(s), Bimodal Lattice Signature Scheme (BLISS)-based key exchange protocol(s); multivariate-based cryptographic key exchange protocol(s) such as, without limitation, for example Rainbow or Unbalanced Oil and Vinegar (UOV)-based key exchange protocol(s); Hash-based cryptographic key exchange protocol(s) such as, without limitation, for example Lamport-based cryptographic key exchange protocol(s), Merkle-based cryptographic key exchange protocol(s), XMSS and SPHINC; Code-based cryptographic key exchange protocol(s) such as, without limitation, for example McEliece-based cryptographic key exchange protocol(s), Niederreiter-based key exchange protocol(s), Courtois, Finiasz and Sendrier Signature-based key exchange protocol(s), random linear code encryption scheme (RLCE)-based key exchange protocol(s); Supersingular elliptic curve isogeny-based cryptographic key exchange protocol(s); symmetric key quantum resistance-based cryptographic key exchange protocol(s); any one or more other post-quantum key exchange protocols; any one or more future post-quantum key exchange protocols; and any other suitable post-quantum key exchange protocol for exchanging a shared key between endpoint devices or intermediary devices and the like using classical transmissions and the like; combinations thereof; modifications thereto; as herein described, and/or as the application demands.

Examples of quantum key exchange/distribution protocols may include one or more quantum key exchange/distribution protocols from the group of, without limitation, for example: a QKD protocol from the Bennett and Brassard 1984 (BB84) family of QKD protocols; the BB84 QKD protocol; modified versions of the BB84 protocol configured to ensure the QKD linking apparatus is unable to derive the resulting exchanged QKD keys between the endpoint devices; a modified version of the BB84 protocol configured in which at least the first device transmits or receives a first set of random symbols over a first quantum channel with the first intermediary device, but withholds the basis set used by the first device for the transmitting or receiving the first set of random symbols over the first quantum channel, wherein the first intermediary device is unable to derive the validly transmitted or received first set of random symbols by the first device or an exchanged shared key with a second device based on the validly transmitted or received first set of random symbols by the first device; a modified version of the BB84 protocol configured in which at least the first device transmits or receives a first set of random symbols over a first quantum channel with the first intermediary device, but withholds the basis set used by the first device for the transmitting or receiving of the first set of random symbols over the first quantum channel, and at least the second device transmits or receives a second set of random symbols over a second quantum channel with the first intermediary device, but withholds the basis set used by the second device for the transmitting or receiving of the second set of random symbols over the second quantum channel, wherein the intermediary device is unable to derive: the validly transmitted or received first set of random symbols by the first device, the validly transmitted or received second set of random symbols by the second device, and the resulting shared key exchanged between the first and second devices based on the validly transmitted or received first set of random symbols and the validly transmitted or received second set of random symbols; the Bennet 1992 (B92) QKD protocol; the Six-State Protocol (SSP) QKD protocol; the Scarani Acin Ribordy Gisin 2004 (SARG04) QKD protocol; the Doherty Parrilo Spedalieri 2002 (DPS02) QKD protocol; the differential phase shift (DPS) QKD protocol; the Eckert 1991 (E91) QKD protocol; the coherent one-way (COVV) QKD protocol; the Khan Murphy Beige 2009 (KMB09) QKD protocol; the Esteban Serna 2009 (S09) QKD protocol; the Serna 2013 (S13) QKD protocol; the A Abushgra K Elleithy 2015 (AK15) QKD protocol; any one or more other entanglement based QKD protocols; any one or more future QKD protocols; and any other suitable QKD protocol for exchanging QKD keys between endpoint devices using quantum transmissions and classical transmissions; combinations thereof; modifications thereto; as herein described, and/or as the application demands.

As an example, the first and second key exchange protocols may include one or more or a plurality of classical key exchange protocols and/or post-quantum resistant key exchange protocols, and where any of the one or more key exchange protocols used between the intermediary devices are also classical key exchange protocols and/or post-quantum resistant key exchange protocols. The first, second, and one or more key exchange protocols may be the same and/or different classical key exchange protocols and/or post-quantum resistant key exchange protocols.

In other examples, the set of key exchange protocols may include, without limitation, for example a plurality of quantum key exchange/distribution protocols, where the first and second key exchange protocols are quantum key exchange/distribution protocols, and where any of the one or more key exchange protocols used between the intermediary devices are quantum key exchange/distribution protocols. The first, second, and one or more key exchange protocols may be the same and/or different quantum key exchange/distribution protocols. For example, the first key exchange protocol may be a first quantum key exchange/distribution protocol, the second key exchange protocol may be a second quantum key exchange/distribution protocol, and the one or more key exchange protocols used by the intermediary devices may be the second key exchange/distribution protocol. The first key exchange protocol may be configured for detecting eavesdroppers during the exchange of the final shared key.

In further examples, the set of key exchange protocols may include, without limitation, for example a plurality of classical key exchange protocols, a plurality of post-quantum key exchange protocols, and/or a plurality of quantum key exchange/distribution protocols, where the first key exchange protocol is a quantum key exchange/distribution protocol, and where the second key exchange protocol and the one or more key exchange protocols may be classical and/or post-quantum resistant key exchange protocols. The second and one or more key exchange protocols may be the same and/or different quantum key exchange/distribution protocols. The first key exchange protocol may be configured for detecting eavesdroppers during the exchange of the final shared key.

Devices may encrypt a first set of symbols or data by using cryptographic operations that cryptographically combine the first set of symbols with a second set of symbols or data (e.g. intermediate symbols, shared keys and the like) resulting in a third set of symbols or an encrypted set of symbols, which can only be decrypted with the first or second set of symbols. Similarly devices may decrypt the third set of symbols or the encrypted set of symbols by applying cryptographic operations either to the first set of symbols or the second set of symbols to the third set of symbols to retrieve either the second set of symbols or first set of symbols, respectively. For example, a first set of symbols (e.g. a bit string or symbol string) and may be cryptographically combined with another set of symbols or a second set of symbols (another bit string or symbol string) in a secure but reversible manner using cryptographic operations such as, without limitation, for example: exclusive or (XOR) operations on these sets of symbols (e.g. converting the sets of symbols into bit strings and performing bitwise XOR); extended XOR operations on these sets of symbols (e.g. using a mathematically defined extended set of "symbol XOR" operations on symbols that preserve the mathematical properties of bitwise XOR operations); one-time-pad encryption of these sets of symbols; any other classical, post-quantum resistant, or quantum encryption/decryption operation on these sets of symbols such that a device is able to decrypt and retrieve one of the sets of symbols using the other of the sets of symbols used to encrypt both sets of symbols; modifications thereto; combinations thereof; and/or as herein described.

A quantum communication channel(s) may comprise or represent a communication channel capable of transmitting and/or receiving at least quantum information. Examples of a quantum communication channel or quantum channel that may be used according to the invention may include or be based on, without limitation, for example on one or more types of quantum communication channels associated with the group of: optical quantum communications; free-space optical quantum communications; optical fibre quantum communications; optical laser quantum communications; communications using electromagnetic waves such as, without limitation, for example radio, microwave, infra-red, gigahertz, terahertz and/or any other type of electromagnetic wave communications; communications based on electron spin and the like; any other type of quantum communications for transmitting and receiving data over a quantum communication channel between devices. It is noted that one or more types of quantum communication channel(s) may be capable of transmitting and/or receiving non-quantum or classical information.

A standard, classical or non-quantum communication channel(s) may comprise or represent any communication channel between two devices that at least is capable of transmitting and/or receiving non-quantum information. Examples of standard, classical and/or non-quantum communication channels according to the invention may include or be based on, without limitation, for example on one or more types of communication channels from the group of: any one or more physical communication channel(s); optical communication channel; free-space optical communication channel; wireless communication channel; wired communication channel; radio communication channel; microwave communication channel; satellite communication channel; terrestrial communication channel; optical fibre communication channel; optical laser communication channel; telecommunications channels; 2G to 6G and beyond telecommunications channels; logical channels such as, without limitation, for example Internet Protocol (IP) channels; any other type of logical channel being provided over any standard, classical or non-quantum physical communication channel; one or more other physical communications or carriers of data such as, without limitation, for example avian carriers, paper, sealed briefcases, courier or other delivery service and the like; any other type of one or more optical, wireless and/or wired communication channel(s) for transmitting data between devices; and/or two or more optical, wireless and/or wired communication channel(s) that form a composite communication channel for transmitting data between devices; and/or any combination of two or more standard, classical or non-quantum communication channel(s) that form a composite communication channel for transmitting and/or carrying data between devices; combinations thereof, modifications thereto, and/or as described herein and the like and/or as the application demands. It is noted that one or more types of standard, classical or non-quantum communication channel(s) may be capable of transmitting and/or receiving quantum information.

A communication link between at least two devices may comprise or represent any one or more communication channels formed between said at least two devices enabling said at least two devices to communicate therebetween. Examples of a communication link according to the invention may include or be based on, without limitation, for example a classical communication link such as a communication link between said at least two devices including at least one or more classical or standard communication channels formed therebetween; a quantum communication link such as a communication link between said at least two devices including at least one or more quantum communication channels formed therebetween; a combined classical and quantum communication link such as a communication link between said at least two devices including at least one or more quantum communication channels formed therebetween and at least one or more classical or standard communication channels formed therebetween; a communication link including only one or more classical communication channel(s); a communication link including only a classical communication channel and a quantum communication channel; a communication link including only one or more quantum communication channels; a communication link including at least a bidirectional classical channel and a unidirectional quantum communication channel between said at least two devices; a communication link including at least a bidirectional classical channel and a first unidirectional quantum communication channel and a second unidirectional quantum communication channel, the first unidirectional quantum communication channel for transmitting quantum information from a first device to a second device, and the second unidirectional quantum communication channel for transmitting quantum information from the second device to the first device; combinations thereof; modifications thereto; and/or as described herein and the like; and/or as the application demands.

The intermediary device may comprise or represent any device or apparatus, component or system that is adapted to, configured to, includes the capability of: establishing one or more communication links including at least one or more non-quantum, standard or classical communication channels and/or quantum communication channel(s) with one or more other communication devices for transmitting/receiving data to/from said one or more other communication devices and configured for implementing a key exchange according to the invention as described herein and/or as the application demands. Examples of an intermediary device as described herein and/or according to the invention may include, without limitation, for example a satellite or apparatus/components thereof, a ground station or apparatus/components thereof, a relay station, repeater, telecommunication apparatus, network apparatus, network nodes, routers, and/or any apparatus, communication device, computing device or server and the like with a communication interface configured for and/or including functionality of, without limitation, for example a non-quantum, standard or classical communication interface for communicating over non-quantum, standard or classical communication channel(s); and a quantum communication interface for communicating over quantum channel(s).

The first or second endpoint device or first or second communication device (also referred to herein as first or second devices) may comprise or represent any device or apparatus with communication components/systems or communication capabilities configured to connect over one or more communication links with one or more intermediary devices, where each communication link may include at least one of more of a non-quantum, standard or classical communication channel(s) and/or quantum communication channel(s) for implementing the key exchange according to the invention as described herein and/or as the application demands. Examples of a first or second endpoint/communication devices (or first and second devices) according to the invention may include, without limitation, for example a satellite and/or apparatus/components thereof, a satellite ground receiving station and/or apparatus/components thereof, optical ground receiving station, user device, endpoint device, telecommunication apparatus, network apparatus, network nodes, routers, and/or any communication device, computing device or server and the like with a communication interface configured for and/or including functionality of, without limitation, for example a non-quantum, standard or classical communication interface for communicating over non-quantum, standard or classical communication channel(s); and a quantum communication interface for communicating over quantum channel(s).

Although the following description describes several different types of classical and/or quantum key exchange protocols, this is byway of example only and the invention is not so limited, it is to be appreciated by the skilled person that any of the above-mentioned examples of classical, post-quantum, and/or quantum key exchange/distribution protocols may be used in place of those examples specified below and/or as herein described; combinations thereof; modifications thereto; and/or as the application demands.

FIG. 1*a* is a schematic diagram illustrating an example key exchange system 100 for exchanging a final shared key between first and second devices 102*a* and 102*b* according to the invention. The key exchange system 100 includes a first endpoint device 102*a* (e.g. Alice) and a second endpoint device 102*b* (e.g. Bob) in communication with each other via one or more intermediary devices 104*a*-104*n* and communication links 106*a*, 106*b* and 108*a*-108*m* connected therebetween. The first and second endpoint devices 102*a* and 102*b* may be referred to herein interchangeably as first and second devices, respectively. In this example, the first device 102*a* is connected to intermediary device 104*a* via a first communication link 106*a* of the communication links 106*a*-106*b* and 108*a*-108*m*, the second device 102*b* is similarly connected via a second communication link 106*b* to intermediary device 104*n* and each of the intermediary devices 104*a*-104*n* are connected to each adjacent or neighbouring intermediary device 104*b*-104*m* via one of the communication links 108*a*-108*m*. Thus, the first and second devices 102_a_ and 102_b_ are communicatively coupled to each other via the one or more intermediary devices 104_a_-104_n_. In addition, the first and second devices 102_a_ and 102_b_ may be further coupled via a third communication link 110 for processing key information for use in reconciling and/or determining a final shared key between the first device 102_a_ and second device 102_b_ using first intermediate key information exchanged via the intermediary devices 104_a_-104_n_ and the first device 104_a_.

In this example, the first and second devices 102_a_ and 102_b_ may require a shared key (or final shared key) that is facilitated by a first intermediary device 104_a_ of the one or more intermediary devices 104_a_-104_n_. The first intermediary device 104_a_ is connected via communication link 106_a_ to the first device 102_a_. The first device and first intermediary device 104_a_ are configured to use a first key exchange protocol over the first communication link 106_a_ to exchange first intermediate key information 112 for use by the first and second devices in determining the final shared key. The first intermediate key information 112 (e.g. $I_A$) is securely communicated 114 from the first intermediary device 104_a_ via any intermediary devices between the first intermediary device 104_a_ and the second device 102_a_. The secure communication 114 of the first intermediate key information 112 may be performed by encrypting said first intermediate key information 112 from one intermediary device 104_a_ to another based on using shared keys therebetween determined or derived from one or more key exchange protocols from a set of key exchange protocols. The second device 102_b_ performs a second key exchange protocol from the set of key exchange protocols to establish a shared key with intermediary device 104_n_ for use in securing the second communication link 106_b_ connecting the second device 102_b_ with intermediary device 104_n_. The second device 104_b_ and said intermediary device 104_n_ connected thereto exchange shared key therebetween using said second key exchange protocol. Any of the first and/or other intermediary devices exchange shared keys therebetween using said one or more key exchange protocols from the set of key exchange protocols. The one or more key exchange protocols and the second key exchange protocol may be different and/or the same. The shared keys may be symmetric shared keys enabling the first intermediate key information to be encrypted/decrypted with the shared key using, without limitation, for example XOR-type operations, and/or one-time-pad operations, and/or any other type of encryption/decryption operations using symmetric keys In operation, the first device 102_a_ exchanges a final shared key with the second device 102_b_ based on: the first device 102_a_ exchanging first intermediate key information 112 with the first intermediary device 104_a_ connected to said first device 102_a_ using the first key exchange protocol. The first intermediate key information 112 (e.g. $I_A$) may include a first intermediate set of symbols (e.g. n bit(s) per symbol are represented by $M=2^n$ different symbols, where $n \geq 1$) that are exchanged between the first device and the first intermediary device. The first intermediary device 104_a_ securely forwards/communicates 114 the first intermediate key information 112 (e.g. $I_A$) to the second device 102_b_ connected to said at least one of the intermediary devices 104_a_-104_n_, where the intermediary device 104_n_ connected to said second device 102_b_ uses the second key exchange protocol to exchange a shared key for securely providing said first intermediate key information 112 (e.g. $I_A$) to the second device 102_b_. As an option, the shared keys used in the secure communications may be symmetric shared keys enabling the first intermediate key information to be encrypted/decrypted with the shared key using, without limitation, for example XOR-type operations, and/or one-time-pad operations, and/or any other type of encryption/decryption operations using symmetric keys. Once the second device 102_b_ has the first intermediate key information 112 (e.g. $I_A$), the first and second devices may use a further communication channel 110 therebetween for processing and transforming said first intermediate key information 112 (e.g. $I_A$) for determining the final shared key between the first and second devices 102_a_ and 102_b_ based on using, at least in part, the portions of the first key exchange protocol for reconciling a final shared key based on, at least in part, the first intermediate key information 112 (e.g. $I_A$).

As an option, when there is one intermediary device between the first and second devices 102_a_ and 102_b_ (i.e. there may be only one intermediary device), as illustrated in FIG. 1_a_, the first intermediary device 104_a_ connected to the first device 102_a_ and the intermediary device 104_n_ connected to the second device 102_a_ are the same intermediary device 104_a_. However, when there is more than one intermediary device, then the first intermediary device 104_a_ and the intermediary device 104_n_ connected to the second device 102_a_ are different intermediary devices. The intermediary devices 104_a_-104_n_ may use one or more key exchange protocols from the set of key exchange protocols for exchanging a shared key with any adjacent neighbouring intermediary device. The first and second key exchange protocols may be different and/or the same key exchange protocol.

FIG. 1_b_ is a schematic diagram illustrating another example key exchange system 120 in which the key exchange system 100 of FIG. 1_a_ is a subnetwork 122 of a communication network 124 according to the invention. As seen, the first endpoint device 102_a_ (e.g. Alice), the one or more intermediary device(s) 104_a_-104_n_ and the second endpoint device 102_b_ (e.g. Bob) may form a string or chain of devices, where each device in the string or chain of devices 102_a_-102_b_, 104_a_-104_n_ are connected to at least one adjacent device via a communication link of the communication links 106_a_-106_b_, 108_a_-108_m_. The one or more intermediary device(s) 104_a_-104_n_ forms a string or chain of intermediary devices 104_a_-104_n_, where each intermediary device in the string or chain of intermediary devices 104_a_-104_n_ are connected to at least one adjacent or neighbouring intermediary device via a communication link of the intermediary device communication links 108_a_-108_m_. In this example, the first endpoint device 102_a_ and second endpoint device 102_b_ are communicatively coupled together via the one or more intermediary devices 104_a_-104_n_.

The first endpoint device 102_a_ is connected by a first communication link 106_a_ to a first intermediary device 104_a_ of the string or chain of intermediary devices 104_a_-104_n_ and the second endpoint device being connected by a second communication link to the last intermediary device 104_n_ of the chain of intermediary devices 104_a_-104_n_. As an example, when there are more than one intermediary devices, then the first intermediary device 104_a_ and the last intermediary device 104_n_ are different in which the first device 102_a_ is connected via the first communication link 106_a_ to the first intermediary device 104_a_ of the chain of intermediary devices 104_a_-104_n_, where each of the other intermediary devices 104_b_-104_n_ are connected via a communication link 108_a_-108_m_ to at least one adjacent or neighbouring intermediary device of the chain of intermediary devices 104_a_-104_n_, with the last intermediary device 104_n_ connected via a second communication link 106_b_ to the second device 102_b_. In another example, when there is only one intermediary device, then the first and last intermediary devices are one and the same intermediary device 104*a* in which the first device 102*a* is connected via a first communication link 106*a* to said intermediary device 104*a*, and the second device 102*b* is connected via a second communication link 106*b* to said intermediary device 104*a*.

The string or chain of devices including the first device 102*a*, second device 102*b*, and one or more intermediary devices 104*a*-104*n* may form a line network or linear array topology with the first endpoint device 102*a* being communicatively coupled to the second endpoint device 102*b* via said one or more intermediary devices 104*a*-104*n*. The string or chain of devices may be part of a communication or mesh network 124 where one or more of the intermediary devices 104*a*-104*n* may be connected via other communication links 126*a*-126*d* to other devices and/or intermediary devices 128*a*-128*d* in the communication or mesh network 124. That is, the string or chain of devices 102*a*, 104*a*-104*n* and 102*b* may simply be a connected portion or subnetwork 122 (or linear subnetwork) of a larger communication network 124, where the connected portion or subnetwork 122 containing the string or chain of devices 102*a*-104*a*-104*n* and 102*b* may be based on a linear array, linear network topology and the like.

Figure 1B:
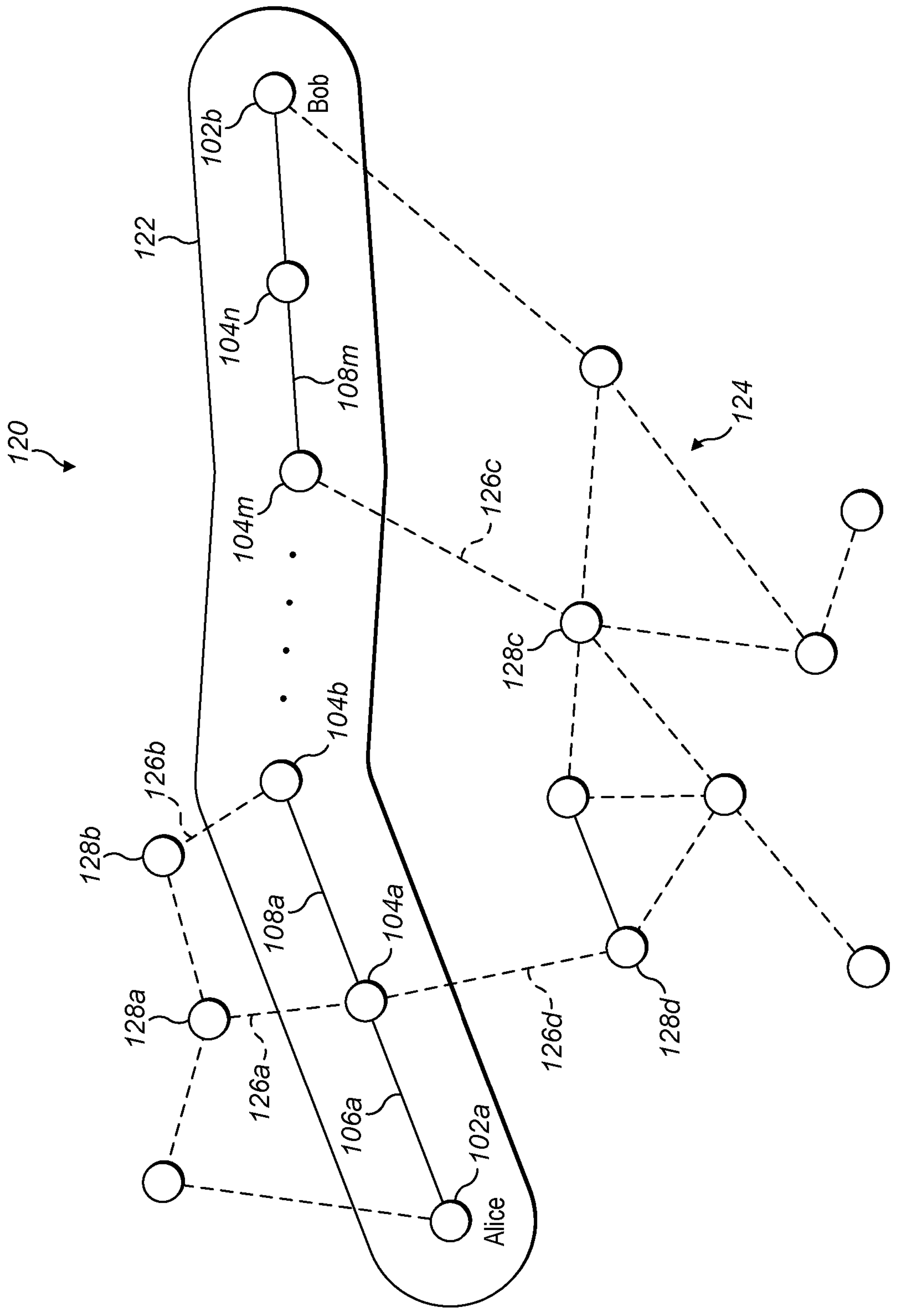
FIG. 1*b* is a schematic diagram illustrating the example key exchange system of FIG. 1*a* as a subnetwork of a communication network according to the invention.
Figure 1C:
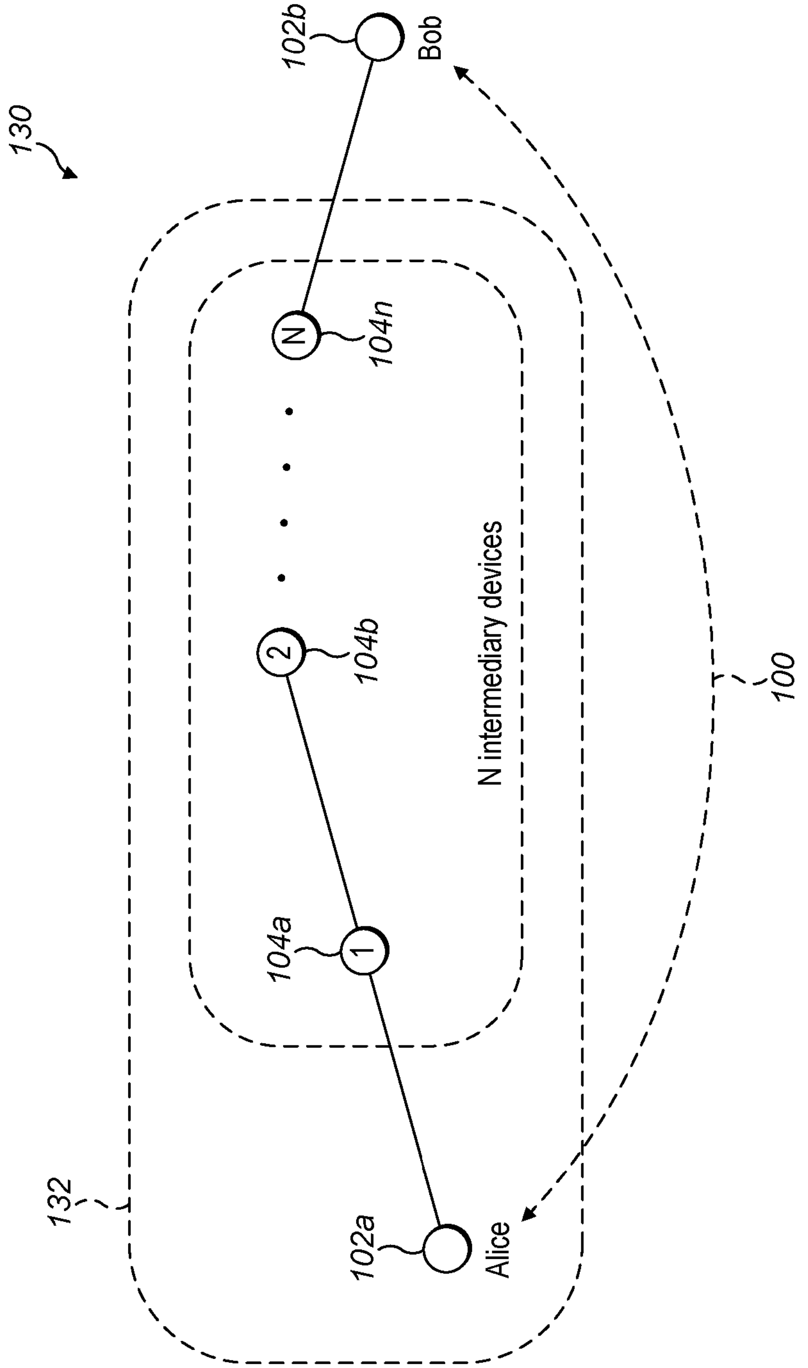
FIG. 1*c* is a schematic diagram illustrating another example key exchange system of FIG. 1*a* or 1*b* for implementing a further example key exchange between first and second devices according to the invention.

FIG. 1*c* is a schematic diagram illustrating another example key exchange system 130 based on the key exchange systems 100 and 120 of FIG. 1*a* or 1*b* for implementing a further example key exchange between first and second devices 102*a* and 102*b* according to the invention. Further modifications and/or additions to the key exchange system 100 and/or 120 of FIGS. 1*a* and 1*b* may be made in which the first and second devices 102*a* and 102*b* (e.g. Alice and Bob, respectively) may include, without limitation, for example the first device 102*a* may be a first endpoint device and the second device 102*b* may be a second endpoint device, where the key exchange is between the first endpoint device 102*a* and the second endpoint device 102*b*, which are communicatively coupled over communication links 106*a*, 108*a*-108*m* and 106*b* via N intermediary devices 104*a*-104*n*, N>0, where N is an integer. The first endpoint device 102*a* is coupled by a first communication link 106*a* to a first intermediary device 104*a* of the N intermediary devices 104*a*-104*n*. The second endpoint device 102*b* and the N intermediary devices 104*a*-104*n* form a group of devices 132, where each of the N intermediary devices 104*a*-104*n* is communicatively coupled to at least one other of the N intermediary devices 104*a*-104*n* via at least one of the intermediary device communication links 108*a*-108*m*. The second endpoint device 102*b* is coupled to at least one of the N intermediary devices 104*n* via a second communication link 106*b*. The key exchange between the first endpoint device 102*a* and the second endpoint device 102*b* may include the first endpoint device 102*a* exchanging first intermediate key information between the first intermediary device 104*a* and the first endpoint device 102*a* based on a first key exchange protocol. Once said first intermediate key information has been exchanged, the first intermediary device 104*a* securely sends data representative of the exchanged first intermediate key information via the group of devices 132 to the second endpoint device 102*b*, e.g. from the first intermediary device 104*a* to the second endpoint device 102*b* via any one or more intermediary devices 104*b*-104*n* connected therebetween. The secure communication of the first intermediate key information over the communication links 108*a*-108*m* and 106*a* of the group of devices 132 is based on shared keys that have been exchanged using one or more key exchange protocols of a set of key exchange protocols over each of the communication links 108*a*-108*m* and 106*b* of the group of devices 132.

Once the second endpoint device 102*b* has securely received and decrypted the first intermediate key information from the first intermediary device 104*a*, the first and second endpoint devices 102*a* and 102*b* use a further communication channel 110 therebetween for processing and transforming said first intermediate key information into final shared key. The first and second endpoint devices 102*a* and 102*b* may use the first intermediate key information, at least in part, with the portion of the first key exchange protocol over the further communication channel 110 that enables a final shared key to be agreed between the first and second endpoint devices 102*a* and 102*b* based on the first intermediate key information.

The first endpoint device 102*a*, the N intermediary device(s) (e.g. N>0) 104*a*-104*n* and the second endpoint device 102*b* form a string or chain of devices, where each device in the string or chain of devices are connected to at least one adjacent device via a communication link of the communication links 106*a*, 108*a*-108*m* and 106*b*, where the first endpoint device 102*a* and second endpoint device 102*b* are communicatively coupled together via the N intermediary devices 104*a*-104*n*. The first endpoint device 102*a* being connected by a first communication link 106*a* to a first intermediary device 104*a* of the string or chain of devices and the second endpoint device 102*b* being connected by a second communication link 106*b* to an N-th intermediary device 104*n* of the string or chain of devices. As an example, when N>1, then the first intermediary device 102*a* and the N-th intermediary devices 104*n* are different in which the first device 102*a* is connected via a first communication link 106*a* to a first intermediary device 104*a* of the N intermediary devices 104*a*-104*n*, where each of the N intermediary devices 104*a*-104*n* are connected via communication links 108*a*-108*m* to at least one adjacent or neighbouring intermediary device of the intermediary devices 104*a*-104*n*, with the N-th intermediary device 104*n* connected via a second communication link 106*b* to the second device 102*b*. In another example, when N=1, then the first and N-th intermediary devices are one and the same intermediary device in which the first device 102*a* is connected via a first communication link 106*a* to said first intermediary device 104*a*, and the second device 102*b* is connected via a second communication link 106*b* to said first intermediary device.

Referring to FIGS. 1*a*, 1*b*, and/or 1*c*, the first and second key exchange protocols may be selected from the set of key exchange protocols. The set of key exchange protocols may include, without limitation, for example a plurality of classical key exchange protocols; a plurality of post-quantum resistant key exchange protocols; a plurality of quantum key exchange protocols; one or more classical key exchange protocols, one or more post-quantum resistant key exchange protocols, and/or one or more quantum key exchange/distribution protocols; any mixture of key exchange protocols from the families of classical, post-quantum resistant and/or quantum key exchange protocols and the like; and/or any other type of key exchange protocol for use in sharing and/or exchanging shared keys between the first device 102*a*, second device 102*b*, and one or more intermediary device(s) 104*a*-104*n*; combinations thereof; modifications thereto; and/or as herein described; and/or as the application demands.

In relation to the group of devices 132, which may use one or more key exchange protocols from the set of key exchange protocols to share keys between adjacent devices in the group of devices 132. Thus, the shared key(s) for a device in the group of devices 132 are shared keys between said device and any adjacent or neighbouring device connected to said device by one of the communication links 106*b* and 108*a*-108*n*. In an example, each shared key for a device in the group of devices 132 is used for securing the communication of the first intermediate key information from one device to next neighbouring device in the chain of devices or communication path towards the second endpoint device 102*b*. This may mean each device that is connected to two adjacent devices has a first and second shared key, where the first shared key is shared with an adjacent device in the communication path towards the first endpoint device 102*a* (e.g. communication path upstream of the device) and the second shared key is shared with an adjacent device in the communication path towards the second endpoint device 102*b*. Thus, in this example, the first shared key may be used to decrypt the first intermediate key information, which was encrypted with the first shared key by the adjacent device upstream of the device, where the device then re-encrypts the first key information with the second shared key for sending to the downstream adjacent device, with which the device shared the second shared key with. This is repeated until the second endpoint device 102*b* in the group of devices 132 receives the encrypted first intermediate key information, which it decrypts with the shared key shared with the N-th or last intermediary device 104*n* of the group 132.

Alternatively, each device in the group of devices 132 sends its shared key(s) to the second endpoint device 102*b*, thus the second endpoint device 102*b* accumulates the shared keys from all devices in the group 132. Thus, when an intermediary device in the group of devices 132 receives the first intermediate key information, which may have been encrypted with another shared key from the adjacent intermediary device, the intermediary device only encrypts the incoming communications associated with the first intermediate key information with the shared key that was shared with the adjacent device in the communication path closer to the second endpoint device 102*b* before forwarding it towards the second endpoint device 102*b* via its nearest neighbour/adjacent device. The second endpoint device 102*b* uses the accumulated shared keys to decrypt the encrypted first intermediate key information.

Furthermore, the one or more key exchange protocols used between one or more of the devices in the group of devices 132 for secure communications therebetween are selected from a group of key exchange protocols based on a desired or required trust level in relation to the N intermediary devices 104*a*-104*n* of the group of devices 132. For example, when the level of trust is a trust level that is considered an untrusted level, then the one or more key exchange protocols selected include quantum key exchange/distribution protocols for use in sharing keys with untrusted parties. Thus, the one or more key exchange protocols used by the group of devices 132 may use one or more types of quantum key exchange/distribution protocols. Should the quantum key exchange/distribution protocol require at least one quantum channel and at least one classical channel, then each of the communication links 108*a*-108*m* and 106*b* may include a quantum communication channel and a classical communication channel. For each communication link between a pair of devices in the group of devices 132, the direction of the quantum communication channel may depend on the quantum key exchange protocol used to exchange the shared keys between the pair of devices over said each communication link. For each communication link, the quantum channel may be a unidirectional quantum channel, whereas the classical communication channel may be a bidirectional classical communication channel.

In another example, when the level of trust is a trust level that is considered an untrusted level, then the one or more key exchange protocols selected include quantum key exchange/distribution protocols for use in sharing keys with untrusted parties. Thus, the one or more key exchange protocols used by the group of devices 132 may use one or more types of quantum key exchange/distribution protocols. Should the types of quantum key exchange/distribution protocols require only quantum channel(s) (e.g. quantum entanglement protocols), then each of the communication links 108*a*-108*m* and 106*b* may include a suitable quantum communication channel. For each communication link between a pair of devices in the group of devices 132, the direction of the quantum communication channel may depend on the quantum key exchange protocol used to exchange the shared keys between the pair of devices over said each communication link.

In another example, when the one or more of the intermediary devices can be trusted and other intermediary devices cannot be trusted, then the one or more key exchange protocols selected may include classical/post-quantum key exchange protocol for sharing keys between pairs of trusted intermediary devices in the group of devices 132, and the one or more key exchange protocols selected may include quantum key exchange/distribution protocols for use in sharing keys with between pairs of intermediary devices, in which at least one of the intermediary devices is an untrusted party. Thus, the one or more key exchange protocols used by the group of devices 132 may use one or more types of classical/post-quantum and/or quantum key exchange/distribution protocols.

Furthermore, to enhance the level of security, the first key exchange protocol used between the first intermediary device 104*a* and the first device 102*a* may be configured for detecting eavesdroppers during the exchange of the final shared key. That is, the first key exchange protocol may be a quantum key distribution/exchange protocol, in which the first communication link includes a first quantum channel and a first classical channel. The first key exchange protocol may be chosen to be different to the one or more key exchange protocols used for exchanging shared keys between the devices in the group of devices 132.

Although several different configurations on the different types of key exchange protocols have been described, this is by way of example only and the invention is not so limited, it is to be appreciated by the skilled person that the first key exchange protocol may be selected from a set of protocols including at least one from the group of classical, post quantum, and quantum key exchange protocols as the application demands and/or as herein described, and/or similarly, the second key exchange protocol and/or the one or more key exchange protocols used to share keys between the one or more intermediary devices may be selected from a set of key exchange protocols including at least one from the group of classical, post quantum, and quantum key exchange protocols as the application demands and/or as herein described.

Figure 1D:
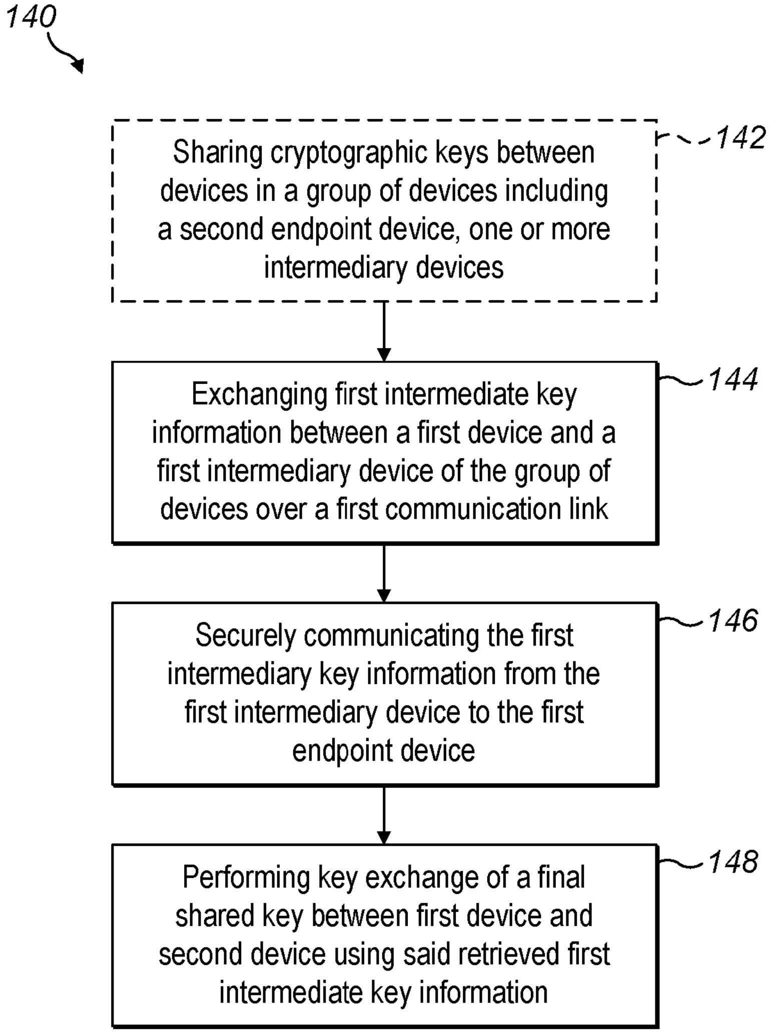
FIG. 1*d* is a flow diagram illustrating an example key exchange process according to the invention.

FIG. 1*d* is a flow diagram illustrating an example key exchange process 140 describing steps performed by the key exchange system 100, 120, 130 with reference to FIGS. 1*a* to 1*c* and/or as herein described. For simplicity, the reference numerals of FIGS. 1*a* to 1*c* will be referred to for the same and/or similar components and/or features and the like in relation to FIG. 1*d*. The key exchange process 140 is performed in the key exchange system 100 with reference to the first device 102*a* and the second device 102*b* and one or more of the intermediary devices 104*a*-104*n*, which, as described with reference to FIGS. 1*a* to 1*c* are connected together via communication links 106*a*, 108*a*-108*m* and 106*b*. It is assumed that each of the communications links includes the appropriate classical and/or quantum channels depending on the type of key exchange protocol from the set of key exchange protocols being performed on said each communication link when sharing keys and/or exchanging first intermediate key information. As well, it is assumed that each of the first device 102*a*, second device 102*b*, and the one or more of the intermediary devices 104*a*-104*n* have the appropriate transmission/receiver hardware that is suitable for the communication links that is uses when implementing the first key exchange protocol, the second key exchange protocol, and/or the one or more key exchange protocol between said intermediary devices 104*a*-104*n*. Such transmission/receiver hardware may include, without limitation, for example at least one or more from the group of: a quantum transmitter, a quantum receiver, and a classical transceiver.

In this example, the key exchange process 140 performs, with reference to FIGS. 1*a* to 1 *c*, a key exchange of a final shared key between a first endpoint device 102*a* and a second endpoint device 102*b*. The first endpoint device 102*a* and second endpoint device 102*b* are communicatively coupled over communication links 106*a*, 108*a*-108*m* and 106*b* via N intermediary devices 108*a*-108*n*, where N>0 and N is an integer. The first endpoint device 102*a* is coupled by a first communication link 106*a* to a first intermediary device 104*a* of the N intermediary devices 104*a*-104*n*. The second endpoint device 102*b* and the N intermediary devices 104*a*-104*n* form a group of devices 132, wherein each of the N intermediary devices 104*a*-104*n* is communicatively coupled to at least one other of the N intermediary devices 104*a*-104*n* via at least one of the communication links 108*a*-108*m* and the second endpoint device 102*b* is coupled to at least one of the N intermediary devices, in this case the N-th intermediary device 104*n*, via a second communication link 106*b*. The key exchange process 140 includes the following steps of:

In step 142, sharing cryptographic keys over the communication links 102*b*, 104*a*-104*n* between neighbouring and/or adjacent devices in the group of devices 132, where one or more key exchange protocols from the set of key exchange protocols are used to share a cryptographic key between devices over the communication link therebetween. It is noted that this step may be performed prior to step 144, after step 144, and/or as a separate key exchange between pairs of adjacent or neighbouring devices in the group of devices 102*b*, 104*a*-104*n* and the like. The second device 102*b* uses a second key exchange protocol to share a cryptographic key over the second communication link 106*b* with the N-th intermediary device 104*n*. Thus, each of the intermediary devices 104*a*-104*n* has at least one shared cryptographic keys with at least one of its neighbouring intermediary devices 104*a*-104*n* and/or the second device 102*b* and the like.

As an option, each device of the group of devices 102*b* and 104*a*-104*n* may send at least one of its shared cryptographic keys that it shared with an adjacent or neighbouring device to the second endpoint device 102*b*, where the second endpoint device 102*b* may accumulate the shared keys. Thus, each intermediary device in the group of devices 132, when securely communicating said first intermediate key information, only encrypts said incoming communications associated with the first intermediate key information with the shared key it sent to the second endpoint device 102*b* before forwarding the encrypted first intermediate key information towards the second endpoint device 102*b* via its nearest neighbour device. The intermediary devices 104*a*-104*n* do not have to decrypt and re-encrypt the first intermediate key information, which can remain secret until decrypted by the second endpoint device 102*b*. The multiple encryption may be performed using symmetric keys using an XOR-type operation, thus the first intermediate key information is encrypted using nested XOR operations. Thus, the second endpoint device 102*b* uses the received shared keys to decrypt the multiply encrypted (or nested encrypted with XOR operations) first intermediate key information for use in the final key exchange of the final shared key with the first device 102*a*.

As an option, the shared keys used in the secure communications may be symmetric shared keys enabling the first intermediate key information to be encrypted/decrypted with the shared key using, without limitation, for example XOR-type operations, and/or one-time-pad operations, and/or any other type of encryption/decryption operations using symmetric keys.

In step 144, exchanging intermediate key information (e.g. $I_A$) between the first intermediary device 104*a* and the first endpoint device 102*a* based on a first key exchange protocol used over a first communication link 106*a* of the communication links 106*a*, 108*a*-108*m* and 106*b*. The first intermediary key information 112 for use by the second device 102*a* in performing a key exchange of the final shared key between the first device 102*a* and the second device 102*b* using, at least in part, the first key exchange protocol over another communication link 110 therebetween.

In step 146, securely sending data representative of the exchanged first intermediate key information from the first intermediary device 104*a* to the second endpoint device 102*b* via, if any, the one or more intermediary devices 104*b*-104*n* using the shared cryptographic keys therebetween. The secure communications over the communication links 108*a*-108*n* and 106*b* of the group of devices 104*a*-104*n* and 102*b*, respectively, is based on cryptographic keys that have been shared between adjacent or neighbouring devices in the group of devices 132. The cryptographic keys exchanged between said devices are based on using one or more key exchange protocols selected from a set of key exchange protocols over each of the communication links 108*a*-108*m* and 106*b* of the group of devices 104*a*-104*n* and 102*b*, respectively. The one or more key exchange protocols that are selected may be the same for each of the communication links 108*a*-108*m* and 106*b* and group of devices 104*a*-104*n* and 102*b*, respectively. One or more of the key exchange protocols that are selected may be the different depending on the capability and/or configuration of the communication links 108*a*-108*m* and 106*b* and/or depending on the capability and/or configuration of each device in the group of devices 104*a*-104*n* and 102*b*. The key exchange protocols may be selected or used based on a required level of trust or actual level of trust that can be met by each of the intermediary devices in the group of devices 132. For example, if each of the intermediary devices in the group of devices 132 is untrusted or controlled by an untrusted party, then the key exchange protocol(s) used between said intermediate devices may be based on quantum key exchange/distribution protocol(s) that do not depend on the intermediary devices being trusted devices, where the communication links therebetween include the appropriate quantum and/or classical channels and the like.

In step 148, performing a key exchange of the final shared key between the first and second endpoint devices 102*a* and 102*b* use a further communication link or channel 110 based, at least in part, on performing the first key exchange protocol using the first intermediate key information securely received by the second device 102*b*, which is processed and transformed by the first and second devices 102*a* and 102*b* using said first key exchange protocol into the final shared key.

As an option, the first endpoint device 102*a*, the N intermediary devices 104*a*-104*n* and the second endpoint device 102*b* may form a string or chain of devices in which adjacent devices are connected via a communication link of the communication links 106*a*, 108*a*-108*m* and 106*b*. The string or chain of devices may form a line network or a line subnetwork of a larger communication network. The line network or link subnetwork may have a linear array topology and the like. Thus, the first endpoint device 102*a* being communicatively coupled to the second endpoint device 102*b* via communication links 106*a*, 108*a*-108*m* and 106*b* and said N intermediary devices 104*a*-104*n*.

For added security, the first key exchange protocol used by the first device 102*a* may be configured for detecting eavesdroppers during the exchange of the final shared key with the second device 102*b*. The first communication link 106*a* between the first device 102*a* and the first intermediary device 104*a* includes a first quantum channel and a first classical channel, where the first key exchange protocol is a quantum key distribution protocol.

As an option, the one or more key exchange protocols used between one or more of the devices 102*b*, 104*a*-104*n* in the group of devices 132 for secure communications therebetween are selected from a group or set of key exchange protocols based on a desired trust level, required trust level, trust capability, or an actual level of trust in relation to the N intermediary devices 104*a*-104*n* of the group of devices 132. Thus, when the level of trust is a trust level that is considered an untrusted level, then the one or more key exchange protocols selected may include QKD protocols configured and/or capable for use in sharing keys with untrusted parties. This may be used when one or more of the intermediary devices are in the control of a third party operator and the like, thus such intermediary devices might not be fully trusted when exchanging shared keys and the like. In another example, the level of trust is a trust level that is considered to be a trusted level or high level of trust, such as when the intermediary devices are operated or owned by a known and trusted operator, then the one or more key exchange protocols selected may include QKD protocols configured and/or capable for use in sharing keys with trusted parties. Using QKD protocols may enable eavesdropper detection in relation to the shared keys that are shared between the devices in the group of devices 132.

Although the first key exchange protocol, the second key exchange protocol and/or the one or more key exchange protocols used between intermediary devices are described based on using one or more QKD protocols and the like, this is for simplicity and byway of example only and the invention is not so limited, it is to be appreciated by the skilled person that depending on the capabilities of the first device, second device and the intermediary devices, and the trust requirements and/or capabilities of these devices and the key exchange system as a whole and the like, the first key exchange protocol, the second key exchange protocol and/or one or more key exchange protocols used by the intermediary devices may be based on, without limitation, for example one or more key exchange protocols from the group of: one or more classical key exchange protocol(s); one or more post-quantum or quantum resistant key exchange protocol(s); and one or more quantum key exchange protocol(s); and/or any other one or more suitable key exchange protocols as the application demands.

Figure 1E:
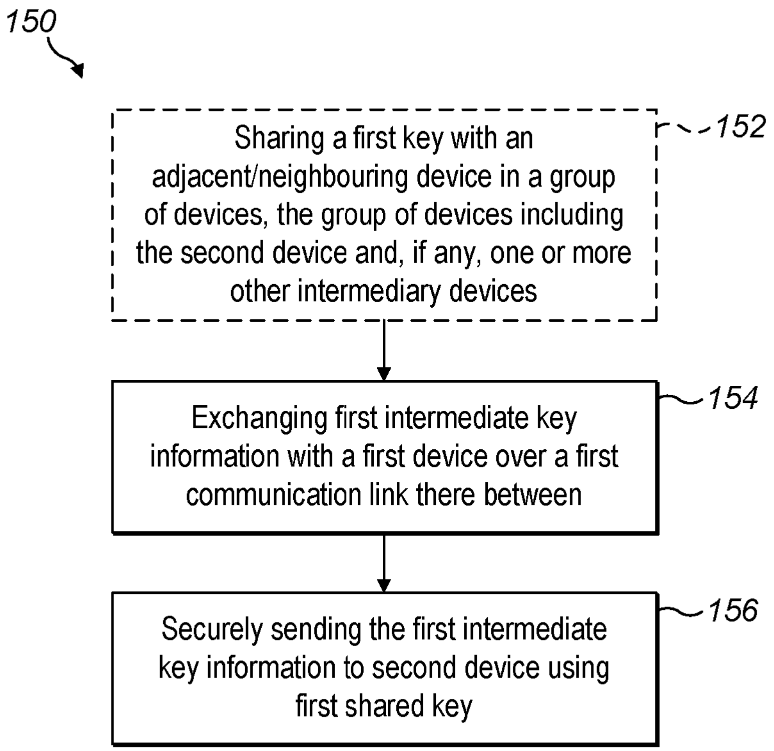
FIG. 1*e* is a flow diagram illustrating an example first intermediary device key exchange process according to the invention.

FIG. 1*e* is a flow diagram illustrating an example first intermediary device key exchange process 150 for further based on the key exchange process 140 and/or key exchange system 100-130 as described with reference to FIGS. 1*a* to 1*d*. For simplicity, the reference numerals of FIGS. 1*a* to 1*c* will be referred to for the same and/or similar components and/or features and the like in relation to FIG. 1*d*. The intermediary device key exchange process 150 is performed by the first intermediary device 104*a* in the key exchange system 100, 120, 130 with reference to the first device 102*a* and the second device 102*b* and one or more of the intermediary devices 104*b*-104*n*, which, as described with reference to FIGS. 1*a* to 1*c* are connected together via communication links 106*a*, 108*a*-108*m* and 106*b*. The first intermediary device key exchange process 150, performed by the first intermediary device 104*a*, includes the following steps of:

In step 152, the first intermediary device 104*a* shares a first cryptographic key over the communication link 108*a* (or 106*b*) with its neighbouring and/or adjacent device in the group of devices 132. If there are any further intermediary devices in the group of devices 132, then the neighbouring or adjacent device is an intermediary device 104*b* in the group of devices 132 that is connected with the intermediary device 104*a* via communication link 108*a*. The intermediary device 104*a* uses a key exchange protocol to share a key over the communication link 108*a* with intermediary device 104*b*. Otherwise, if the group of devices 132 only includes the intermediary device 104*a* and the second device 102*b*, then the neighbouring or adjacent device is the second device 102*b* in the group of devices 132 that is connected with the intermediary device 104*a* via communication link 106*b*. The intermediary device 104*a* uses a key exchange protocol, or second key exchange protocol, to share a key over the communication link 106*b* with second device 102*b*. Depending on the capabilities of the devices 104*a* and 104*b* (or 102*b*) and the communication link 104*a* (or 106*b*), the key exchange protocol used may be selected (e.g. predetermined or dynamically selected) from the set of key exchange protocols to share the first cryptographic key between these two devices 104*a* and 104*b* (or second device 102*b*) over the communication link 104*a* (or communication link 106*b*) therebetween. It is noted that this step may be performed prior to step 154, after step 154, and/or as a separate one or more key exchanges between the pair of devices 104*a* and 104*b* (or 102*b*). For example, the devices 104*a* and 104*b* (or 102*b*) may perform key management and store a set of paired shared cryptographic keys for future use and the like.

As an option, the first intermediary device 104*a* of the group of devices 132 may send the first shared cryptographic key to the second endpoint device 102*b*, where the second endpoint device 102*b* may accumulate the different cryptographic shared keys from the intermediary devices 104*a*-104*n*. Thus, each intermediary device in the group of devices 132, when securely communicating said first intermediate key information, only encrypts said incoming communications associated with the first intermediate key information with the shared key it sent to the second endpoint device 102*b* before forwarding the encrypted first intermediate key information towards the second endpoint device 102*b* via its nearest neighbour device 104*b*. The encryption of the first intermediate key information, which will be exchanged with the first intermediary device 104*a* in step 154, may be performed using symmetric shared keys using, without limitation, for example an XOR-type operation, a OTP operation(s), and/or any other type of encryption operation for encrypting said first intermediate key information with a shared key, which may be decrypted using the same symmetric shared key and the like. As an option, the shared keys used in the secure communication may be symmetric shared keys enabling the first intermediate key information to be encrypted by the first intermediary device 104*a* for sending securely towards the second device 102*b* via, if any, one or more other intermediary devices 104*b*-104*n*. The symmetric shared keys enable encryption/decryption of the first intermediate key information with the shared key using, without limitation, for example XOR-type operations, and/or one-time-pad operations, and/or any other type of encryption/decryption operations using symmetric keys.

In step 154, exchanging intermediate key information (e.g. $I_A$) between the first intermediary device 104*a* and the first endpoint device 102*a* based on a first key exchange protocol used over a first communication link 106*a* of the communication links 106*a*, 108*a*-108*m* and 106*b*. The first intermediary key information 112 for use by the second device 102*a* in performing a key exchange of the final shared key between the first device 102*a* and the second device 102*b* using, at least in part, the first key exchange protocol over another communication link 110 therebetween.

In step 156, securely sending data representative of the exchanged first intermediate key information from the first intermediary device 104*a* to the second endpoint device 102*b* via, if any, the one or more intermediary devices 104*b*-104*n* using the first shared cryptographic key determined from step 152.

Once the first intermediate key information is received by the second device 102*b*, the first and second devices 102*a* and 102*b* perform a key exchange of the final shared key between the first and second endpoint devices 102*a* and 102*b* using a further communication link or channel 110 based, at least in part, on performing the first key exchange protocol using the first intermediate key information that was securely sent by the first intermediary device 104*a* and securely received and decrypted by the second device 102*b*, which is processed and transformed by the first and second devices 102*a* and 102*b* using said first key exchange protocol into the final shared key.

Figure 1F:
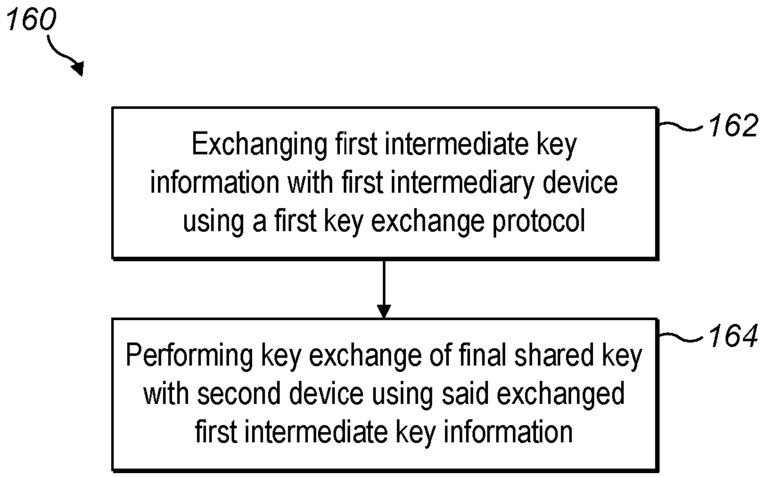
FIG. 1*f* is a flow diagram illustrating an example first device key exchange process according to the invention

FIG. 1*f* is a flow diagram illustrating an example first device key exchange process 160 further based on the key exchange process 140 and intermediary key exchange process 150, and/or key exchange system 100-130 as described with reference to FIGS. 1*a* to 1*e*. For simplicity, the reference numerals of FIGS. 1*a* to 1*c* will be referred to for the same and/or similar components and/or features and the like in relation to FIG. 1*f*. The first device key exchange process 160 is performed by the first device 102*a* in the key exchange system 100, 120, 130 with reference to the first intermediary device 104*a* and the second device 102*b*, which, as described with reference to FIGS. 1*a* to 1*c* are connected together via communication links 106*a*, 108*a*-108*m* and 106*b*. The first device key exchange process 160, performed by the first device 102*a*, includes the following steps of:

In step 162, exchanging intermediate key information 112 (e.g. $I_A$) between the first intermediary device 104*a* and the first endpoint device 102*a* based on a first key exchange protocol used over a first communication link 106*a* of the communication links 106*a*, 108*a*-108*m* and 106*b*. The first intermediary key information 112 for use by the second device 102*a* in performing a key exchange of the final shared key between the first device 102*a* and the second device 102*b* using, at least in part, the first key exchange protocol over another communication link 110 therebetween.

The first intermediate key information is securely sent by the first intermediary device 104*a* to the second endpoint device 102*b* via, if any, the one or more intermediary devices 104*b*-104*n* using the first shared cryptographic key determined from step 152 of intermediary device process 150 of FIG. 1*e*.

In step 164, once the first intermediate key information is received by the second device 102*b*, performing a key exchange of the final shared key with the second device 102*b* using a further communication link or channel 110 based, at least in part, on performing the first key exchange protocol using the first intermediate key information that was securely sent by the first intermediary device 104*a* and securely received and decrypted by the second device 102*b*.

As an option, the key exchange process for determining the final shared key may involve processing and/or transforming by the first and second devices 102*a* and 102*b* the first intermediate key information using said first key exchange protocol into the final shared key. This key exchange process may include, should the first key exchange protocol be based on a quantum key exchange/distribution protocol, a reconciliation of random symbols between the first and second devices 102*a* and 102*b* using said first intermediate key information to form a common set of symbols, error correction and/or privacy amplification or eavesdropper detection and the like of said common set of symbols, and/or agreeing which symbols (or bits) of the common set of symbols may be used as the final shared key between the first and second devices 102*a* and 102*b*. This key exchange process may include, should the first key exchange protocol be a suitable type of key exchange protocol (e.g. classical or post-quantum key exchange protocol), a reconciliation of random symbols between the first and second devices 102*a* and 102*b* using said first intermediate key information to form a common set of symbols and/or error correction of said common set of symbols, and/or agreeing which symbols (or bits) of the common set of symbols may be used as the final shared key between the first and second devices 102*a* and 102*b*.

The further communication link or channel 110 may be a secure communication link or channel, that is, the further communication link or channel 110 may be secured by one or more previously shared keys between the first and second devices 102*a* and 102*b*, where the previously shared keys are unknown to the intermediary devices 104*a*-104*n*. Thus, the final shared key agreed between the first and second devices 102*a* and 102*b* is known to only these two devices 102*a* and 102*b*. Once the final shared key has been exchanged, the first and second devices 102*a* and 102*b* may use the final shared key for cryptographic operations therebetween and/or secure/encrypted/authenticated communications with each other over one or more communication links communicatively connecting the first and second devices together.

Figure 1G:
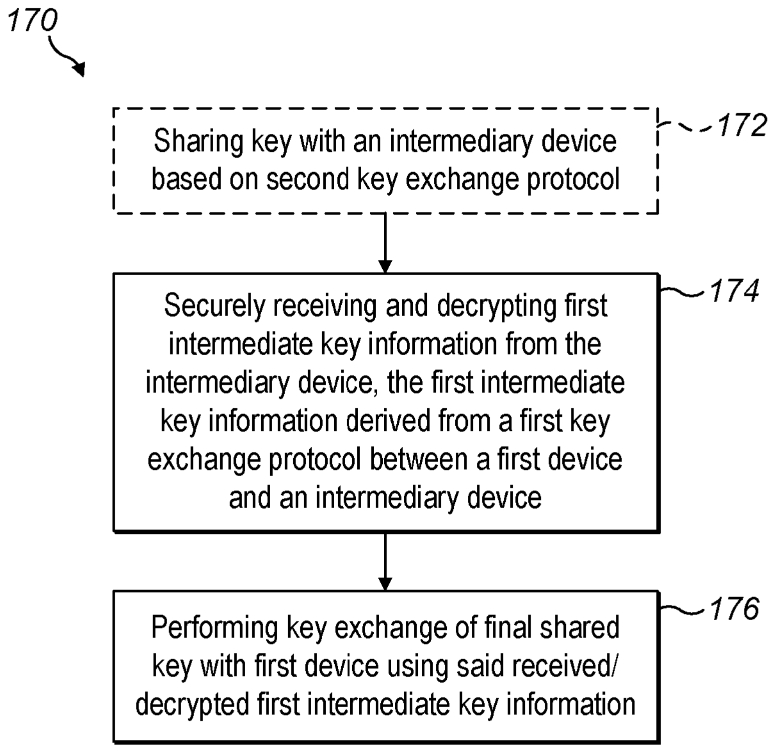
FIG. 1g is a flow diagram illustrating an example second device key exchange process according to the invention.

FIG. 1*g* is a flow diagram illustrating an example second device key exchange process 170 further based on the key exchange process 140, intermediary key exchange process 150, and first device key exchange process 160 and/or key exchange system 100-130 as described with reference to FIGS. 1*a* to 1*f*, and/or as described herein. For simplicity, the reference numerals of FIGS. 1*a* to 1*c* will be referred to for the same and/or similar components and/or features and the like in relation to FIG. 1*g*. The second device key exchange process 170 is performed by the second endpoint device 102*b* in the key exchange system 100, 120, 130 with reference to the first endpoint device 102*a* and the one or more of the intermediary devices 104*a*-104*n*, which, as described with reference to FIGS. 1*a* to 1*c* are connected together via communication links 106*a*, 108*a*-108*m* and 106*b*. The second device key exchange process 170, performed by the second device 102*b*, includes the following steps of:

In step 172, the second device 102*b* shares a first cryptographic key of the second device 102*b* over the communication link 106*b* with its neighbouring and/or adjacent intermediary device in the group of devices 132. If there are more than one intermediary devices in the group of devices 132, then the neighbouring or adjacent intermediary device is the last or N-th intermediary device 104*n* in the group of devices 132 that is connected with the second device 102*b* via communication link 106*b*. The second device 102*b* uses a second key exchange protocol from the set of key exchange protocols to share a key over the communication link 106*b* with intermediary device 104*n*. Otherwise, if the group of devices 132 only includes the first intermediary device 104*a* and the second device 102*b*, then the neighbouring or adjacent device is the first intermediary device 104*a* in the group of devices 132 that is connected with the second device 102*b* via communication link 106*b*. The second device 102*b* uses the second key exchange protocol to share a key over the communication link 106*b* with the first intermediary device 104*a*. Depending on the capabilities of the devices 102*b* and 104*n* (or 104*a*) and the communication link 106*b*, the second key exchange protocol used may be selected (e.g. predetermined or dynamically selected) from the set of key exchange protocols to share the first cryptographic key of the second device 102*b* between these two devices 102*b* and 104*n* (or first intermediary device 104*a*) over the communication link 106*b* therebetween. It is noted that this step may be performed prior to step 174 and/or as a separate one or more key exchanges at another time between the pair of devices 102*b* and 104*n* (or 104*a*). For example, the devices 102*b* and 104*n* (or 104*a*) may perform key management and store a set of paired shared cryptographic keys for future use and the like.

As an option, the first intermediary device 104*a* of the group of devices 132 may send the first shared cryptographic key to the second endpoint device 102*b*, where the second endpoint device 102*b* may accumulate the different cryptographic shared keys from the intermediary devices 104*a*-104*n*. Thus, each intermediary device in the group of devices 132, when securely communicating said first intermediate key information, only encrypts said incoming communications associated with the first intermediate key information with the shared key it sent to the second endpoint device 102*b* before forwarding the encrypted first intermediate key information towards the second endpoint device 102*b* via its nearest neighbour device 104*b*. The encryption of the first intermediate key information, which will be exchanged with the first intermediary device 104*a* in step 154, may be performed using symmetric shared keys using, without limitation, for example an XOR-type operation, a OTP operation(s), and/or any other type of encryption operation for encrypting said first intermediate key information with a shared key, which may be decrypted using the same symmetric shared key and the like. As an option, the shared keys used in the secure communication may be symmetric shared keys enabling the first intermediate key information to be encrypted by the first intermediary device 104*a* for sending securely towards the second device 102*b* via, if any, one or more other intermediary devices 104*b*-104*n*. The symmetric shared keys enable encryption/decryption of the first intermediate key information with the shared key using, without limitation, for example XOR-type operations, and/or one-time-pad operations, and/or any other type of encryption/decryption operations using symmetric keys.

In step 174, securely receiving and decrypting data representative of the exchanged first intermediate key information from the first intermediary device 104*a* via, if any, the one or more intermediary devices 104*b*-104*n* using at least the first shared cryptographic key determined from step 172.

In step 176, once the first intermediate key information is received by the second device 102*b*, performing a key exchange of the final shared key with the first device 102*a* using a further communication link or channel 110 based, at least in part, on performing the first key exchange protocol using the first intermediate key information that was securely sent by the first intermediary device 104*a* and securely received and decrypted by the second device 102*b*.

As an option, the key exchange process for determining the final shared key may involve processing and/or transforming by the first and second devices 102*a* and 102*b* the first intermediate key information using said first key exchange protocol into the final shared key. This key exchange process may include, should the first key exchange protocol be based on a quantum key exchange/distribution protocol, a reconciliation of random symbols between the first and second devices 102*a* and 102*b* using said first intermediate key information to form a common set of symbols, error correction and/or privacy amplification or eavesdropper detection and the like of said common set of symbols, and/or agreeing which symbols (or bits) of the common set of symbols may be used as the final shared key between the first and second devices 102*a* and 102*b*. This key exchange process may include, should the first key exchange protocol be a suitable type of key exchange protocol (e.g. classical or post-quantum key exchange protocol), a reconciliation of random symbols between the first and second devices 102*a* and 102*b* using said first intermediate key information to form a common set of symbols and/or error correction of said common set of symbols, and/or agreeing which symbols (or bits) of the common set of symbols may be used as the final shared key between the first and second devices 102*a* and 102*b*.

The further communication link or channel 110 may be a secure communication link or channel, that is, the further communication link or channel 110 may be secured by one or more previously shared keys between the first and second devices 102*a* and 102*b*, where the previously shared keys are unknown to the intermediary devices 104*a*-104*n*. Thus, the final shared key agreed between the first and second devices 102*a* and 102*b* is known to only these two devices 102*a* and 102*b*. Once the final shared key has been exchanged, the first and second devices 102*a* and 102*b* may use the final shared key for cryptographic operations therebetween and/or secure/encrypted/authenticated communications with each other over one or more communication links communicatively connecting the first and second devices together.

Figure 2A:
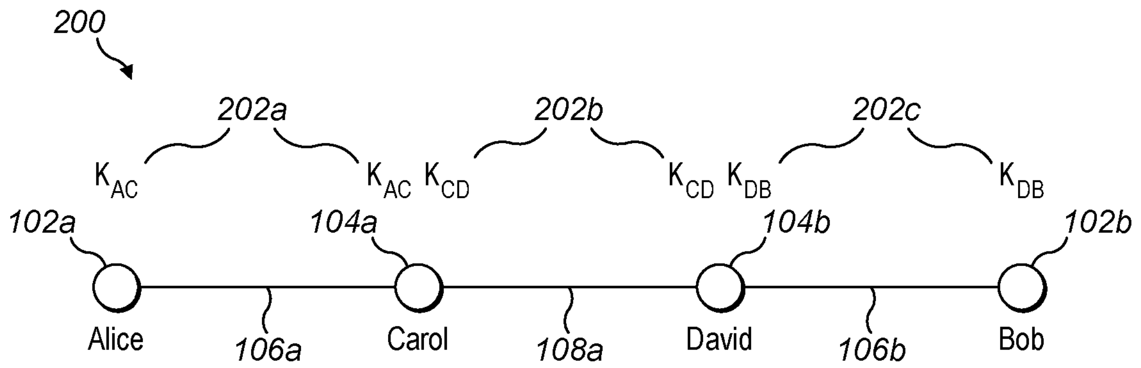
FIG. 2*a* is a schematic diagram illustrating another example key exchange system based on the key exchange system and process(es) of FIGS. 1*a* to 1*h* using classical key exchange protocols according to the invention.

FIG. 2*a* is a schematic diagram illustrating another example key exchange system 200 based on the key exchange systems 100, 120, 130 and process(es) 140, 150, 160, 170 of FIGS. 1*a* to 1*g* in which the first, second and one or more key exchange protocols are classical key exchange protocols. The key exchange systems 100, 120, 130 and process(es) 140, 150, 160, 170 of FIGS. 1*a* to 1*g* are further modified based on key exchange system 200. For simplicity, the reference numerals of FIGS. 1*a* to 1*c* will be referred to for the same and/or similar components and/or features and the like in relation to FIG. 2*a*. The key exchange system 200 includes a first endpoint device 102*a* (e.g. Alice) and a second endpoint device 102*b* (e.g. Bob) in communication with each other via one or more intermediary devices 104*a*-104*b* (e.g. Carol and David) and communication links 106*a*, 108*a* and 106*b* connected therebetween.

In this example, each of the three communication links 106*a*, 108*a* and 106*b* are classical communication links, in which each communication link 106*a*, 108*a* and 106*b* includes a classical channel. The first device 102*a* is connected to intermediary device 104*a* via a first communication link 106*a* of the communication links 106*a*, 108*a*, and 106*b*, the second device 102*b* is similarly connected via a second communication link 106*b* to intermediary device 104*b* and each of the intermediary devices 104*a*-104*b* are connected to each adjacent or neighbouring intermediary device 104*b* and 104*a* via one of the communication links 108*a*. Thus, the first and second devices 102*a* and 102*b* are communicatively coupled to each other via the one or more intermediary devices 104*a*-104*n*. In this example, there are four devices 102*a*, 104*a*, 104*b* and 102*b* and there are three communication links. Although four devices 102*a*, 104*a*, 104*b* and 102*b* are described, this is byway of example only and the invention is not so limited, it is to be appreciated by the skilled person that the key exchange system 200 can be extended to a plurality of intermediary devices 104*a*-104*n* as described in FIG. 1*a*-1*c* and/or reduced to only one intermediary device 104*a* as described in FIG. 1*a*-1*c*.

Thus, the first device 102*a* is communicatively coupled via the communication links 106*a*, 108*a* and 106*b* and intermediary devices 104*a* and 104*b* to the second device 103*b*. Thus, with these communication links 106*a*, 108*a* and 106*b* in place, each of the devices may use a classical key exchange protocol to share a set of secret symbols or random symbols (or bits) with the next adjacent device. For example, first device 102*a* and first intermediary device 104*a* may use a first classical key exchange protocol to share a first set of secret symbols 202*a* (e.g. $K_{AC}$) with each other, which forms first intermediate key information. First intermediary device 104*a* and second intermediary device 104*b* may use the same or another classical key exchange protocol to share a second set of secret symbols 202*b* (e.g. $K_{CD}$) with each other, which may be considered to form a “shared key” therebetween. Finally, second intermediary device (e.g. last or the N-th intermediary device, where N=2) and the second device 102*b* may use a second classical key exchange protocol, which may be the same as the first and said other classical key exchange protocols, to share a third set of secret symbols 202*c* (e.g. $K_{DB}$) with each other, which may be considered to form another shared key therebetween. Now, there is a first set of symbols (e.g. $K_{AC}$), second set of symbols (e.g. $K_{CD}$) and third set of symbols (e.g. $K_{DB}$) that are believed to be secret, and separately shared between the first device 102*a* and the first intermediary device 104*a* (e.g. Alice and Carol), the first intermediary device 104*a* and the second intermediary device 104*b* (e.g. Carol and David), and the second intermediary device 104*b* and the second device 102*b* (e.g. David and Bob), respectively.

Now, the first and second devices 102*a* and 102*b* may perform a further key exchange in which the first and second devices 102*a* and 102*b* and share a final shared key therebetween, but where the secure channel is no longer available to them. In order to do this, the first and second devices 102*a* and 102*b* can use the existing shared sets of symbols 202*a*, 202*b*, and 202*c* to derive a final shared key between the first device 102*a* and the second device 102*b*. The first and second devices 102*a* and 102*b* can also perform this key exchange of the final shared key over an insecure channel, e.g. the classical communication links 106*a*, 108 and 106*b*, whilst remaining certain that any eavesdropper listening in on the communication involved would not gain any information about the final shared key that is eventually shared between the first and second devices 102*a* and 102*b*. As described with reference to FIGS. 1*a* to 1 *h*, this may be achieved by sending the first intermediate key information (e.g. $K_{AC}$) from the first intermediary device 104*a* towards the second device 102*b* using the second and third shared keys 202*b* and 202*c* for securing the communications links 108*a* and 106*b*. Although the first intermediate key information (e.g. $K_{AC}$) may be encrypted using an XOR-type operation, or an OTP type operation or any type of symmetric key encryption operation performed between the first intermediate key information and a shared key or other set of secret symbols and the like, the second device 102*b* may not know the shared key in order to decrypt the first intermediate key information (e.g. $K_{AC}$).

Alternatively or additionally, the first intermediary device 104*a* may encrypt the first intermediate key information (e.g. $K_{AC}$) with the second set of symbols (e.g. $K_{CD}$) shared with the second intermediary device 104*b*, and sends the encrypted first intermediate key information (e.g. (e.g. $K_{AC}$ XOR $K_{CD}$) to the second intermediary device 104*a*. For example, the first intermediary device 104*a* calculates $K_{AC}$ XOR $K_{CD}$, where when the first intermediate key information 202*a* and the second set of symbols 202*b* are bit strings and/or bits or are converted into a bit string/bits, then a bitwise XOR may be performed in which XOR on a pair of bits has its standard meaning of: 0 XOR 0=0; 0 XOR 1=1; 1 XOR 0=1; and 1 XOR 1=0. Although the bitwise XOR operation is described herein, this is byway of example only and the invention is not so limited, the person skilled in the art would understand that any other type of symmetric encryption operation may be performed such as, without limitation, for example XOR-type operations performed on symbols, bitwise One-Time-Pad operations, and/or symbol wise OTP operations, and/or any suitable type of cryptographic operation may be used.

The second intermediary device 104*a*, may use the second set of symbols (e.g. $K_{CD}$) shared with the first intermediary device 104*a* to decrypt the received encrypted first intermediate key information (e.g. ($K_{AC}$ XOR $K_{CD}$) XOR $K_{CD}$=$K_{AC}$), to retrieve the first intermediate key information (e.g. $K_{AC}$). The second intermediate device 104*b* then re-encrypts the first intermediate key information (e.g. $K_{AC}$) with the third set of symbols 202*c* (e.g. $K_{DB}$) to form re-encrypted first intermediate key information (e.g. $K_{AC}$ XOR $K_{DB}$), and sends the re-encrypted first intermediate key information (e.g. $K_{AC}$ XOR $K_{DB}$) to the second device 102*b*. The second device 102*b* decrypts the received re-encrypted first intermediate key information using the third set of symbols (e.g. $K_{DB}$) shared with the second intermediary device 102*b* (e.g. ($K_{AC}$ XOR $K_{DB}$) XOR $K_{DB}$=$K_{AC}$), to retrieve the first intermediate key information (e.g. $K_{AC}$). Now, the first and second device 102*a* and 102*b* have the same set of key information (e.g. $K_{AC}$) and may form a final shared key using this same set of key information (e.g. $K_{AC}$). In the simplest case, the first and second devices 102*a* and 102*b* may simply use the first intermediate key information (e.g. $K_{AC}$) as the final shared key therebetween. However, the downside to encrypting/decrypting the first intermediate key information (e.g. $K_{AC}$) at each other intermediary device 102*b* downstream of the first intermediary device 104*a*, is that the first intermediate key information (e.g. $K_{AC}$) is revealed to said each intermediary device **104*b***. As well, multiple encryption/decryption operations are required to be performed on the first intermediate key information (e.g. $K_{AC}$).

Another approach may be used according to the invention, where the first intermediary device **104*a* (e.g. Carol), which exchanged the first intermediate key information (e.g. $K_{AC}$) with the first device 102*a* (e.g. Alice), encrypts the first intermediate key information (e.g. $K_{AC}$) with the second set of symbols 202*b* (e.g. $K_{CD}$ or second shared key) shared with the second intermediary device 104*b* (e.g. David) using, without limitation, for example an XOR-type operation (e.g. $K_{AC}$ XOR $K_{CD}$). That is, the first intermediary device 104*a* encrypts the first intermediate key information 202*a* (e.g. $K_{AC}$) with the second set of symbols (e.g. $K_{CD}$) shared with the adjacent intermediary device 104*b*. The remaining intermediary devices 104*b* in the communication path (e.g. intermediary devices connected to communication links 108*a* and 106*b*) to the second device 102*b* use the shared keys they shared with their neighbouring or adjacent devices (e.g. $K_{CD}$, $K_{DB}$) and send towards the second device 102*b* an XOR of their two shared keys (e.g. $K_{CD}$ XOR $K_{DB}$) whilst also passing through the encrypted first intermediate key information (e.g. $K_{AC}$ XOR $K_{CD}$). Thus, the second device 102*a* accumulates a set of XOR'ed shared keys (e.g. $K_{CD}$ XOR $K_{DB}$) from those intermediary devices 104*b* other than the first intermediary device 104*a* and receives the encrypted first intermediate key information (e.g. $K_{AC}$ XOR $K_{CD}$) from intermediary device 104*a* and passed through via those other intermediary devices 104*b*. Thus, the second device 102*b* may perform XOR operation(s) based on XORing together the following: a) all of the received XOR'd shared keys (e.g. $K_{CD}$ XOR $K_{DB}$); b) the received encrypted first intermediate device information (e.g. $K_{AC}$ XOR $K_{CD}$); and c) the third set of symbols 202*c* (e.g. $K_{DB}$) that the second device 102*b* shared with the N-th intermediary device 104*b*. In this example, the second device 102*b* calculates (($K_{AC}$ XOR $K_{CD}$) XOR ($K_{CD}$ XOR $K_{DB}$)) XOR $K_{DB}$. Since the only information that appears once is the first intermediate key information (e.g. $K_{AC}$) and not twice in the calculated string of XORs, this means that the second device 102*b* has retrieved/decrypted the first intermediate key information (e.g. $K_{AC}$). The effect of XORing the same set of symbols twice is equivalent to multiplying by "1", so the overall result of this XORing calculation is the first intermediate key information (e.g. $K_{AC}$). Thus, in this case, both the first device and the second device now know the value of the first intermediate key information (e.g. $K_{AC}$) and, in essence, $K_{AC}$ may be the final shared key between the first and second endpoint devices 102*a* and 102*b***.

Note that neither intermediary devices **104*a* and 104*b* will gain any additional information about the secret shared final key by only carrying out their XOR calculations. In fact, intermediary device 104*a* already knows the value of the first intermediate key information (e.g. $K_{AC}$) since they shared it or exchanged it with the first device 102*b* during the initial stage of the key exchange protocol 200. Furthermore, intermediary device 104*b* will still not know the value of the first intermediate key information (e.g. $K_{AC}$), even if they know the results of both the XOR calculations. Likewise, if an eavesdropper were listening in on the transmissions in which intermediary devices 104*a* and 104*b*** communicated the results of their XOR calculations, this would not provide the eavesdropper with any information about any of the shared secret keys and/or first intermediate key information (e.g. $K_{AC}$).

A further approach may be used according to the invention, where the first intermediary device **104*a* (e.g. Carol), which exchanged the first intermediate key information (e.g. $K_{AC}$) with the first device 102*a* (e.g. Alice), encrypts the first intermediate key information (e.g. $K_{AC}$) with the second set of symbols 202*b* (e.g. $K_{CD}$ or second shared key) shared with the second intermediary device 104*b* (e.g. David) using, without limitation, for example an XOR-type operation (e.g. $K_{AC}$ XOR $K_{CD}$). That is, the first intermediary device 104*a* encrypts the first intermediate key information 202*a* (e.g. $K_{AC}$) with the second set of symbols (e.g. $K_{CD}$) shared with the adjacent intermediary device 104*b*. The remaining intermediary devices 104*b* in the communication path (e.g. intermediary devices connected to communication links 108*a* and 106*b*) to the second device 102*b* combine their shared keys that they shared with their neighbouring or adjacent devices 104*a* and 102*b* (e.g. $K_{CD}$, $K_{DB}$) with an XOR operation to generate a new combined shared key (e.g. $K_{CD}$ XOR $K_{DB}$), which is used to further encrypt the received encrypted first intermediate key information (e.g. $K_{AC}$ XOR $K_{CD}$). When the encrypted first intermediate key information (e.g. $K_{AC}$ XOR $K_{CD}$) is received by a remaining intermediary device 104*b*, it further encrypts the encrypted first intermediate key information (e.g. $K_{AC}$ XOR $K_{CD}$) by XORing with the new combined shared key (e.g. $K_{CD}$ XOR $K_{DB}$), and then passes through the further encrypted first intermediate key information (e.g. ($K_{AC}$ XOR $K_{CD}$) XOR ($K_{CD}$ XOR $K_{DB}$)) by sending on towards, if any, the adjacent or neighbouring device in the direction of the second device 102*b*, which in this example, is second device 102*b***.

Thus, the second device **102*a* receives the further encrypted first intermediate key information (e.g. [($K_{AC}$ XOR $K_{CD}$) XOR ($K_{CD}$ XOR $K_{DB}$)]), which has been encrypted multiple times by combined pairwise shared keys as it passes through each intermediary device 104*b* other than the first intermediary device 104*a*. The second device 102*b* may then simply decrypt and retrieve the first intermediate key information from the further encrypted first intermediate key information (e.g. [($K_{AC}$ XOR $K_{CD}$) XOR ($K_{CD}$ XOR $K_{DB}$)]) by XORing it with the third set of symbols 202*c* (e.g. $K_{DB}$) that the second device 102*b* shared with the N-th intermediary device 104*b*. In this example, the second device 102*b* calculates [$K_{AC}$ XOR $K_{CD}$) XOR ($K_{CD}$ XOR $K_{DB}$)] XOR $K_{DB}$. Since the only information that appears once is the first intermediate key information (e.g. $K_{AC}$) and not twice in the calculated string of XORs, this means that the second device 102*b* has retrieved/decrypted the first intermediate key information (e.g. $K_{AC}$). Thus, in this case, both the first device and the second device now know the value of the first intermediate key information (e.g. $K_{AC}$) and, in essence, $K_{AC}$ may be the final shared key between the first and second endpoint devices 102*a* and 102*b***.

Note that neither intermediary devices **104*a* and 104*b* will gain any additional information about the secret shared final key by only carrying out their XOR calculations. In fact, intermediary device 104*a* already knows the value of the first intermediate key information (e.g. $K_{AC}$) since they shared it or exchanged it with the first device 102*b* during the initial stage of the key exchange protocol 200. Furthermore, intermediary device 104*b* will still not know the value of the first intermediate key information (e.g. $K_{AC}$), unless they have knowledge of the result of the intermediary device's 104*a* XOR calculation(s). Likewise, if an eavesdropper were listening in on the transmissions in which intermediary devices 104*a* and 104*b*** communicated the results of their XOR calculations, this would not provide the eavesdropper with any information about any of the shared secret keys and/or first intermediate key information (e.g. $K_{AC}$).

Although this fully classical linking and chaining scheme/protocol is simple to implement, it requires the use of classical channels to carry out the initial distribution of the first intermediate device information 202*a* and the shared keys 202*b* and 202*c*, and, in contrast to the use of quantum channels, there is no fundamental guarantee that an eavesdropper gaining information about the first intermediate key information, or the second and third sets of symbols 202*b* and 202*c* during this initial stage will be detected. Furthermore, the key exchange system 200 also requires that the first intermediary device 104*a* is a trusted node, because the first intermediary device 104*a* will fully know the first set of secret symbols 202*a* (e.g. $K_{AC}$), also referred to as the first intermediate key information, that it exchanged with the first device 102*a* and which was eventually shared between the first device 102*a* and the second device 102*b*. These limitations can be overcome by either: a) using a fully quantum protocol, or b) a hybrid classical-quantum approach.

Figure 2B:
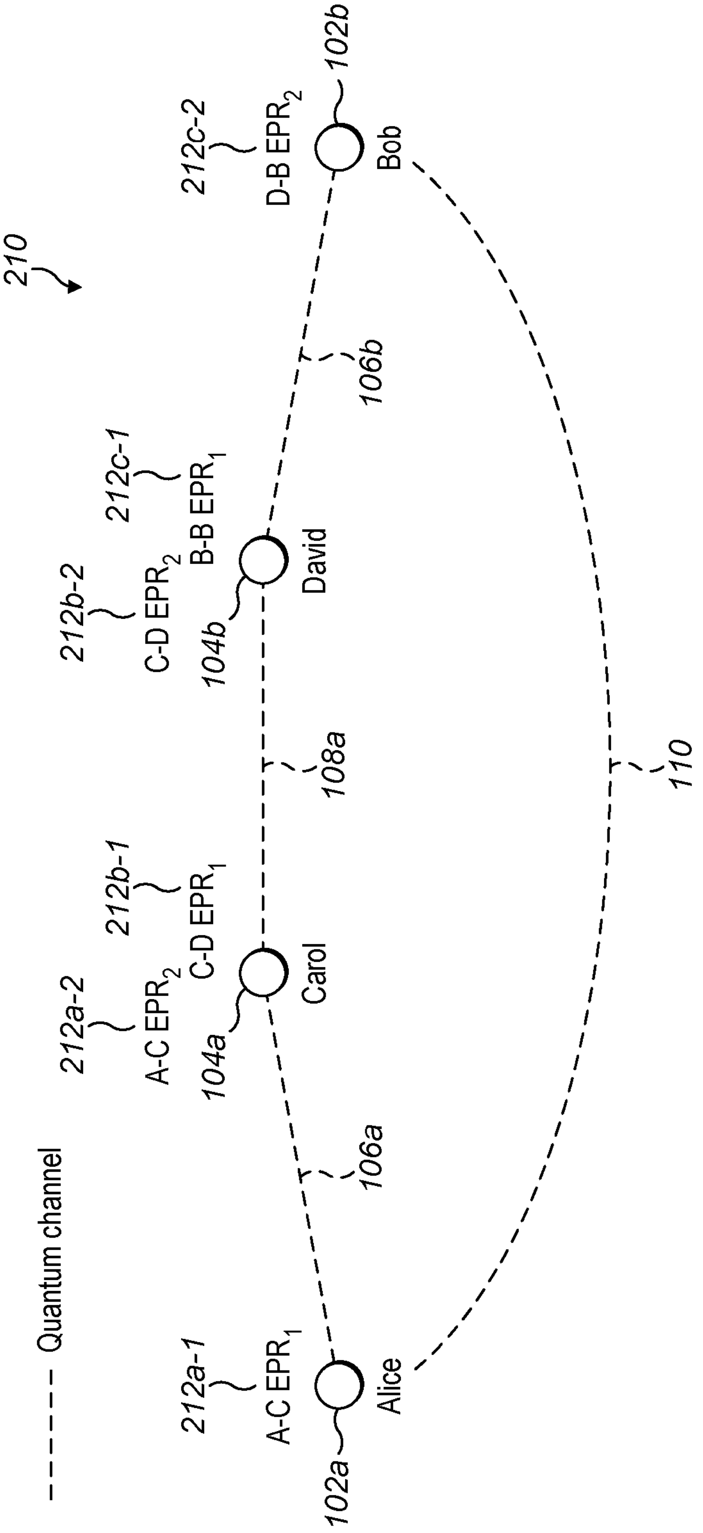
FIG. 2*b* is a schematic diagram illustrating a further example key exchange system based on the key exchange system and process(es) of FIGS. 1*a* to 1*h* using a quantum key exchange protocol according to the invention.

FIG. 2*b* is a schematic diagram illustrating another example key exchange system 210 based on the key exchange systems 100, 120, 130 and process(es) 140, 150, 160, 170 of FIGS. 1*a* to 1*g* in which the first, second and one or more key exchange protocols are quantum-based key exchange protocols. The key exchange systems 100, 120, 130, 200 and process(es) 140, 150, 160, 170 described in FIGS. 1*a* to 1*g* and 2*a* are further modified based on key exchange system 210 being implemented using entanglement-based quantum key exchange/protocol(s) and the like. For simplicity, the reference numerals of FIGS. 1*a* to 1*c* will be referred to for the same and/or similar components and/or features and the like in relation to FIG. 2*b*. The key exchange system 210 includes a first endpoint device 102*a* (e.g. Alice) and a second endpoint device 102*b* (e.g. Bob) in communication with each other via one or more intermediary devices 104*a*-104*b* (e.g. Carol and David) and communication links 106*a*, 108*a* and 106*b* connected therebetween.

In this example, each of the three communication links 106*a*, 108*a* and 106*b* are quantum communication links (e.g. indicated by the dashed lines), in which each quantum communication link 106*a*, 108*a* and 106*b* includes a quantum channel connecting between the devices. Thus, each device 102*a*, 104*a*, 104*b* and 102*b* has the required quantum hardware/technology and/or quantum transmitter/receiver structures for being able to perform one or more types of quantum key exchange/distribution protocol(s) as described herein, modifications thereto, combinations thereof and/or as the application demands. The first device 102*a* is connected via a first quantum channel to intermediary device 104*a* via a first quantum communication link 106*a* of the quantum communication links 106*a*, 108*a*, and 106*b*, the second device 102*b* is similarly connected via a second quantum channel of the second quantum communication link 106*b* to intermediary device 104*b* and each of the intermediary devices 104*a*-104*b* are connected to each adjacent or neighbouring intermediary device 104*b* and 104*a* via a quantum channel of one of the quantum communication links 108*a* therebetween. Thus, the first and second devices 102*a* and 102*b* are communicatively coupled to each other via the one or more intermediary devices 104*a*-104*n*. In this example, there are four devices 102*a*, 104*a*, 104*b* and 102*b* and there are three quantum communication links. Although four devices 102*a*, 104*a*, 104*b* and 102*b* are described, this is byway of example only and the invention is not so limited, it is to be appreciated by the skilled person that the key exchange system 210 can be extended to a plurality of intermediary devices 104*a*-104*n* as described in FIG. 1*a*-1*c* and/or reduced to only one intermediary device 104*a* as described in FIG. 1*a*-1*c*.

In this key exchange system 210, a entanglement-based quantum key exchange/distribution is performed. Thus, the first device 102*a* is communicatively coupled via the quantum communication links 106*a*, 108*a* and 106*b* and intermediary devices 104*a* and 104*b* to the second device 102*b*. With these quantum communication links 106*a*, 108*a* and 106*b* in place, each of the devices may use a quantum key exchange/distribution protocol that only uses quantum channels to share a set of secret symbols or random symbols (or bits) with the next adjacent device. The key exchange system 210 using entanglement-based quantum key exchange/distribution further modifies the key exchange systems 100, 120, 130 and/or 200 by performing a two-way chaining procedure in which two intermediate key information exchanges are performed and the shared key pair information exchanges between intermediary device 104*a* and 104*b* and the first and second devices 102*a* and 102*b* are performed. For example, a first intermediate key information exchange is performed between the first device 102*a* and first intermediary device 104*a*, a second intermediate key information exchange between the second device 102*b* and the N-th or last intermediary device 104*b* (or in this example the second intermediary device 104*b*). In which the results of the first and second intermediate key information exchanges are "encrypted" and securely sent in a quantum manner to the first and second devices 102*a* and 102*b*, respectively. Furthermore, the first intermediary device 104*a* perform a first and second shared key pair exchange with the second intermediary device 104*b*, in which each first and second shared key of the pair is used to "encrypt" the first and second intermediate key information in which the results are securely sent in a quantum manner to the first device 102*a* and second device 102*b*, respectively. Thereafter, the first device 102*a* and second device 102*b* performed a further key exchange based on the first and second intermediate key information and the first and second shared key information to form a final shared key therebetween.

For this key exchange system 210, the entanglement-based quantum key exchange/distribution is performed in which the secret symbols or random symbols (or bits) and XOR calculations as described with reference to FIG. 2*a* are replaced by shared entanglements, or EPR pairs, and Bell State Measurements (BSMs), respectively. The basic unit of entanglement is an EPR pair, or 1 ebit. An EPR pair consists of two separated particles—typically photons, embodying—typically via their polarizations—a combined quantum state with a specific kind of non-classical correlation. An EPR pair is an example of a maximally entangled state, of which in this example for two-particle two-dimensional states, such as those captured by photon polarization, there are four in total. A BSM measurement on two two-dimensional quantum systems will project them randomly onto one of these four maximally entangled states. Thus, the key exchange process (a two-way chaining protocol) for this quantum key exchange system 210, BSMs are used as part of an entanglement swapping process.

In this example, for simplicity and to illustrate the application of entanglement-based quantum key exchange/distribution to the key exchange system according to the invention, only 3 EPR pairs are distributed using a entanglement quantum protocol between the first device 102*a* and the first intermediary device 104*a*, the first intermediary device 104*a* and the second intermediary device 104*b*, and the second intermediary device 104*b* and the second device 102*b*. In order to do this, each of the communication links 106*a*, 108*a*, and 106*b* has a quantum channel, which is depicted by the dashed lines. The first EPR pair (or A-C EPR pair) is denoted as A-C EPR 212*a*-1 and A-C EPR 212*a*-2, in which the A-C EPR 212*a*-2 may represent the first intermediate key information exchanged between the first device 102*a* and the first intermediary device 104*a*. The second EPR pair (or C-D EPR pair) is denoted C-D EPR 212*b*-1 and 212*b*-2, which may represent a shared key pair exchanged between the first intermediary device 104*a* and the second intermediary device 104*b*. The third EPR pair (or D-B EPR pair) is denoted D-B EPR 212*c*-1 and 212*c*-2, in which the D-B EPR 212*c*-1 may represent the second intermediate key information exchanged between the second device 102*b* and the second intermediary device 104*b*. Once the EPR pairs have been distributed/exchanged between the first device 102*a* and first intermediary device 104*a*, first intermediary device 104*a* and second intermediary device 104*b*, and second device 102*b* and second intermediary device 104*b* by the entanglement protocol, the first intermediary device 104*a* performs an "entanglement" encryption of the first intermediate key information A-C EPR 212*b*-2 by carrying out a BSM (e.g. entanglement quantum version of a classical XOR) on the two particles in its possession, which is its half of the A-C EPR pair, namely, A-C EPR 212*a*-2 (e.g. the first intermediate device information represented by A-C EPR 212*a*-2) together with its half of the B-C EPR pair, which is B-C EPR 212*b*-1 and represents, crudely, a first shared key of the shared key pair with the second intermediary device 104*b*. Similarly, the second intermediary device 104*b* performs an "entanglement" encryption of the second intermediate key information D-B EPR 212*c*-1 by carrying out a BSM (e.g. entanglement quantum version of a classical XOR) on the two particles in its possession, which is its half of the D-B EPR pair and is D-B EPR 212*c*-1 (e.g. the second intermediate device information represented by D-B EPR 212*c*-1) together with its half of the B-C EPR pair, which is B-C EPR 212*b*-2 and represents its part of the shared key pair with the first intermediary device 104*a*. Each of these BSMs has 4 possible outcomes, and so the result of each of them can be represented by 2 (classical) bits. Given this, the first intermediary device 104*a* and second intermediary device 104*b* communicate their 2 bits representing their BSM outcomes to both the first and second devices 102*a* and 102*b*. Depending on the 2 bits received, the first and second devices 102*a* and 102*b* each carry out one of 4 possible deterministic operations on the particles in their possession. Following this, the first and second device 102*a* and 102*b* will share an EPR pair. The overall process just outlined can be described as (double) entanglement swapping (which in turn can be described as an example of quantum teleportation). The initial maximal entanglement between the first device 102*a* and second device 102*b* (one particle at each), between the first intermediary device 104*a* and the second intermediary device 104*b* (one particle at each), and between the second intermediary device 104*b* and the second device 102*b* (one particle at each) has been converted to maximal entanglement between the two particles at the first intermediary device 104*a*, between the two particles at the second intermediary device 104*b*, and between the first and second devices 102*a* and 102*b* (one particle at each).

The EPR pair that the first and second devices 102*a* and 102*b* now possess will enable them to perform a key exchange and determine a final shared key (albeit 1 secret bit in this example) by generating a shared secret bit, at anytime (in principle) of their choosing, by carrying out a measurement on their particles (with both of them using the same measurement basis). If they repeat this EPR process a number of times with a series of EPR pairs obtained by chaining in the same way as described above, they will be able share a longer final shared key and also detect if there was any eavesdropping on the quantum channels of the quantum communication links 106*a*, 108*a* and 106*b* used to distribute the EPR pairs by carrying out a simple test. In addition, neither the first intermediary device 104*a* and the second intermediary device 104*b* will have any knowledge of the secret bits shared by the first and second devices 102*a* and 102*b* and so can be considered trustless without compromising the security of the scheme. Thus, it can be seen that this fully quantum scheme does not have the same limitations associated with the fully classical scheme described with reference to FIG. 2*a* in terms of security and detecting eavesdroppers. However, fully quantum chaining protocols based on entanglement-based quantum protocols face severe challenges with regard to practical implementation, which require reliable quantum memory and reliable BSM implementation. That said, the key exchange systems and process(es) as described herein may be further modified based on hybrid quantum-classical key exchange protocols as described in FIGS. 2*c* and 2*d* that may achieve improved security and eavesdropper detection whilst also overcoming the need for fully-trusted intermediary devices and the like and being commercially viable.

Figure 2C:
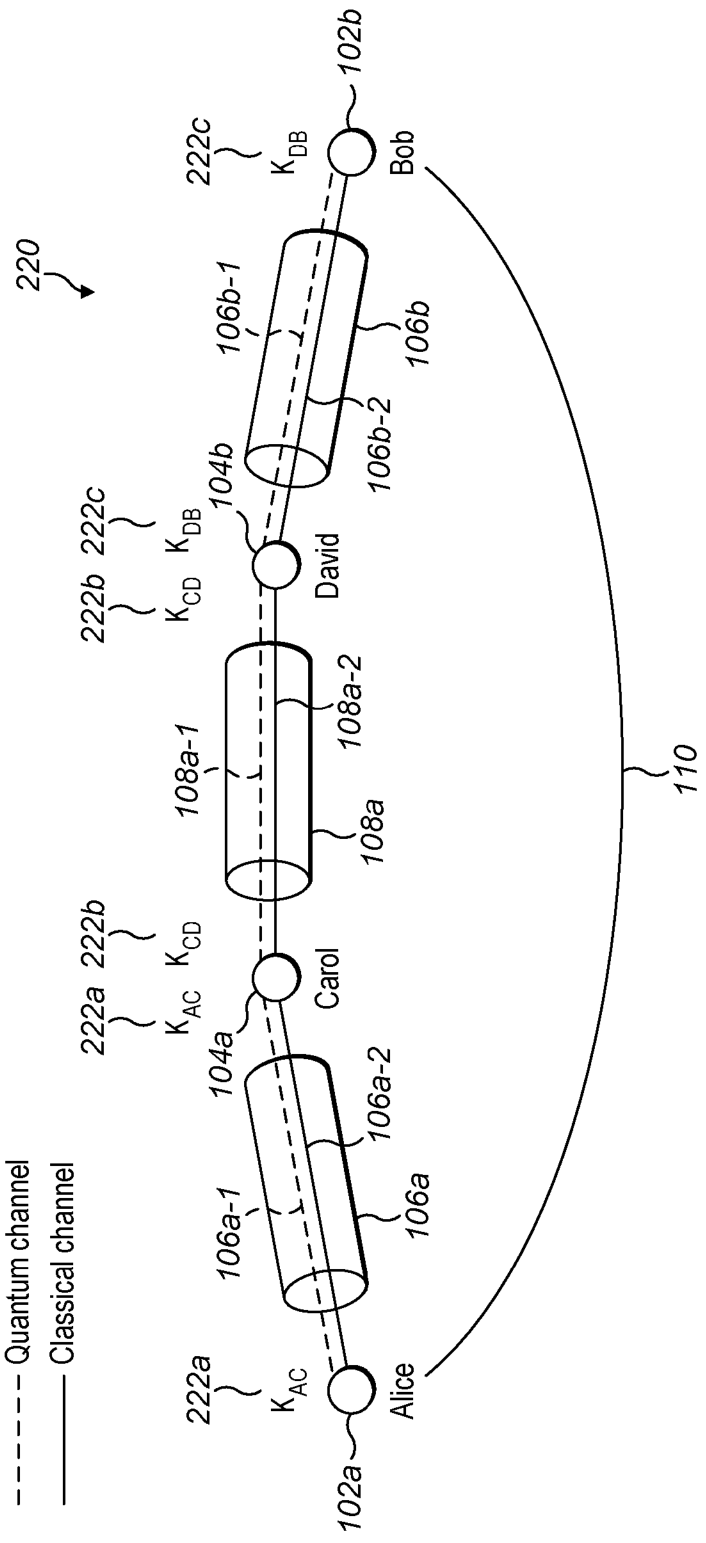
FIG. 2*c* is a schematic diagram illustrating a further example key exchange system based on the key exchange system and process(es) of FIGS. 1*a* to 1*h* using a hybrid quantum key exchange protocols according to the invention.

FIG. 2*c* is a schematic diagram illustrating another example key exchange system 220 based on the key exchange systems 100, 120, 130, 200 and process(es) 140, 150, 160, 170 of FIGS. 1*a* to 1*g* and 2*a* in which the first, second and one or more key exchange protocols are classical key exchange protocols. The key exchange systems 100, 120, 130, 200 and process(es) 140, 150, 160, 170 described in FIGS. 1*a* to 1*g* and 2*a* are further modified based on key exchange system 220. For simplicity, the reference numerals of FIGS. 1*a* to 1*c* will be referred to for the same and/or similar components and/or features and the like in relation to FIG. 2*c*. The key exchange system 220 includes a first endpoint device 102*a* (e.g. Alice) and a second endpoint device 102*b* (e.g. Bob) in communication with each other via one or more intermediary devices 104*a*-104*b* (e.g. Carol and David) and communication links 106*a*, 108*a* and 106*b* connected therebetween.

In this example, each of the three communication links 106*a*, 108*a* and 106*b* are hybrid quantum-classical communication links with quantum channels, indicated by the dashed lines, and classical channels (indicated by solid lines). Each communication link 106*a*, 108*a* and 106*b* includes a quantum channel and a classical channel connecting between the devices. Thus, each device 102*a*, 104*a*, 104*b* and 102*b* has the required quantum hardware/technology and/or quantum transmitter/receiver structures as well as the required classical hardware/technology and/or classical transceivers and the like for being able to perform one or more types of quantum key exchange/distribution protocol(s) using the quantum channels and classical channels as described herein, modifications thereto, combinations thereof and/or as the application demands. The first device 102*a* is connected via a first quantum channel 106*a*-1 and a first classical channel 106*a*-2 to intermediary device 104*a* via a first communication link 106*a*, the second device 102*b* is similarly connected via a second quantum channel 106*b*-1 and a second classical channel 106*b*-2 of the second communication link 106*b* to intermediary device 104*b*, and each of the intermediary devices 104*a*-104*b* are connected to each adjacent or neighbouring intermediary device 104*b* and 104*a* via a quantum channel 108*a*-1 and a classical channel 108*a*-2 of one of the communication links 108*a* therebetween. Thus, the first and second devices 102*a* and 102*b* are communicatively coupled to each other via the one or more intermediary devices 104*a*-104*n* and communication links 106*a*, 108*a*, and 106*b* therebetween. As an option, the first and second devices 102*a* and 102*b* may also be connected via a further communication link 110, which may be a classical channel that the first and second devices secure using one or more previously exchanged cryptographic keys and the like. This may enable the first and second devices 102*a* and 102*b* to agree on a final shared key independently of the intermediary devices 104*a* and 104*b*, and/or to prevent the intermediary devices 104*a* and 104*b* from eavesdropping on the final key exchange between the first and second devices 102*a* and 102*b*. In this example, there are four devices 102*a*, 104*a*, 104*b* and 102*b* and there are three communication links. Although four devices 102*a*, 104*a*, 104*b* and 102*b* are described, this is by way of example only and the invention is not so limited, it is to be appreciated by the skilled person that the key exchange system 220 can be extended to a plurality of intermediary devices 104*a*-104*n* as described in FIG. 1*a*-1*c* and/or reduced to only one intermediary device 104*a* as described in FIG. 1*a*-1*c* as the application demands.

In this key exchange system 220, one or more hybrid quantum-classical key exchange protocol(s) may be used from the set of key exchange protocols. Although in this example the BB84 Quantum Key Distribution (QKD) scheme is described, this is byway of example only and the invention is not so limited, it is to be appreciated by the skilled person that any other suitable quantum key distribution protocol that makes use of a quantum channel and a classical channel over a communication link between devices may be used. The hybrid quantum-classical key exchange protocols offer a compromise: unlike the fully classical scheme as described with reference to FIG. 2*a*, hybrid quantum-classical schemes provide guaranteed eavesdropper detection and, with several modifications to the BB84 key exchange, can also weaken the requirement for a trusted intermediary nodes to be a requirement of the key exchange system 220, and, unlike the fully quantum scheme as described with reference to FIG. 2*b*, such hybrid quantum-classical schemes may be implemented with current technology.

For the BB84-based key exchange system 220, standard BB84 protocol key exchange processes are carried out between pairs of devices for exchanging shared keys and/or intermediate key information therebetween. For example, a first BB84 key exchange protocol is used over the first communication link 106*a* between the first device 102*a* and the first intermediary device 104*a* to exchange a first set of symbols 222*a* (or random/secret symbols/bits) therebetween, which may be referred to as the first intermediate key information 222*a* (e.g. $K_{AC}$). A second BB84 key exchange protocol is used over the intermediary communication link 108*a* between the first intermediary device 104*a* and the second intermediary device 104*b* to exchange a second set of symbols 222*b* therebetween, which may be referred to as a shared key 222*b* (e.g. $K_{CD}$). A third BB84 key exchange protocol is used over the second communication link 106*b* between the second device 102*b* and the N-th or last intermediary device 104*b* to exchange a third set of symbols 222*c* therebetween, which may be referred to as a second shared key 222*c* (e.g. $K_{DB}$). Thus, each pair of devices shares a set of symbols (e.g. a series of secret bits/symbols). As part of each of the first, second and third BB84 exchange processes, each respective pair of devices can carry out eavesdropping tests, which provide a guarantee that no eavesdropper trying to gain information about the first, second and third sets of symbols 222*a*, 222*b* and 222*c* that have been shared between corresponding devices 102*a* and 104*a*, 104*a* and 104*b*, and 104*b* and 102*b* will be able to escape detection. In this example, once all three pairs of sets of symbols have been exchanged and the devices 102*a*, 104*a*, 104*b* and 102*b* have confirmed that their shared bits are indeed secret, the methodology performed in key exchange system 200 described in FIG. 2*a* may be used to perform a key exchange of a final shared key between the first and second devices 102*a* and 102*b*. In other words, both the first and second intermediary devices 104*a* and 104*b* carry out XOR calculations on the sets of symbols in their possession. For example, the first intermediary device 104*a* performs an XOR calculation on the first set of symbols 222*a*, which represents first intermediate key information, and the second set of symbols 222*b*, which is the shared key between the first and second intermediary devices 104*a* and 104*b*. The second intermediary device 104*b* performs an XOR calculation on the second set of symbols 222*b* and the third set of symbols 222*c*, which is the second shared key with the second device 102*b*. Both of the intermediary devices 104*a* and 104*b* then communicates the results of these calculations to the second device 102*b*. Note, these calculations are effectively encryption of the first set of symbols 222*a* (e.g. $K_{AC}$ or the first intermediate key information), the second set of symbols 222*b* (e.g. $K_{CD}$) and the third set of symbols 222*c* (e.g. $K_{DB}$) as an eavesdropper cannot decipher either the first set of symbols, second set of symbols or the third set of symbols from these results. The second device 102*b*, then calculates the XOR of these results, and then finally XORs the outcome of this last calculation with the third set of symbols/bits (e.g. $K_{DB}$) in their possession, which decrypts the first intermediate key information (or the first set of symbols) 222*a* from the received results as described with reference to FIG. 2*a*. Once the second device 102*b* has retrieved the first intermediate key information 222*a*, both the first and second devices 102*a* and 102*b* may perform a key exchange for determining a final shared key therebetween, where the first intermediate key information 222*a* is used to form the final shared key. The first and second devices 102*a* and 102*b* may perform a form of reconciliation and/or privacy amplification/eavesdropper detection to determine those symbols of the first intermediate key information that have been eavesdropped and to discard these symbols to form the final shared key.

Although the hybrid BB84-based key exchange system 220 may be able to detect eavesdroppers due to the use of the quantum channels of the communication links 106*a*, 108*a*, and 106*b*, just as with the fully classical key exchange system 200 of FIG. 2*a*, the hybrid BB84-based key exchange system still requires that the first intermediary device is a trusted node, because the intermediary device has access to the first intermediate key information, which is exactly the same as the first set of symbols (e.g. $K_{AC}$) located at the first device 102*a*, so the intermediary device 104*a* knows the final shared key that the first and second devices 102*a* and 102*b* shares with each other. That said, unlike the fully classical key exchange system 200 of FIG. 2*a*, the key exchange system 220 using the BB84-based protocol has the advantage of offering a guarantee of eavesdropper detectability.

Figure 2D:
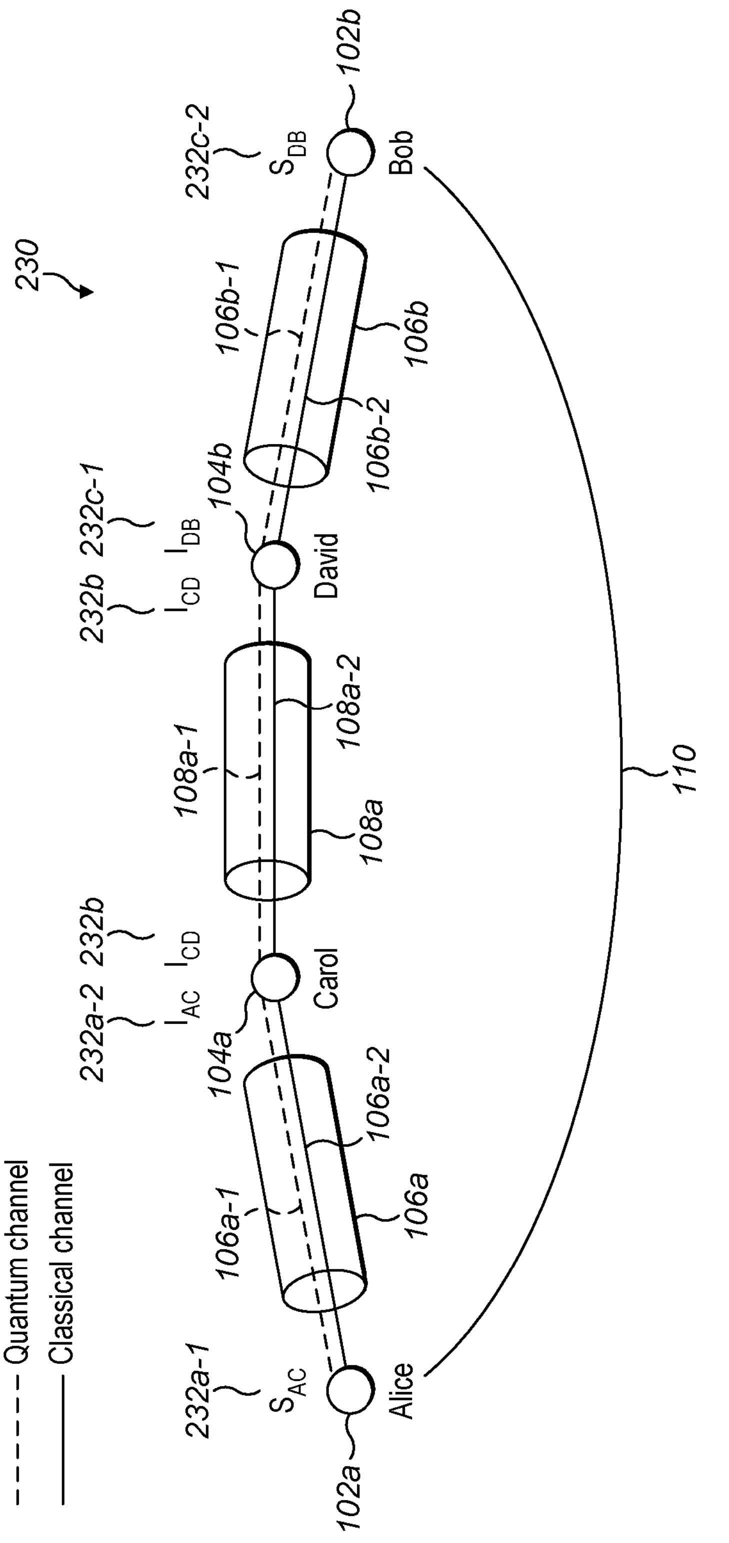
FIG. 2*d* is a schematic diagram illustrating another example key exchange system based on the key exchange system and process(es) of FIGS. 1*a* to 1*h* using a hybrid quantum key exchange protocols according to the invention.

FIG. 2*d* is a schematic diagram illustrating another example key exchange system 230 based on the key exchange systems 100, 120, 130, 200, 220 and process(es)

140, 150, 160, 170 of FIGS. 1*a* to 1*g* and 2*a* to 2*c* in which the first, second and one or more key exchange protocols are hybrid-quantum-classical key exchange protocols. The key exchange systems 100, 120, 130, 200, 220 and process(es) 140, 150, 160, 170 described in FIGS. 1*a* to 1*g* and 2*a* to 2*c* are further modified based on key exchange system 230. For simplicity, the reference numerals of FIGS. 1*a* to 1*c* will be referred to for the same and/or similar components and/or features and the like in relation to FIG. 2*d*. The key exchange system 230 includes a first endpoint device 102*a* (e.g. Alice) and a second endpoint device 102*b* (e.g. Bob) in communication with each other via one or more intermediary devices 104*a*-104*b* (e.g. Carol and David) and communication links 106*a*, 108*a* and 106*b* connected therebetween.

In this example, each of the three communication links 106*a*, 108*a* and 106*b* are hybrid quantum-classical communication links with quantum channels, indicated by the dashed lines, and classical channels (indicated by solid lines). Each communication link 106*a*, 108*a* and 106*b* includes a quantum channel and a classical channel connecting between the devices. Thus, each device 102*a*, 104*a*, 104*b* and 102*b* has the required quantum hardware/technology and/or quantum transmitter/receiver structures as well as the required classical hardware/technology and/or classical transceivers and the like for being able to perform one or more types of quantum key exchange/distribution protocol(s) using the quantum channels and classical channels as described herein, modifications thereto, combinations thereof and/or as the application demands. The first device 102*a* is connected via a first quantum channel 106*a*-1 and a first classical channel 106*a*-2 to intermediary device 104*a* via a first communication link 106*a*, the second device 102*b* is similarly connected via a second quantum channel 106*b*-1 and a second classical channel 106*b*-2 of the second communication link 106*b* to intermediary device 104*b*, and each of the intermediary devices 104*a*-104*b* are connected to each adjacent or neighbouring intermediary device 104*b* and 104*a* via a quantum channel 108*a*-1 and a classical channel 108*a*-2 of one of the communication links 108*a* therebetween. Thus, the first and second devices 102*a* and 102*b* are communicatively coupled to each other via the one or more intermediary devices 104*a*-104*n* and communication links 106*a*, 108*a*, and 106*b* therebetween. Furthermore, the first and second devices 102*a* and 102*b* may also be connected via a further communication link 110, which may be a classical channel that the first and second devices secure using one or more previously exchanged cryptographic keys and the like. This may enable the first and second devices 102*a* and 102*b* to agree on a final shared key independently of the intermediary devices 104*a* and 104*b*, and/or to prevent the intermediary devices 104*a* and 104*b* from eavesdropping on the final key exchange between the first and second devices 102*a* and 102*b*.

In this example, there are four devices 102*a*, 104*a*, 104*b* and 102*b* and there are three communication links. Although four devices 102*a*, 104*a*, 104*b* and 102*b* are described, this is by way of example only and the invention is not so limited, it is to be appreciated by the skilled person that the key exchange system 230 can be extended to a plurality of intermediary devices 104*a*-104*n* as described in FIG. 1*a*-1*c* and/or reduced to only one intermediary device 104*a* as described in FIG. 1*a*-1*c* as the application demands.

In this key exchange system 230, one or more hybrid quantum-classical key exchange protocol(s) based on the BB84 family of protocols may be used from the set of key exchange protocols. In this example, a hybrid-BB84 key exchange protocol is used, which operates in a similar manner as the BB84-based key exchange system 220 as described with reference to FIG. 2*c*. The hybrid-BB84 key exchange protocol may also be used or based on other underlying QKD protocols such as, without limitation, for example the BB92 protocol and the like. However, in the hybrid-BB84 key exchange protocol used in the key exchange system 230 some of the classical information processing that would normally take place as part of the BB84 or other standard QKD schemes is itself is deferred and displaced until the chaining part of the process is performed, and the XOR operations are carried out on "unsifted" keys, also referred to as intermediate sets of symbols that do not carry any useful information about the final shared key between the first and second devices 102*a* and 102*b*.

In the four party example of FIG. 2*d*, the initial QKD processes for exchanging the first, second and third sets of symbols when using the BB84 key exchange protocol (e.g. in the BB84-based chain as described with reference to FIG. 2*c*) would involve mutual exchange of measurement basis information between the pairs of devices, e.g. exchange of measurement basis information between: a) the first device 102*a* and the first intermediary device 104*a*; b) the first intermediary device 104*a* and the second intermediary device 104*b*; and c) the second intermediary device 104*b* and the second device 102*b*. However, the hybrid-BB84 based key exchange protocol differs from the BB84 key exchange protocol in that the first and second devices 102*a* and 102*b* do not communicate any of their measurement basis information to the first and second intermediary devices 104*a* and 104*b*. This basis information is withheld from the first and second intermediary devices 104*a* and 104*b*, which means both the first and second devices use "unsifted keys" 232*a*-1 and 232*c*-2 (e.g. $S_{AC}$ and $S_{DB}$) and the intermediary devices use corresponding "unsifted" keys 232*a*-2 and 232*c*-1 ($I_{AC}$ and $I_{DB}$) or intermediate sets of symbols in relation to the keys shared therebetween. The "unsifted" key 232*a*-2 (e.g. $I_{AC}$) may represent the first intermediate key information. The intermediary devices 104*a* and 104*b* both reveal all their measurement basis information over the corresponding classical channels 106*b*-2, 108*a*-2 and 106*b*-2 of the communication links 106*a*, 108*a* and 106*b* to each other and also the first and second devices 102*a* and 102*b*, as in the BB84-based chain. The intermediary devices also perform a hybrid-BB84-based key exchange for generating third sets of symbols 232*b* (e.g. $I_{CD}$), in which these versions of the shared keys also remain unsifted. The XORs carried out by the intermediary devices 104*a* and 104*b* are based on these unsifted shared keys 232*b* (e.g. $I_{CD}$). An equivalent sequence of XOR operations is carried out as that used in the BB84-based key exchange system 220 and the fully classical key exchange system 200. For example, the first intermediary device 104*a* calculates the XOR of the two unsifted keys 232*a*-2 and 232*b* (e.g. $I_{AC}$, $I_{CD}$) held by the first intermediary device 104*a* (e.g. $I_{AC}$ XOR $I_{CD}$). The second intermediary device 104*b* also calculates the XOR of the two unsifted keys 232*b* and 232*c*-1 or shared key information (e.g. $I_{CD}$, $I_{DB}$) held by the second intermediary device 104*b* (e.g. $I_{CD}$ XOR $I_{DB}$). These two XOR calculations (e.g. $I_{AC}$ XOR $I_C$D and $I_C$D XOR $I_{DB}$) are sent to the second device 102*b*, where these XOR calculations are effectively securely sending the first intermediate key information (e.g. $I_{AC}$) exchanged between the first device 102*a* and the first intermediary device 104*a* and the shared key information (e.g. $I_{CD}$, $I_{DB}$) to the second device 102*b*. The second device 102*b* then processes these received results by XORing these two outcomes together resulting in ($I_{AC}$ XOR $I_{CD}$) XOR ($I_{CD}$ XOR $I_{DB}$). The second device 102*b* finally calculates the XOR of this result using their own unsifted key 232*c*-2 (e.g. $S_{DB}$), which results in ($I_{AC}$ XOR $I_{CD}$) XOR ($I_{CD}$ XOR $I_{DB}$) XOR $S_{DB}$ or ($I_A$c XOR $I_{DB}$) XOR $S_{DB}$, which is an "unsifted" estimate of the unsifted key 232*a*-1 (e.g. $S_{AC}$) of the first device 102*a*.

After this, the first device 102*a* and second device 102*b* perform a key exchange based on the hybrid-BB84 protocol over a secure communication channel 110, which is private, by performing a reconciliation procedure, error detection/correction, privacy amplification and the like. For example the reconciliation procedure may be used to discard all of their unsifted key symbols/bits except unsifted key symbols/bits for those cases in which the following conditions are satisfied: (i) for the unsifted keys (e.g. $I_{AC}$, $S_{AC}$) distributed/exchanged between the first device 102*a* and the first intermediary device 104*b*, the measurement bases used by the first device 102*a* and the first intermediary device 104*b* must be the same, (ii) for the unsifted key (e.g. $I_{CD}$) distributed/exchanged between first intermediary device 104*a* and the second intermediary device 104*b*, the measurement bases used by first intermediary device 104*a* and the second intermediary device 104*b* must be the same, and (iii) for the unsifted keys (e.g. $I_{DB}$, $S_{DB}$) distributed/exchanged between the second device 102*b* and the second intermediary device 104*b*, the measurement bases used by the second device 102*b* and the second intermediary device 104*b* must be the same. For the cases where all three of these conditions are satisfied, the symbols/bits retained by the first device 102*a* and second device 102*b* will constitute a quantum-secure cryptographic key, which may be used as the final shared key. In addition, the first device 102*a* and second device 102*b* can use a portion of these symbols/bits to check whether there was any eavesdropping on the quantum channels 106*a*-1, 108*a*-1 and 106*b*-1 through which the quantum systems, from which the key symbols/bits were derived, were distributed.

For the hybrid-BB84 protocol, the requirement for the first intermediary device 104*a* to be a trusted node is weaker than in the BB84-based scheme as described with reference to FIG. 2*c*. This is because the first intermediary device 104*a* will have no direct knowledge of the final shared key that is shared between the first and second devices 102*a* and 102*b*. This is because first and second devices 102*a* and 102*b* use a further private classical communication channel 110 when performing the key exchange for determining the final shared key. First and second devices 102*a* and 102*b* may also use secure communications over channel 110 based on previously shared keys and the like. However, if the first intermediary device 104*a* is able to gain access to the measurement basis information exchanged privately between the first and second devices 102*a* and 102*b*, then the first intermediary device 104*a* will be able to derive the final shared key determined by the first and second devices 102*a* and 102*b*. Since this measurement basis exchange between first and second devices 102*a* and 102*b* is carried out over a classical channel 110, there is no fundamental reason why first intermediary device 104*a* could not eavesdrop on this exchange without being detected, hence first and second devices 102*a* and 102*b* may secure this classical channel 110 using one.

Although the key exchange protocols may be the same for each of the communication links 106*a*, 108*a* and 106*b* as described with reference to FIGS. 2*a* to 2*d*, this is by way of example only and the invention is not so limited, it is to be appreciated by the skilled person that different key exchange protocols may be used on each of the communication links 106*a*, 108*a*-108*n*, and 106*b* depending on the requirements in relation to efficiency of the key exchange, level of trusted desired in relation to the intermediary devices 108*a*-108*n*, and/or level of security. For example, the BB84-based key exchange system, 220 and the hybrid-BB84-based key exchange system 230 may be combined in which the hybrid-BB84-based key exchange protocol used in the system, 230 of FIG. 2*d* may be used over communication links 106*a* and 106*b* whilst the BB84 or equivalent key exchange protocol may be used for the communication links 108*a*-108*m* between the intermediary devices 104*a*-104*n*. This may lead to an improved key exchange efficiency when compared with the hybrid-BB84-based key exchange system 230 of FIG. 2*d*, whilst reducing the requirement that the first intermediary device 104*a* be a trusted node. More generally, any of the four key exchange systems 200, 210, 220 and/or 230 (e.g. chaining protocols) as described with reference to FIGS. 2*a* to 2*d* (e.g. fully classical, fully quantum, BB84 quantum-classical, and hybrid-BB84 quantum-classical) can be mixed within a single key exchange system with the only restriction that communication links that use the fully quantum version (e.g. entanglement) must use a quantum channel to implement the chaining part of the process in order to carry out the required entanglement swapping. However, for the other three versions (e.g. fully classical, BB84-based, and hybrid-BB84), a classical channel is sufficient for performing the XORing of the shared keys/intermediate key information, which suffices for the chaining. For the BB84-based and hybrid-BB84 key exchange systems 220 and 230, a quantum channel in each communication link performing the BB84 and/or hybrid-BB84-based key exchange protocols is necessary to implement the underlying QKD/exchange portions of these protocols prior to chaining (e.g. nesting XORs and the like).

Although the key exchange systems 200, 210, 220 and 230 have been described as involving four devices, e.g. two endpoint devices 102*a* and 102*b*, and two intermediary devices 104*a* and 104*b* with three communication links 106*a*, 108*a* and 106*b* connecting these devices, this is byway of example only and the invention is not so limited, the skilled person in the art would appreciate that these key exchange system 200, 210, 220 and 230 with reference to FIGS. 2*a* to 2*d* and/or the key exchange systems 100, 120 and 130 of FIGS. 1*a* to 1*c* can in principle be extended to any number of links and/or intermediary devices simply by extending the nested XOR calculations, or using a series of entanglement swapping operations in the fully quantum version, or a nested combination of XORs and entanglement swapping operations in the case where there are fully quantum as well as fully classical and/or hybrid-quantum, parts included in a single key exchange system or single chain. In all cases, for the quantum and/or hybrid quantum cases, the intermediary devices must communicate their measurement basis and/or entanglement swapping outcome data to the first and second endpoint devices 102*a* and 102*b* that are performing a key exchange to share the final shared key.

Although FIGS. 2*a* to 2*d* has described the key exchange systems 200, 210, 220 and 230 in which the chaining or XORing results are sent from the first device 102*a* to the second device 102*b*, this is byway of example only and the invention is not so limited, the skilled person would appreciate that key that the first and second devices 102*a* and 102*b* share is based on the first device's original (or possibly unsifted) first set of symbols or key and that the key exchange systems 200, 210, 220 and 230 of FIGS. 2*a* to 2*d* (and/or systems 100, 120 and 130 of FIGS. 1*a* to 1*c*) may be implemented in the opposite direction by reversing the ordering of the XORs calculations in the nested calculation, and where the final shared key exchanged between the first and second devices 102*a* and 102*b* would instead be based on the original key of the second device 102*b*. Furthermore, given that all of the XOR results (and/or entanglement swapping outcomes if there is a fully quantum component to the chain) are needed to derive the final shared key, the order in which these results are communicated is immaterial.

In a generalised key exchange system with N devices, labelled 1, 2, . . . N, and the goal is for endpoint devices 1 and N to share a final shared key that is based on device 1's original version of the key. For two adjacent devices i and j within the string of devices or chain, the versions of the key they share using a key exchange protocol are denoted, at the point the XORs are applied, as $K_{Lj}(i)$ and $K_{Lj}(j)$ respectively. Note that in the cases of a fully classical part of a chain or a BB84-based part, these keys are the same $K_{Lj}(i)=K_{Lj}(j)$, but for the hybrid-BB84-based part of a chain these keys are not the same $K_{Lj}(i)$ #$K_{Lj}(j)$ because the keys are unsifted at the point the XOR calculations are applied. In the general case, the key that device N calculates is derived from the following formula:

$$K_{N-1,N}(N)$$

$$XOR(K_{N-1,N}(N-1)XOR(K_{N-2,N-1}(N-1)XOR(K_{N-2,N-1}(N-2)XOR$$
$$( \ldots \ldots \ldots \ldots XOR(K_{i,j}(j)XOR(K_{i,j}(i)XOR( \ldots \ldots \ldots \ldots XORK_{1,2}(1)$$

If there is an hybrid-BB84-based part/component to the chain, the key that device N derives will then have to be reconciled against participant 1's unsifted key, based on the measurement basis information that has been communicated by all the intermediate/intermediary devices, in combination with devices 1 and N's measurement basis information, with the latter being communicated between devices 1 and N via a private channel or private communication link intended to prevent the other devices or participants (and in particular intermediary devices such as participants 2 . . . N−1) from accessing it. In other cases, this reconciliation step will not be necessary.

Figure 3A:
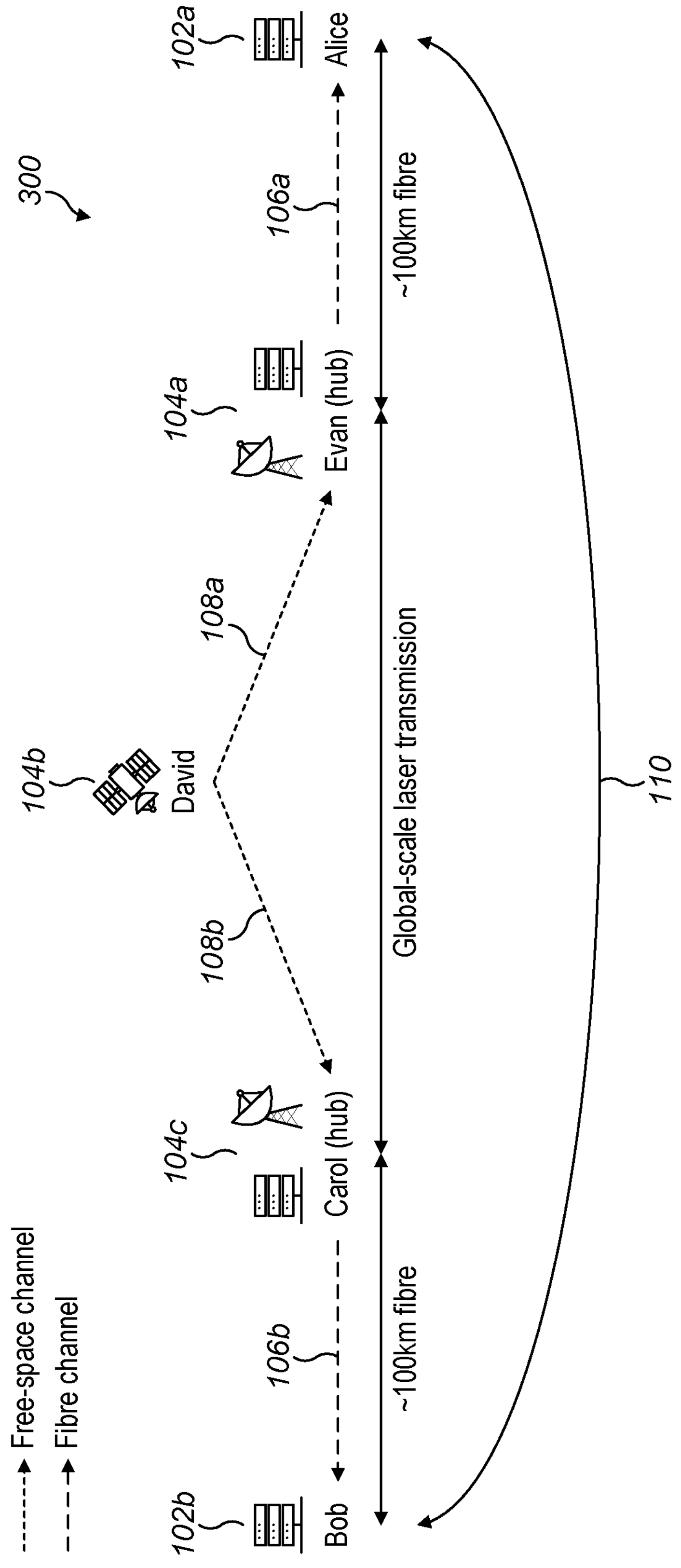
FIG. 3*a* is a schematic diagram illustrating an example key exchange system according to the invention based on the key exchange system and process(es) of FIGS. 1*a* to 2*d;*

FIG. 3*a* is a schematic diagram illustrating a further example key exchange system 300 based on the key exchange systems and process(es) of FIGS. 1*a* to 2*d* using a quantum-classical key exchange protocol according to the invention. The key exchange systems 100, 120, 130, 200, 210, 220, 230 and process(es) 140, 150, 160, 170 of FIGS. 1*a* to 1*g* and 2*a* to 2*d* are further modified based on key exchange system 300. For simplicity, the reference numerals of FIGS. 1*a* to 1*c* will be referred to for the same and/or similar components and/or features and the like in relation to FIG. 3*a*. The key exchange system 300 includes a first endpoint device 102*a* (e.g. Alice) and a second endpoint device 102*b* (e.g. Bob) in communication with each other via one or more intermediary devices 104*a*-104*c* (e.g. Evan, David and Carol) over communication links 106*a*, 108*a*, 108*b* and 106*b* connected therebetween.

In this example, there are five parties and so each of the four communication links 106*a*, 108*a*, 108*b* and 106*b* may be hybrid quantum-classical communication links, each communication links 106*a*, 108*a*, 108*b* and 106*b* having at least a quantum channels, indicated by the dotted and/or dashed lines, with classical channels (not shown). Each communication link 106*a*, 108*a*, 108*b* and 106*b* may include a quantum channel and a classical channel connecting between the devices. Thus, each device 102*a*, 104*a*, 104*b*, 104*c* and 102*b* has the required quantum hardware/technology and/or quantum transmitter/receiver structures as well as the required classical hardware/technology and/or classical transceivers and the like for being able to perform one or more types of quantum key exchange/distribution protocol(s) using the quantum channels and classical channels as described herein, modifications thereto, combinations thereof and/or as the application demands.

The first device 102*a* is connected via at least a first quantum channel (dashed arrow) and a classical channel (not shown) to intermediary device 104*a* via a first communication link 106*a*. In this example, the first quantum channel is an optical fibre channel, the first classical channel is also an optical fibre channel. The second device 102*b* is similarly connected via at least a second quantum channel and a second classical channel (not shown) via the second communication link 106*b* to the N-th or last intermediary device 104*c* (e.g. Carol). In this example, the first quantum channel is an optical fibre channel, the second classical channel is also an optical fibre channel. Each of the intermediary devices 104*a*-104*c* are connected to each adjacent or neighbouring intermediary device 104*c*, 104*b* and 104*a* via at least a quantum channel and a classical channel of one of the communication links 108*a*-108*b* therebetween. In this example, the quantum channels between the intermediary devices 104*a*-104*c* are optical free space quantum channels, and the classical channels are satellite communication channels and the like. Thus, the first and second devices 102*a* and 102*b* are communicatively coupled to each other via the one or more intermediary devices 104*a*-104*n* and communication links 106*a*, 108*a*, and 106*b* therebetween. Furthermore, the first and second devices 102*a* and 102*b* may also be connected via a further communication link 110, which may be a separate classical channel that the first and second devices 102*a*-102*b* securely communicate over using one or more previously exchanged cryptographic keys and the like. This further communication link 110 may bypass the classical channels of the other communication links 106*a*, 108*a*-108*b* and 106*b*. This may enable the first and second devices 102*a* and 102*b* to later agree on a final shared key independently of the intermediary devices 104*a*, 104*b* and 104*c*, and/or to prevent the intermediary devices 104*a*, 104*b* and 104*c* from eavesdropping on the final key exchange between the first and second devices 102*a* and 102*b*.

In this example, the key exchange system 300 includes three intermediate/intermediary devices/nodes 104*a*-104*c* (Evan, David and Carol) in which the second intermediary device 104*b* (e.g. David) is a satellite and the first and third intermediary devices 104*a* and 104*c* (e.g. Evan and Carol) are two regional fibre optic hubs with optical ground receiver stations (OGRs) for receiving quantum transmissions from the second satellite intermediary device 104*b*. Although the second intermediary device 104*b* is a satellite, this is by way of example only and the invention is not so limited, it is to be appreciated by the skilled person that each of the intermediary devices 104*a*, 104*b* and 104*c* may be any type of device that is capable of transmitting and/or receiving quantum transmissions and/or classical transmissions, where the second intermediary node 104*b* may simply be another regional fibre hub that connects with the two first and last intermediary devices 104*a* and 104*c* via optical fibre communication links and the like, and/or as the application demands. The two first and second end point devices 102*a* and 102*b* (Alice and Bob) may wish to establish or exchange a shared secret key or a final shared key with each other.

As shown in FIG. 3*a*, the endpoints 102*a* and 102*b* may be, without limitation, for example arbitrary distance from each other, and in this case they are far enough apart to require a satellite links and 100 km optical fibre communication links to connect them together. The intermediary devices 104*a*-104*c* are arranged in a linear array of a linear subnetwork of a larger communication network as described with reference to FIGS. 1*a* to 1*c* between the first and second devices 102*a* and 102*b*. The intermediary devices have quantum channels connecting them to their nearest neighbour devices including the first and second devices 102*a* and 102*b* (e.g. Alice and Bob). In essence, FIG. 3*a* describes a direction of the quantum channel by a dashed or dotted link with an arrow, which indicates that the quantum transmissions are unidirectional and towards the device the arrow is pointing to. All this means is one of the devices has a quantum transmitter and transmits quantum transmissions in the direction of the arrow in which the quantum transmissions are received by a quantum receiver at the device the arrow of the quantum channel of the communication link points towards. Although each of the communication links 106*a*, 108*a*, 108*b*, and 106*b* are depicted as having quantum channels with a particular direction, this is byway of example only and the invention is not so limited, it is to be appreciated by the skilled person that one or more of the quantum channels may have an opposite direction as the application demands, which means that quantum transmissions will go in the other direction with the respective devices having quantum transmitter and quantum receiver accordingly. Although not shown in FIG. 3*a*, each of the communication links 106*a*, 108*a*, 108*b*, and 106*b* also have a classical communication channel between each device and its nearest neighbour devices of the devices 102*a*, 104*a*, 104*b*, 104*c* and 102*b*. In addition, a further channel 110 between the first device 102*a* and second device 102*b* is a classically-encrypted communication channel, which may be encrypted using previous keys exchanged between the first and second devices 102*a* and 102*b*. The first and second devices 102*a*, 102*b* and the first, second and third intermediary devices/nodes 104*a*-104*c* of the key exchange system 300 are configured to perform a series of communications, both quantum and classical, between the nearest neighbour or adjacent devices with the aim of establishing a pair of symmetric keys, a final shared key, between the first device 102*a* (e.g. Alice) and the second device 102*b* (e.g. Bob).

The key exchange system 300 and/or those of FIGS. 1*a* to 2*d* are configured to establish a shared symmetric key of arbitrary length between the first device 102*a* and the second device 102*b* and, based on a judicious design/selection of key exchange protocols from the set of key exchange protocols, to minimise the knowledge of the shared key between the intermediary devices 104*a*-104*c*. Ideally, the selection of the key exchange protocols is such that the shared symmetric key, or final shared key, exchanged between the first and second devices 102*a* and 102*b* is not known to the intermediary devices 104*a*-104*c*. A further advantage of the key exchange system 300, when quantum or hybrid-quantum key exchange protocols are selected from the set of key exchange protocols is to maintain end-to-end properties of quantum key exchange/distribution including eavesdropping protection.

Referring to FIG. 3*a*, the key exchange system 300 each of the devices 102*a*, 104*a*, 104*b*, 104*c*, and 102*b* are is connected via the communication links 106*a*, 108*a*, 108*b*, and 106*b* to each of its nearest neighbour devices via a quantum channel (e.g. dashed/dotted lines). Each quantum channel is unidirectional with a direction that depending on the selected one or more key exchange protocols used between said each device and its nearest neighbour devices when exchanging the first intermediate key information and/or the pairs of shared keys between each other. The first and the second endpoint devices 102*a* and 102*b* have a classically-secured classical channel 110 therebetween, and each of the N intermediary devices 104*a*-104*c* (in this case N=3) have classical channels (not shown) with each of their nearest neighbour intermediary devices 104*a*-104*c* as illustrated in FIG. 3*a*.

The first endpoint device 102*a* (e.g. Alice) exchanges first intermediate key information with the intermediary device 104*a* (e.g. Evan) using a first key exchange protocol, in which the first key exchange protocol is a hybrid-BB84 quantum key exchange protocol (e.g. the hybrid-BB84 based protocol as described with reference to FIG. 3*b*), where a first portion of the hybrid-BB84 quantum key exchange protocol (e.g. the hybrid-BB84 based protocol as described with reference to FIG. 3*b*) is used to generate first intermediate key information based on: transmitting or receiving, by the first intermediary device 104*a*, a first set of random symbols over a first quantum channel of communication link 106*a* with the first endpoint device 102*a*; transmitting, from the first intermediary device 104*a* to the first endpoint device 102*a*, the basis set used by the first intermediary device 104*a* for transmitting or receiving the first set of random symbols over the first quantum channel of the communication link 106*a*; generating, by the first intermediary device 104*a*, first intermediate key information (e.g. an intermediate set of symbols or a shared key) including data representative of a first intermediate set of symbols based on the validly transmitted or received first set of symbols using the transmitting or receiving basis set used by the first intermediary device 104*a* when transmitting or receiving the first set of symbols over the first quantum channel of the communication link 106*a*. The first endpoint device 102*a* withholds the first transmitting or receiving basis set used by the first endpoint device 102*a* for transmitting or receiving the first set of random symbols over the first quantum channel of the communication link 106*a* with the first intermediary device 104*b*. The first key information includes data representative of an intermediate set of symbols that is generated at the intermediary device 104*a* is an "unsifted" key because the intermediary device 104*a* does not have all of the necessary basis information to exactly generate the received first set of symbols received by the first endpoint device 102*a*. This is because the first endpoint device 102*a* withholds the first transmitting or receiving basis set used by the first endpoint device 102*a* for transmitting or receiving the first set of random symbols over the first quantum channel of the communication link 106*a* with the first intermediary device 104*b*.

Thus, the first intermediary device 104*a* has exchanged/shared first intermediate key information with the first device 102*a*, in which the first intermediate key information at the first intermediary device 104*a* forms a first shared key associated with the intermediary device 104*a*. Each of the remaining devices perform a key exchange of a shared key with their adjacent or neighbouring devices using a quantum key exchange protocol selected from the set of key exchange protocols including, without limitation, the hybrid-BB84 quantum key exchange protocol described above and/or another quantum key exchange protocol such as, without limitation, for example the BB84 quantum key exchange protocol and/or any other quantum key exchange protocol using quantum channels and/or classical channels and the like. Thus, for example, using the selected quantum key exchange protocol over communication link 108*a*, the first intermediary device 104*a* exchanges a second shared key with the adjacent second intermediary device 104*b*. This means, the intermediary device 104*a* has a pair of shared keys including the first intermediate key information and the second shared key with the second intermediary device 104*b*. The second intermediary device 104*b*, using a selected quantum key exchange protocol over communication link 108*b*, exchanges a another shared key with the adjacent third intermediary device 104*c*. This means, the second intermediary device 104*b* has a pair of shared keys including the second shared key shared with the first intermediary device and the other shared key shared with the third intermediary device 104*c*. The third intermediary device 104*c*, using a selected quantum key exchange protocol over communication link 106*b*, exchanges a further shared key with the adjacent second device 102*b*. This means, the third intermediary device 104*c* has a pair of shared keys including the other shared key shared with the second intermediary device 104*b* and the further shared key shared with the second device 102*b*. The second device 102*b* only has said further shared key shared with the third intermediary device 104*c*. As well, the first device 102*a* only has said received first set of symbols along with the transmitting or receiving basis set from the first intermediary device and the receiving or transmitting basis set used to receive or transmit the random symbols and the like.

Once each of the devices 102*a*, 104*a*-104*c* and 102*b* have shared so-called keys with their neighbouring adjacent devices in the set of devices 102*a*, 104*a*-104*c* and 102*b*, the first intermediary device 104*a* securely sends data representative of the exchanged first intermediate key information to the second endpoint device via the communication links 108*a*, 108*b*, and 106*c*. This may include encrypting the first intermediate key information with a shared key of a neighbouring device of the group of devices. Sending the encrypted first intermediate key information to the second endpoint device via said neighbouring device(s) over said communication links 108*b*, 106*b* therebetween, in which any remaining intermediary devices 104*b* and 104*c* securely send the first endpoint device intermediate key information to said second endpoint device using corresponding shared keys with neighbouring devices over said communication links therebetween. The second endpoint device 102*a* receives the encrypted first intermediate key information and decrypts said encrypted first intermediate key information to retrieve said first intermediate set of symbols determined by the first intermediary device 104*a*.

Once received, the first and second endpoint devices 102*a* and 102*b* determine the final shared key, using the hybrid-BB84 based protocol (or any other QKD protocol) that was used by the first device 102*a* in exchanging the first intermediate key information with the first intermediary device 104*a*. The final shared key may be determined by the first and second devices 102*a* and 102*b* performing a second portion of the hybrid-BB84 based protocol for exchanging a shared final key based on the first intermediate key information, where the second portion of the hybrid-BB84 quantum key exchange protocol used to exchange the final shared key includes the first and second endpoint devices 102*a* and 102*b* performing the following steps of, over a secure classical communication channel 110: exchanging, between the first and second endpoint devices over the secure communication channel 110 therebetween, the transmitting or receiving basis set used by the first endpoint device 102*a* for transmitting or receiving the first set of random symbols with the first intermediary device 104*a*; determining, by the second endpoint device 102*b* using the transmitting or receiving basis set used by the first endpoint device 102*a* for transmitting or receiving the first set of random symbols and the first intermediate set of symbols received in the first intermediate key information, a second set of symbols corresponding to at least a portion of the first set of random symbols transmitted or received by the first endpoint device 102*a*; and exchanging, by the first and second devices 102*a* and 102*b* over the classically-secured communication channel 110 therebetween, a shared key based processing and transforming the first set of random symbols and second set of symbols. The processing and transforming including a reconciliation procedure of sifting the first and second sets of random symbols, error detection and correction of the sifted first and second sets of random symbols, privacy amplification and eavesdropper detection by discarding those symbols form the first and second sets of random symbols detected to have been eavesdropped, and agreeing on a selection of symbols from the first and second sets of symbols for forming a final shared key therebetween.

As an option, the first intermediate key information may further include data representative of from the group of: said transmitting or receiving basis set used by the first intermediary device 104*a* when transmitting or receiving said first set of random symbols over the first quantum channel of the communication link 106*a* with the first endpoint device 102*a*; and said first set of random symbols transmitted or received by the first intermediary device 104*a* when transmitting or receiving said first set of random symbols with the first endpoint device 102*a*. As another option, the exchanging a shared key by the first endpoint device 102*a* and second endpoint device 102*b* over a secure communication channel 110 therebetween may further include performing final key information reconciliation, error correction and/or detection and privacy amplification on the second set of symbols determined by the second endpoint device 102*b* and the first set of symbols transmitted or received by the first endpoint device 102*a* resulting in a final shared symmetric key. Additionally or alternatively, the one or more key exchange protocols used for secure communications between the second endpoint device 102*b* and the first intermediary device 104*c* is the BB84 key exchange protocol. Furthermore, sharing keys between a group of devices including the first intermediary device 104*a*, any other intermediary device(s) 104*b* and 104*c* and the second device 102*b* connected over communication links 108*a*, 108*b*, 106*b*, each with quantum channel and a classical channel, may include using the BB84 key exchange protocol to exchange shared keys between the corresponding devices of the group and their neighbour devices of the group of devices.

As an example of the above-described key exchange system 300 and process for exchanging a shared secret key, or final shared key, between the first device 102*a* and the second device 102*b* is now described for the key exchange system 300 with reference to the BB84 protocol and a hybrid-BB84 version, which was briefly outlined above in relation to the first portion of a hybrid-BB84 based protocol and key exchange portion of the hybrid-BB84 protocol. Although this example makes use of the BB84 protocol and also describes a hybrid-BB84 version, this is by way of example only and the invention is not so limited, the skilled person in the art would appreciate that any QKD protocol/process that allows the generation of a shared key between two devices that provides OTP and/or XOR encryption of the raw key material as it is relayed between intermediary devices (e.g. intermediate nodes) may be used as the key exchange protocol used between devices.

The BB84 protocol and also hybrid-BB84-based protocol (e.g. see FIG. 3*b*) are used in this example by way of example only. The first device 102*a* is referred to as Alice, the second device 102*b* is referred to as Bob, the first intermediary device 104*a* is referred to as Evan, the second intermediary device 104*b* is referred to as David, and the last or N-th intermediary device 104*c* (third intermediary device) is referred to as Carol (e.g. N=3 in this example). The key exchange process outlined in this example may be used to modify the key exchange systems and/or process(es) 100, 120, 130, 140, 150, 160, 170, 200, 210, 220, 230 as described with reference to FIGS. 1*a* to 2*d*. Without loss of generality, it is noted that the described key exchange process steps in this example may be in a similar or different ordering as that described in the key exchange process(es) with reference to FIGS. 1*a* to 2*d* and/or as herein described. In this example, the key exchange process of the key exchange system 300 is initiated when Alice 102*a* and Bob 102*b* determine to establish a shared secret key (also referred to herein as a final shared key) between themselves. In response, both Alice 102*a* and Bob 102*b* receive a stream of quantum information from their nearest-neighbour devices (or nodes), called Evan 104*a* and Carol 104*c*, respectively. In this case, Evan 104*a* and Carol 104*c* create a random bitstring (or set of symbols/bits or bit stream) each and use them to prepare quantum states according to the BB84 protocol. Bob 102*b* performs a full BB84 (or other QKD protocol from the set of QKD protocols as described herein) key establishment over communication link 106*b* with Carol 104*c* so that they both share a key, denoted $K_{BC}$.

Alice 102*a* and Evan 104*a* performs the first part of the hybrid-BB84-based protocol over communication link 106*a* in which, in this example, Evan 104*a* exchanges first key information with Alice 104*a*. This is performed by Evan 104*a* transmitting a random bitstring (or set of symbols/symbol stream, or bit string), denoted $K_{EA}$, over the quantum channel of the communication link 106*a*, where Alice 102*a* uses a random receiving basis set or bases to receive the quantum transmissions of the random bitstring $K_{EA}$ and form a received bitstring $K'_{EA}$. In addition, Evan 104*a* sends via the classical channel of communication link 106*a* the transmitting basis set that Evan 104*a* used to transmit the random bitstring $K_{EA}$ to Alice 102*a*. Alice 102*a* receives the transmitting basis set or bases that Evan 104*a* used to prepare the transmitted states of the random bitstring $K_{EA}$ (these are announced publicly, so they are also known to Bob 102*b*) but Alice 102*a* withholds or does not announce which receiving basis set or bases Alice 102*a* used to measure the transmitted quantum states of the random bitstring $K_{EA}$ transmitted from Evan 104*a*. Thus, given Alice 102*a* has Evan's transmitting bases and Alice's receiving bases, Alice 102*a* knows which symbols/bits Evan 104*a* has sent and also which symbols/bits Alice 102*a* has validly/successfully received, but Evan 104*a* does not know which symbols/bits of the random bitstring $K_{EA}$ that Alice 102*a* has received or that Alice 102*a* has validly/successfully received. Note, the bits/symbols of the random bitstring $K_{EA}$ that Alice 102*a* receives is denoted $K'_{EA}$, which will be different to the bits/symbols of the transmitted random bitstring $K_{EA}$, this is because Alice 102*a* randomly selects a receiving basis when receiving the transmitted random bitstring $K_{EA}$, and so inevitably uses the wrong receiving basis when measuring/receiving some of the bits/symbols than the transmitting basis used for those bits/symbols by Evan 104*a* for transmitting the random bitstring $K_{EA}$.

Evan 104*a* proceeds to transmit the random bitstring $K_{EA}$ sent to Alice 102*a* to Carol 104*c*, via, in this example, David 104*b*. This might happen directly if there are no other intermediary devices between Evan 104*a* and Carol 104*c* (in fact, if there is only one intermediary device then Carol and Evan are the same intermediary device/node), otherwise the bitstring $K_{EA}$ is transmitted across a series of intermediary devices (e.g. from Evan 104*a* to David 104*b* and then to Carol 104*c*), each of which has previously performed a full BB84 key exchange with its nearest neighbours to exchange a shared key therebetween. Thus, Evan 104*a* has the first intermediate key information, namely, random bitstring $K_{EA}$, exchanged with Alice 102*a* over communication link 106*a* and a shared key $K_{DE}$ shared with David 104*b* over communication link 108*a*; David 104*b* has the shared key $K_{DE}$ shared with Evan 104*a* over communication link 108*a* and a shared key $K_{CD}$ shared with Carol 104*c* over communication link 108*b*; and Carol 104*b* has the shared key $K_{BC}$ shared with Bob 102*b* over communication link 106*b* and the shared key $K_{CD}$ shared with David 104*b* over communication link 108*b*. The BB84 generated shared key $K_{DE}$ is used by Evan 104*a* to OTP encrypt the bitstring $K_{EA}$ (e.g. $K_{EA}$ XOR $K_{DE}$). David 104*b* receives over the classical channel of communication link 108*a* the encrypted bitstring $K_{EA}$, decrypts it using shared key $K_{DE}$ (e.g. encrypted bitstring $K_{EA}$ XOR $K_{DE}$) and encrypts the bitstring $K_{EA}$ with the shared key $K_{CD}$ (e.g. $K_{EA}$ XOR $K_{CD}$). In this way, Carol 104*c* finally receives over the classical channel of communication link 108*b* a copy of the bitstring $K_{EA}$ that Evan 104*a* used to prepare his quantum states and transmitted over the quantum channel of communication link 106*a* to Alice 102*a*. It is noted that each of the shared keys are long enough to encrypt the bitstring $K_{EA}$.

At this point, Carol 104*c* encrypts the bitstring (e.g. $K_{EA}$ XOR $K_{BC}$) and transmits over the classical channel of communication link 106*a* to Bob 102*b* using their BB84-established shared key $K_{BC}$. Alice 102*a* and Bob 102*b* now communicate over a further or separate classical channel 110 to perform the key exchange part of the hybrid-BB84-based protocol. The classical channel 110 between Alice 102*a* and Bob 102*b* may be classically encrypted (or encrypted using post-quantum cryptography keys and the like), where Alice 102*a* now securely shares with Bob 102*b* data representative of the receiving basis measurements Alice 102*a* used to receive $K_{EA}$ from Evan 104*a*. As an option, Alice 102*a* may also send the transmitting basis measurements Evan 104*a* used to transmit $K_{EA}$ to Alice 102*a* over the quantum channel of the communication link 106*a*, but this may also publicly shared by Evan 104*a*. This means that Bob 102*b* can determine which bits/symbols of $K_{EA}$ that Alice 102*a* actually received from Evan 104*a*. Together with the prepared bases (or transmitting basis measurements) that were shared publicly by Evan 104*a*, or Alice 102*a* shared over the classical channel 110, Bob 102*b* can then determine which bits/symbols Alice 102*a* successfully/validly received to form $K'_{EA}$. As part of the hybrid-BB84 key exchange protocol, Alice 102*a* and Bob 102*b* perform final information reconciliation on the validly received bitstring $K'_{EA}$, as well as, privacy amplification and/or error correction and the like as performed in the standard BB84 protocol. This results in a final shared symmetric key, a final shared key, without errors and guaranteed only to be known to Alice 102*a* and Bob 102*b*.

Figure 3B:
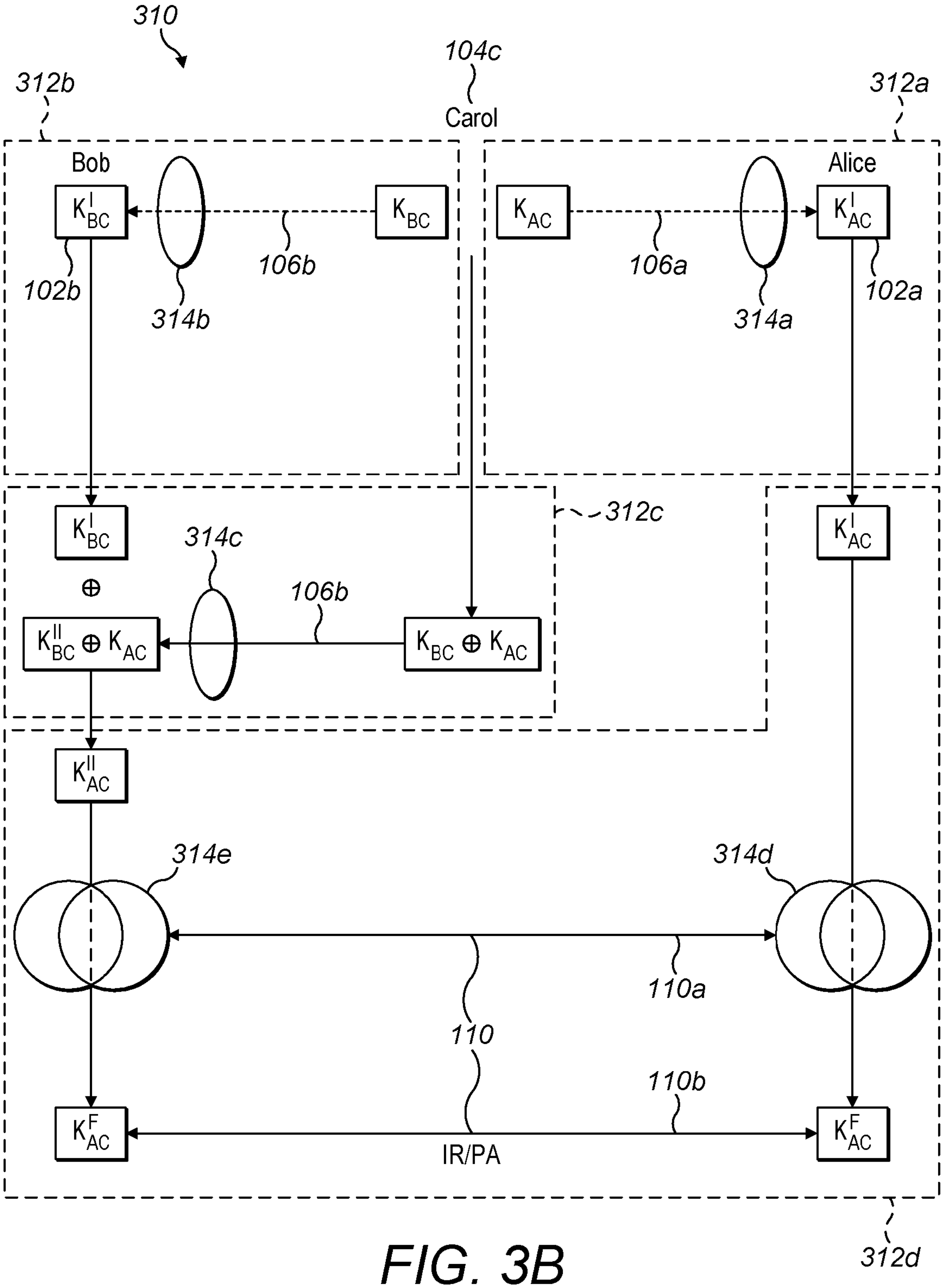
FIG. 3*b* is a schematic diagram illustrating an example hybrid QKD key exchange protocol according to the invention based on the key exchange system and process(es) of FIGS. 1*a* to 3*a;*

FIG. 3*b* is a schematic diagram illustrating an example hybrid-BB84-based protocol 310 for use as a QKD protocol with the key exchange systems 100, 120, 130, 200, 210, 220, 230, 300 and process(es) 140, 150, 160, 170 of FIGS. 1*a* to 1*g*, 2*a* to 2*d* and 3*a* according to the invention. For simplicity, the reference numerals of FIGS. 1*a* to 1*c* will be referred to for the same and/or similar components and/or features and the like in relation to FIG. 3*b*. One or more hybrid-BB84 subprocess(es)/part(s) 312*a*, 312*b*, 312*c* and 312*d* of the hybrid-BB84-based protocol 310 may be used as part of the first key exchange protocol and/or the one or more protocols of the set of protocols used by the first device 102*a*, second device 102*b* and/or intermediary devices 108*a*-108*n* in the key exchange systems 100, 120, 130, 200, 210, 220, 230, 300 and process(es) 140, 150, 160, 170 of FIGS. 1*a* to 1*g*, 2*a* to 2*d* and 3*a*. These systems may be further modified based on the hybrid-BB84-based protocol 310 as the application demands, and/or as described with reference to FIGS. 2*d* and 3*a*. In FIG. 3*b*, the schematic diagram should be read from top to bottom, with time advancing moving down the diagram.

Referring to FIG. 3*b*, the hybrid-BB84-based protocol 310 is a three-party key exchange between a first device 102*a* (e.g. Alice) and a second device 102*b* (e.g. Bob) via an intermediary device 104*c* (e.g. Carol) over communication links 106*a* and 106*b*. The hybrid-BB84-based protocol 310 is performed with a first endpoint device 102*a* (e.g. Alice), a second endpoint device 102*b* (e.g. Bob) in communication with each other via one or more intermediary device(s) 104*c* (e.g. Carol) over communication links 106*a* and 106*b*. For simplicity, the first device 102*a* is referred to as Alice 102*a*, and the second device 102*b* is referred to as Bob 102*b*, and the intermediary device 104*c* is referred to as Carol 104*c* (e.g. C). Each of the communication links 106*a* and 106*b* includes a quantum channel and a classical channel. A further communication link 110 that includes a classical channel is also illustrated between Alice 102*a* and Bob 102*b*.

The implementation of the hybrid-BB84-based protocol 310 with respect to Alice 102*a*, Bob 102*b* and Carol 104*c* is described, without limitation, for example in four main key exchange subprocesses or portions based on the following: 1) a first intermediate key sharing subprocess 312*a* describing a first set interactions between Alice 102*a* and Carol 104*c* for generating first intermediate key information for Carol 104*c*, also referred to as a first intermediate set of symbols (or bits), or first secret symbols/bits, and denoted $K_{AC}$ and a first receiving intermediate set of symbols for Alice 102*a*, denoted $K'_{AC}$; 2) a second intermediate key sharing subprocess 312*b* equivalent to the first intermediate key sharing subprocess but with respect to Bob 102*b* and Carol 104*c*, which describes a second set interactions between Bob 102*b* and Carol 104*c* for generating second intermediate key information for Carol 104*c*, also referred to as a second intermediate set of symbols (or bits), or second secret symbols/bits, and denoted $K_{BC}$ and a second receiving intermediate set of symbols for Bob 102*b*, denoted $K'_{BC}$; a third key exchange subprocess 312*d* describes a third set of key exchange interactions between Bob 102*b* and Carol 104*c* (and/or Bob 102*b*) for deriving an estimate of the original random bits $K_{AC}$ sent to Alice 102*a*, denoted $K''_{AC}$; and a fourth key exchange subprocess describes a fourth set of key exchange interactions between Alice 102*a* and Bob 102*b* for determining the final shared key by processing and/or transforming $K''_{AC}$ and $K'_{AC}$ into the final shared key between Alice 102*a* and Bob 102*b*. The following key exchange subprocess(es) may be described, without limitation, for example in relation to Alice 102*a*, Bob 102*b* and/or Carol 104*c* based on the following:

In the first subprocess 312*a*, Carol 104*c* sends random bitstring $K_{AC}$ (first set of symbols/bits) to Alice 102*a* encoded in quantum states using a first transmitting bases, in a similar manner as for the BB84 protocol, for transmission over the corresponding quantum channel of communication link 106*a*. Alice 102*a* receives these quantum transmissions by making measurements on these transmitted states using a first receiving random basis set and recording the results to generate a first received set of symbols/bits. When Carol 104*c* announces the transmitting bases she prepared her states in for transmitting the first set of symbols $K_{AC}$ over the quantum channel to Alice 102*a*, Alice 102*a* is able to determine the bits/symbols where Alice 102*a* measured in the same basis as Carol 104*c* prepared. For Alice 102*a*, the received first set of symbols/bits are effectively passed through a filter 314*a*, where the bits/symbols of the received first set of symbols/bits that were measured in the same basis that Carol 104*c* prepared them in for transmission are allowed to pass through, and other bits/symbols are not. The bits/symbols that pass through form a first received intermediate set of symbols/bits $K'_{AC}$. It is noted that the first received intermediate set of symbols/bits $K'_{AC}$ is not a perfect copy of the original first set of symbols $K_{AC}$ transmitted to Alice 102*a*.

In the second subprocess 312*b*, Carol 104*c* sends random bitstring $K_{BC}$ (second sets of symbols/bits) to Bob 102*b* encoded in quantum states using a second transmitting bases, in a similar manner as for the BB84 protocol, for transmission over the corresponding quantum channel of communication link 106*b*. Bob 102*b* receives these quantum transmissions by making measurements on these states using a second receiving random basis set and recording the results to generate a second received set of symbols/bits. When Carol 104*c* announces the transmitting bases she prepared her states in for transmitting the second set of symbols $K_{BC}$ over the quantum channel to Bob 102*b*, Bob 102*b* is able to determine the bits/symbols that Bob 102*b* measured in the same basis as Carol 104*c* prepared. For Bob 102*b*, the received second set of symbols/bits are effectively passed through a filter 314*b*, where the bits/symbols of the received second set of symbols/bits that were measured in the same basis that Carol 104*c* prepared them in for transmission are allowed to pass through, and other bits/symbols are not. The bits/symbols that pass through form a second received intermediate set of symbols/bits $K'_{BC}$. It is noted that the second received intermediate set of symbols/bits $K'_{B}C$ is not a perfect copy of the original second set of symbols $K_{BC}$ transmitted to Bob 102*b*.

In the third subprocess 312*c*, in order to proceed with the protocol, Carol 104*c* must send Bob 102*b* the random bitstring $K_{AC}$ that Carol 104*c* sent to Alice 102*a*. Carol 104*c* does this by XORing the random bitstring $K_{AC}$ with the random bitstring $K_{BC}$ that Carol 104*c* sent to Bob 102*b*, which essentially encrypts random bitstring $K_{AC}$ (e.g. $K_{BC}$ XOR $K_{AC}$). The encrypted random bitstring $K_{BC}$ XOR $K_{AC}$ is sent to Bob 102*b* over the classical channel of communication link 106*b*. Since Bob 102*b* does not have a perfect copy of $K_{AC}$, Bob 102*b* only has the second received intermediate set of symbols/bits $K'_{BC}$, Bob 102*b* is not able to recover $K_{BC}$ with perfect fidelity, rather Bob 102*b* uses a filter 312*c* based on XORing the second received intermediate set of symbols/bits $K'_{BC}$ with the received encrypted random bitstring $K_{AC}$ (e.g. $K'_{BC}$ XOR ($K_{BC}$ XOR $K_{AC}$)= $K'_{AC}$) then Bob 102*b* gets a filtered version of the received encrypted random bitstring $K_{AC}$, denoted $K''_{AC}$.

In the fourth subprocess 312*d*, Alice 102*a* and Bob 102*b* determine a final shared key using the known transmitting basis sets used by Carol 104*c* and the receiving basis sets used by Alice 102*a* and Bob 102*b* to perform filtering/matching operations 314*d* and 314*e* to find matching symbols/bits in the same symbol/bit positions between $K'_{AC}$ and $K''_{AC}$. At this point Alice 102a and Bob 102b essentially share the same or similar random bitstring in which portions of $K''_{AC}$ will match corresponding portions of $K'_{AC}$. To arrive at the same final shared key, Alice 102a and Bob 102b securely communicate over the classical channel 110 by swapping their respective receiving basis sets, which were used to filter the original received random bitstrings when they formed $K'_{AC}$ and $K''_{AC}$, respectively. They then perform a reconciliation and/or matching/filtering operations 314d and 314e, respectively, to determine the corresponding bits/symbols that are matching bits/symbols in the same bit/symbol positions in $K'_{AC}$ and $K''_{AC}$, where this intersection provides a matching set of bits/symbols resulting in $K^{FAC}$ for both Alice and Bob 102a and 102b, which is what is used as the final shared key. In addition, prior to determining the final shared key Alice 102a and Bob 102b may perform, in a similar manner as for BB84, further reconciliation operations/processing including, without limitation, for example sifting, error detection/correction, information reconciliation and privacy amplification (IR/PA), which transforms the matching bits/symbols into the final shared key between Alice 102a and Bob 102b.

Figure 3C:
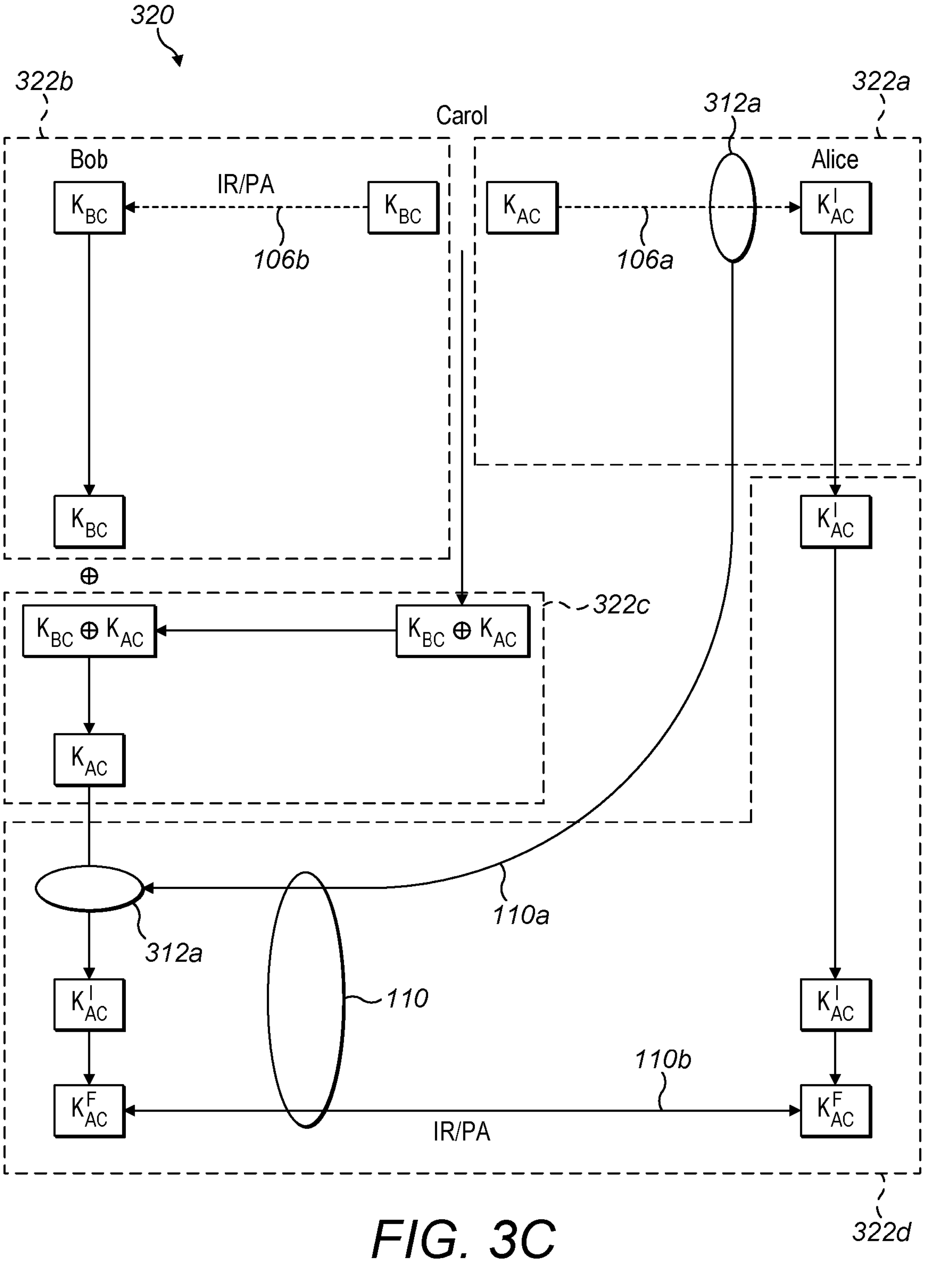
FIG. 3*c* is a schematic diagram illustrating an example QKD key exchange system using the hybrid QKD key exchange protocol over one of the endpoint links according to the invention based on the key exchange system and process(es) of FIGS. 1*a* to 3*b;*

FIG. 3c is a schematic diagram illustrating an example key exchange system 320 that makes use of the first subprocess 312a of the hybrid-BB84-based protocol 310 of FIG. 3b. For simplicity, the reference numerals of FIGS. 1a to 1c will be referred to for the same and/or similar components and/or features and the like in relation to FIG. 3c. The key exchange system 320 may be used to modify any one or more of the key exchange systems 100, 120, 130, 200, 210, 220, 230, 300, 310 and process(es) 140, 150, 160, 170 of FIGS. 1a to 1g, 2a to 2d, 3a and 3b. These systems may be further modified based on the key exchange system 320 as the application demands. In FIG. 3c, the schematic diagram should be read from top to bottom, with time advancing moving down the diagram.

Referring to FIG. 3c, the key exchange system 310 is a three-party key exchange between a first device 102a (e.g. Alice) and a second device 102b (e.g. Bob) via an intermediary device 104c (e.g. Carol) over communication links 106a and 106b. The first subprocess 312a of the hybrid-BB84-based protocol 310 of FIG. 3b is performed between the first endpoint device 102a (e.g. Alice), a second endpoint device 102b (e.g. Bob) in communication with each other via one or more intermediary device(s) 104c (e.g. Carol) over communication links 106a and 106b. For simplicity, the first device 102a is referred to as Alice 102a, and the second device 102b is referred to as Bob 102b, and the intermediary device 104c is referred to as Carol 104c (e.g. C). Each of the communication links 106a and 106b includes a quantum channel and a classical channel. A further communication link 110 that includes a classical channel is also illustrated between Alice 102a and Bob 102b.

The implementation of the hybrid-BB84-based protocol 310 with respect to Alice 102a, Bob 102b and Carol 104c is described, without limitation, for example in four main key exchange subprocesses or portions based on the following: 1) a first intermediate key sharing subprocess 322a is performed between Alice 102a and Carol 102c based on the first subprocess 312a of the hybrid-BB84-based protocol 310 of FIG. 3b for generating first intermediate key information for Carol 104c, also referred to as a first intermediate set of symbols (or bits), or first secret symbols/bits, and denoted $K_{AC}$ and a first receiving intermediate set of symbols for Alice 102a, denoted $K'_{AC}$; 2) a second intermediate key sharing subprocess 322b makes use of the BB84 protocol to share key $K_B$C between Bob 102b and Carol 104c; a third key exchange subprocess 322d describes a third set of key exchange interactions between Bob 102b and Carol 104c (and/or Bob 102b) for securely exchanging the original random bits $K_{AC}$ sent to Alice 102a; and a fourth key exchange subprocess describes a fourth set of key exchange interactions between Alice 102a and Bob 102b over secure classical channel 110 for determining the final shared key by processing and/or transforming $K_{AC}$ into $K'_{AC}$, which is further processed into the final shared key $K^{FA}$C between Alice 102a and Bob 102b. The following key exchange subprocess(es) may be described, without limitation, for example in relation to Alice 102a, Bob 102b and/or Carol 104c based on the following:

In the first subprocess 322a, as described in subprocess 312a of FIG. 3b, Carol 104c sends random bitstring $K_{AC}$ (first set of symbols/bits) to Alice 102a encoded in quantum states using a first transmitting bases, in a similar manner as for the BB84 protocol, for transmission over the corresponding quantum channel of communication link 106a. Alice 102a receives these quantum transmissions by making measurements on these transmitted states using a first receiving random basis set and recording the results to generate a first received set of symbols/bits. When Carol 104c announces the transmitting bases she prepared her states in for transmitting the first set of symbols $K_{AC}$ over the quantum channel to Alice 102a, Alice 102a is able to determine the bits/symbols where Alice 102a measured in the same basis as Carol 104c prepared. For Alice 102a, the received first set of symbols/bits are effectively passed through a filter 314a, where the bits/symbols of the received first set of symbols/bits that were measured in the same basis that Carol 104c prepared them in for transmission are allowed to pass through, and other bits/symbols are not. The bits/symbols that pass through form a first received intermediate set of symbols/bits $K'_{AC}$. It is noted that the first received intermediate set of symbols/bits $K'_{AC}$ is not a perfect copy of the original first set of symbols $K_{AC}$ transmitted to Alice 102a.

In the second subprocess 322b, Carol 104c and Bob 102a use a QKD protocol to exchange a shared key using the quantum channel of communication link 106b. In this example, the BB84 AKD protocol is used to share a shared key $K_B$C therebetween.

In the third subprocess 322c, in order to proceed with the protocol, Carol 104c must send Bob 102b the random bitstring $K_{AC}$ that Carol 104c sent to Alice 102a. Carol 104c does this by XORing the random bitstring $K_{AC}$ with the random bitstring $K_{BC}$ that Carol 104c sent to Bob 102b, which essentially encrypts random bitstring $K_{AC}$ (e.g. $K_{BC}$ XOR $K_{AC}$). The encrypted random bitstring $K_{BC}$ XOR $K_{AC}$ is sent to Bob 102b over the classical channel of communication link 106b. Since Bob 102b has the shared key $K_{BC}$, Bob 102b is able to fully recover $K_{AC}$ based on XORing the his shared key $K_{BC}$ with the received encrypted random bitstring $K_{BC}$ XOR $K_{AC}$ (e.g. $K_{BC}$ XOR ($K_{BC}$ XOR $K_{AC}$)= $K_{AC}$), thus Bob 102b has the same random bitstring $K_{AC}$ as Carol 104c.

In the fourth subprocess 322d, half of the subprocess 312a of FIG. 3b is performed, in which Alice 102a and Bob 102b determine a final shared key using the known transmitting basis set used by Carol 104c when transmitting $K_{AC}$ to Alice 102a and the receiving basis set used by Alice 102a to perform filtering operation 312a by Bob 102b for filtering Bob's $K_{AC}$ resulting in a $K'_{AC}$ that matches Alice's $K'_{AC}$. To arrive at the same $K'_{AC}$ key as Alice 102a, Alice 102a and Bob 102b securely communicate at 110a over the classical channel 110 in which Alice 102a sends the receiving basis sets that Alice 102*a* used to filter the original received random bitstrings when Alice 102*a* formed $K'_{AC}$. Thus, Bob 102*b* then performs this filtering 312*a* using Alice's receiving basis set to filter the random bitstring $K_{AC}$ to form $K'_{AC}$. Alice 102*a* and Bob 102*b* then perform at 110*b* reconciliation operations/processing including, without limitation, for example error detection/correction and/or information reconciliation and privacy amplification (IR/PA), which transforms $K'_{AC}$ into the final shared key $K^{FA}C$ between Alice 102*a* and Bob 102*b*.

Figure 4A:
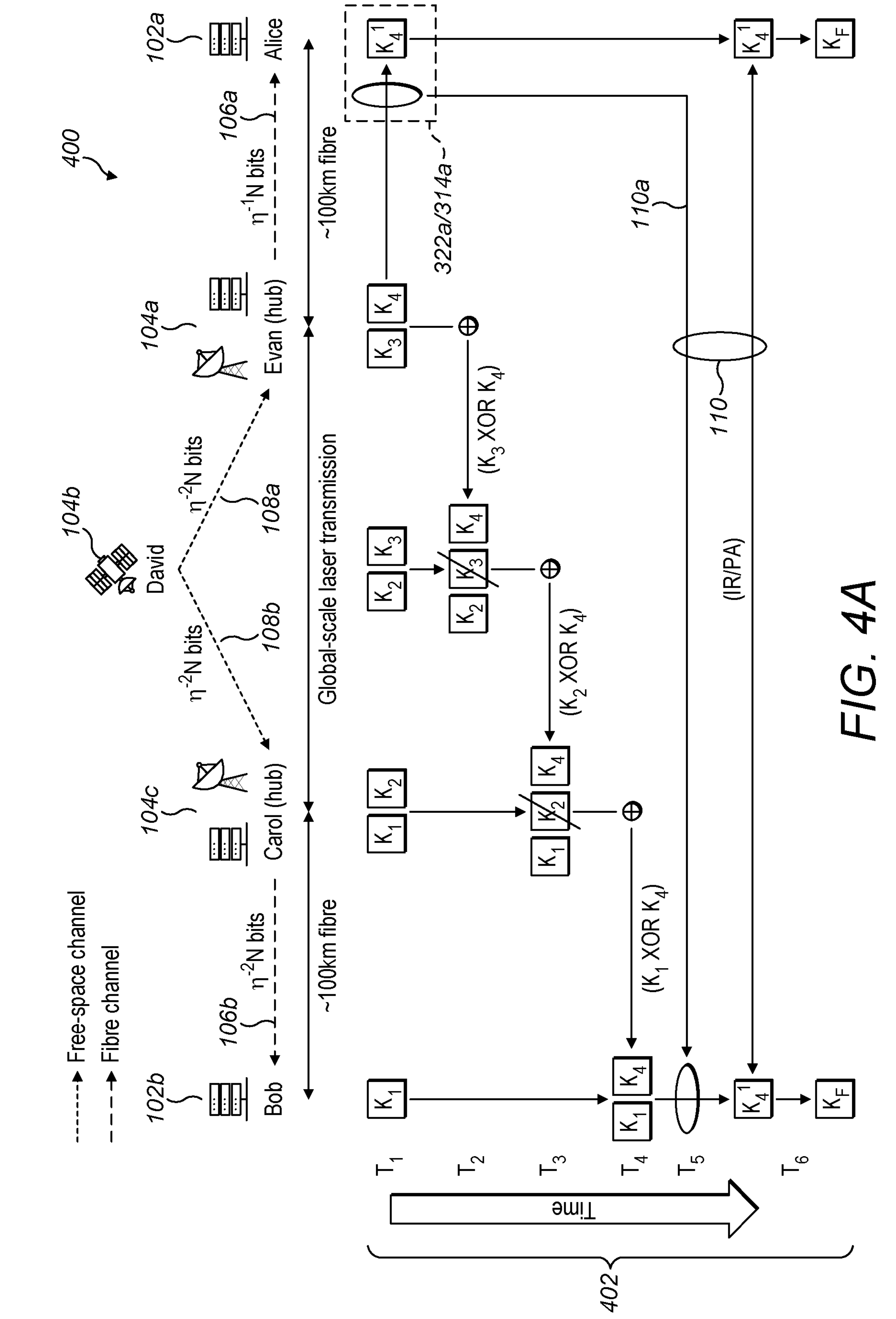
FIG. 4*a* is a schematic diagram illustrating an example key exchange system and associated shared key processing according to the invention based on the key exchange system and process(es) of FIGS. 1*a* to 3*c;*

FIG. 4*a* is a schematic and flow diagram illustrating a further example key exchange system 400 and key exchange process 402 based on the key exchange system 300 and process(es) thereof of FIG. 3*a*, and/or the key exchange systems of FIGS. 1*a* to 2*d* using a quantum-classical key exchange protocol according to the invention. The key exchange systems 100, 120, 130, 200, 210, 220, 230, 300, 310, 320 and process(es) 140, 150, 160, 170 of FIGS. 1*a* to 1*g*, 2*a* to 2*d*, and 3*a* to 3*c* are further modified based on key exchange system 400. For simplicity, the reference numerals of FIGS. 1*a* to 1*c* and 3*a*-3*c* will be referred to for the same and/or similar components and/or features and the like in relation to FIG. 4*a*. The key exchange system 400 includes a first endpoint device 102*a* (e.g. Alice) and a second endpoint device 102*b* (e.g. Bob) in communication with each other via one or more intermediary devices 104*a*-104*c* (e.g. Evan, David and Carol) over communication links 106*a*, 108*a*, 108*b* and 106*b* connected therebetween.

In this example, as can be seen by there are five parties and so each of the four communication links 106*a*, 108*a*, 108*b* and 106*b* may be hybrid quantum-classical communication links, each communication links 106*a*, 108*a*, 108*b* and 106*b* having at least a quantum channels, indicated by the dotted and/or dashed lines, with classical channels (not shown). Each communication link 106*a*, 108*a*, 108*b* and 106*b* may include a quantum channel and a classical channel connecting between the devices. Thus, each device 102*a*, 104*a*, 104*b*, 104*c* and 102*b* has the required quantum hardware/technology and/or quantum transmitter/receiver structures as well as the required classical hardware/technology and/or classical transceivers and the like for being able to perform one or more types of quantum key exchange/distribution protocol(s) using the quantum channels and classical channels as described herein, modifications thereto, combinations thereof and/or as the application demands. The BB84 protocol and also a part of the hybrid-BB84-based protocol (e.g. see FIG. 3*b*) are used in this example, this is byway of example only and the invention is not so limited, the skilled person in the art would appreciate that any QKD protocol/process that allows the generation of a shared key between two devices that provides OTP and/or XOR encryption of the raw key material as it is relayed between intermediary devices (e.g. intermediate nodes) may be used as a key exchange protocol used between devices. The first device 102*a* is referred to as Alice, the second device 102*b* is referred to as Bob, the first intermediary device 104*a* is referred to as Evan, the second intermediary device 104*b* is referred to as David, and the last or N-th intermediary device 104*c* (third intermediary device) is referred to as Carol (e.g. N=3 in this example).

Referring to FIG. 4*a* and the key exchange system 400, in this example, there are two endpoints Alice 102*a* and Bob 102*b*, which may be, without limitation, for example on other sides of the earth and which want to communicate with each other. Alice 102*a* and Bob 102*b* are connected via communication links 106*a* and 106*b* made of fibre optic cable to separate hub intermediary devices Evan 104*a* and Carol 104*c*, respectively. The fibre optic cable is capable of providing both classical and quantum channels. Alice 102*a* and Bob 102*b* may be, without limitation, for example up to 100 km distant from Evan 104*a* and/or Carol 104*c*. Each other these hubs Evan 104*a* and Carol 104*c* may have a plurality of other endpoint devices connected to them in a similar manner. To bridge the gap between the two hubs Evan 104*a* and Carol 104*c*, a second intermediary device (e.g. David) 104*b* ma be used, which in this example is a satellite, which allows quantum channels to be created across very large distances, while retaining the efficiency of hub-and-spoke networks. Given David 104*b* is a satellite, each of the hubs Evan 104*a* and Carol 104*c* requires both an OGR to receive photons over the free-space quantum channel of communication links 108*a* and 108*b*, respectively, as well as a fibre-optic network switch to connect quantum and classical channels of several communication links to several endpoints.

Assume Alice 102*a* and Bob 102*b* want to share a key of length N bits. Initially, each intermediary device Evan 104*a*, David 104*b*, Carol 104*c* which needs to communicate bits over the quantum channels of the communication links 106*a*, 108*a*, 108*b*, 106*b* to a nearest-neighbour generates a random bitstring. Ideally this bitstring is generated using a quantum-random number generator to ensure high quality randomness. Assume the efficiency of each quantum channel is the same and is given by $\eta$, so that if N bits are prepared by the sender, then after performing, without limitation, for example the BB84 protocol the resulting shared key length is $\eta N$. To start the key exchange protocol, each of Carol 104*c* and David 104*b* prepares $\eta^{-2}N$ bits per quantum channel, except Evan 104*c* (the intermediary device/node nearest to Alice 102*a*) who prepares only $\eta^{-1}N$ bits for his communication to Alice 102*a* using the first subprocess 312*a* or 322*a* of the hybrid-BB84 based protocol 310 and the like.

All quantum channels on the communication links 108*a*, 108*b*, and 106*a*, except the one on communication link 106*a* between Evan 104*a* and Alice 102*a*, perform a full BB84 QKD exchange to create shared keys between each neighbouring device. This results in shared keys of length $\eta^{-1}N$ between each pair of intermediary nodes (after losses) of Evan 104*a* and David 104*b*, David 104*b* and Carol 104*c*, and between Bob 102*b* and Carol 104*c*.

Evan 104*a* performs the subprocess 312*a* or 322*a* of FIG. 3*b* or 3*c*. In so doing, Evan 104*a* sends his bitstring to Alice 102*a*, encoded using quantum bits. Alice 102*a* measures those bits using a random choice of basis. Evan 104*a* announces to Alice 102*a* which basis he used to prepare the quantum bits, but Alice 102*a* withholds or does not announce to Evan 104*a* which ones Alice 102*a* measured in. Using this information, Alice 102*a* is able to determine which bits Evan 104*a* has sent from the original bitstring Evan 104*a* sent to Alice 102*a* (assuming no errors or eavesdropping). However, Evan 104*a* has no information whatever about which bits those might be as they depend on the randomness of Alice's 102*a* measurements.

Since each intermediary device/node now has a shared key of length $\eta^{-1}N$ with its nearest-neighbour, Evan 104*a* is able to transmit the bitstring he transmitted to Alice 102*a* also of length $\eta^{-1}N$, with perfect fidelity using the shared keys as classical one-time pads. This communication is quantum-secure and information-theoretic secure since the one-time pad is completely random, and each party (e.g. Evan 104*a*, David 104*b*, Carol 104*c*, and Bob 102*b*) has used QKD to communication their shared keys to one another. In this way, Bob 102*b* is able to retrieve (over classical communication channels) a copy of the bitstring that Evan 104*a* transmitted to Alice 102*a*.

Now that Bob 102*b* has a copy of the bitstring Evan 104*a* sent to Alice 102*a*, Alice 102*a* can send her the bases she measured in for each bit. In contrast to BB84, these received bases cannot be announced publicly, since doing so would mean that Evan 104*a* could also determine the final key as he has a copy of the entire original bitstring. To avoid this, Alice 102*a* and Bob 102*b* create a classically encrypted communication channel 110 (e.g. using TLS or some other security or encryption protocol/scheme) to ensure that Evan 104*a* (and any other intermediary devices/nodes 104*b* and 104*c*) aren't able to discover Alice's 102*a* measurement bases (also known as, or referred to herein as, a random receiving basis set and the like). Other physical means could be deployed to ensure that the communication between Alice 102*a* and Bob 102*b* could not be made known to Evan 104*a* such as, without limitation, for example physical channel separation, together with monitoring of communications, could provide sufficient guarantees of separation. Regardless, it is preferable to use quantum-resistant encryption on this channel to improve practical security, even though the full theoretical security proof depends on the physical channel separation. Following well known practices from, without limitation, for example the BB84 protocol or any other similar QKD protocol for information reconciliation and privacy amplification, Alice 102*a* and Bob 102*b* can now distil the final shared key at an efficiency of $\eta$, resulting in a shared key length of $\eta \cdot \eta^{-1} N = N$.

Referring now to the key exchange process 402 of key exchange system 400, where the key exchange process 402 is read from top to bottom, with time advancing moving down the flow diagram. The key exchange process 402 is an illustration of how the first intermediate key information, which may include a first key or random bitstring $K_4$ that is exchanged between Evan 104*a* and Alice 102*a*, is securely forwarded and sent through to Bob 102*b* at the other end of the chain of devices using shared keys $K_3$, $K_2$, $K_1$ therebetween passing through intermediary nodes David 104*b* and Carol 104*c*. Thereafter a key exchange of a final shared key, derived from key $K'_4$, between Alice 102*a* and Bob 102*b* over communication channel 110 is performed.

In particular, in this example, the group of devices Evan 104*a*, David 104*b*, Carol 104*c* and Bob 102*b* form a chain of devices via communication links 108*a*, 108*b* and 106*b*. All of these communication links 108*a*, 108*b* and 106*b* include quantum channels/classical channels that are used by the group of devices of Evan 104*a*, David 104*b*, Carol 104*c* and Bob 102*b* to perform, without limitation, for example a full BB84 key exchange for exchanging shared keys $K_1$, $K_2$, and $K_3$ between the group of devices of Bob 102*b*, Carol 104*c*, David 104*b*, and Evan 104*a*. However, the communication link 106*a* from Evan 104*a* to Alice 102*a* is used to exchange Evan's random bitstring (or first intermediate key information) $K_4$ with Alice 102*a*, which receives the random bitstring $K_4$ as $K'_4$, where $K_4$ and $K'_4$ are different. The exchange of Evan's random bitstring (or first intermediate key information) $K_4$ with Alice 102*a* is based on a partial key exchange using, without limitation, for example the hybrid-BB84-based protocol 310 and/or the first subprocess 312*a* or 322*a* described with reference to FIGS. 3*b* and 3*c*, combinations thereof, modifications thereto and/or as herein described. The chain of devices formed by the communication links 108*a*, 108*b*, 106*b* connecting Evan 104*a*, David 104*b*, Carol 104*c* and Bob 102*b* is configured to securely forward the first intermediate key information, i.e. random bitstring $K_4$, from Evan 104*a* to Bob 102*b* at the other end of the chain using the shared keys $K_1$, $K_2$, and $K_3$. Evan's bit string $K_4$ that is used in the partial key exchange based on the hybrid-BB84-based protocol 310 with Alice 102*a* is passed along the chain from Evan 104*a* to Bob 102*b* using the BB84 negotiated shared keys.

In particular, the key exchange process 402 may include the following steps of: At time step $T_1$, Evan 104*a*, David 104*b*, Carol 104*c* and Bob 102*b* establish secret keys $K_1$, $K_2$, and $K_3$ between their nearest neighbours using a QKD protocol such as, without limitation, for example the BB84 protocol. For example, Bob 102*b* exchanges shared key $K_1$ with Carol 104*c*, Carol 104*c* exchanges shared key $K_2$ with David 104*b* $K_2$, and David 104*b* exchanges shared key $K_3$ with Evan 104*a*. The shared keys $K_1$, $K_2$, and $K_3$ are long enough to encrypt the bitstring $K_4$ (first intermediate key information) that Evan 104*a* sends to Alice 102*a* over communication link 106*a*. In this example, since David 104*c* is a satellite, he transmits along two channels: one to Carol 104*c*, and one to Evan 104*a*. Note that, in this example, the direction of quantum transmissions on the quantum channels of communication links 106*a* and 106*b* to Alice 102*a* and Bob 102*b*, respectively, mean that Alice 102*a* and Bob 102*b* only need quantum receiving equipment, not quantum transmitting equipment, simplifying the quantum apparatus required at the endpoints of Alice 102*a* and Bob 102*b*. Similarly, as David 104*b* is a satellite, in this example, the direction of quantum transmissions on the quantum channels of communication links 108*a* and 108*b* to Evan 104*a* and Carol 104*c*, respectively, mean that Evan 104*a* and Carol 104*c* only need an quantum receiving equipment such as, without limitation, for example an OGR, not quantum transmitting equipment such as, without limitation, for example an optical ground based laser, which also simplifies the quantum apparatus required at the satellite David 104*c* and hubs of Evan 104*a* and Carol 104*c*.

As well, in time step $T_1$, Evan 104*a* performs a partial key exchange with Alice 102*a* by sending his bitstring $K_4$ (e.g. first intermediate set of symbols, first set of symbols or first intermediate key information) to Alice 102*a* as a quantum transmission over quantum channel of communication link 106*a*, where Alice 102*a* receives the quantum transmissions by measuring in random receiving bases, i.e. a random receiving basis set, to receive the transmitted symbols/bits of the bitstring $K_4$. As well, Evan 104*a* shares his transmitted bases, i.e. a random transmitting basis set, with Alice 102*a* over the classical channel of communication link 106*a* (and/or can do so publicly so that Bob 102*b* also has access to Evan's transmitted bases), but Alice 102*a* withholds sharing her random receiving basis set (e.g. random receiving bases) and so does not share her measured bases with Evan 104*a* at all. Alice 102*a* makes measurements using her and recording the results to generate a received first set of symbols/bits. When Evan 104*a* announces the transmitting bases he prepared his states in for transmitting the bitstring $K_4$ over the quantum channel to Alice 102*a*, Alice 102*a* is able to determine the bits/symbols where Alice 102*a* measured in the same basis as Evan 104*a* prepared. For Alice 102*a*, the received first set of symbols/bits are effectively passed through a filter 322*a*/314*a*, where the bits/symbols of the received first set of symbols/bits that were measured in the same basis that Carol 104*c* prepared them in for transmission are allowed to pass through, and other bits/symbols are not. The bits/symbols that pass through form a first received intermediate set of symbols/bits $K'_4$ at Alice 102*a*. It is noted that the first received intermediate set of symbols/bits $K'_4$ is not a perfect copy of the original random bitstring $K_4$ transmitted from Evan 104*a* to Alice 102*a*.

At time step $T_2$, Evan 104*a* encrypts the random bitstring $K_4$ by XORing (e.g. represented by ⊕ operator) it with the shared key $K_3$ that Evan 104*a* exchanged with David 104*b* (e.g. $K_3$ XOR $K_4$ also denoted as $K_3 \oplus K_4$). This result, the encrypted random bit string $K_3$ XOR $K_4$, is sent to David 104*b*, where David 104*b* applies his shared key $K_3$ to the encrypted random bit string $K_3$ XOR $K_4$ (e.g. $K_3$ XOR ($K_3$ XOR $K_4$)=$K_4$) to decrypt/retrieve $K_4$.

At time step $T_3$, David 104*b* then re-encrypts $K_4$ with the shared key $K_2$ that David 104*b* exchanged with Carol 104*c* (e.g. $K_2$ XOR $K_4$ also denoted as $K_2 \oplus K_4$) and sends it to Carol 104*c*, where Carol 104*c* similarly applies her shared key $K_2$ to the re-encrypted random bit string $K_2$ XOR $K_4$ (e.g. $K_2$ XOR ($K_2$ XOR $K_4$)=$K_4$) to decrypt/retrieve $K_4$.

At time step $T_4$, Carol 104*c* then re-encrypts $K_4$ with the shared key $K_1$ that Carol 104*c* exchanged with Bob 102*b* (e.g. $K_1$ XOR $K_4$ also denoted as $K_1 \oplus K_4$) and sends it to Bob 102*b* over communication link 106*b*. Bob 102*b* similarly applies his shared key $K_1$ to the re-encrypted random bit string $K_1$ XOR $K_4$ (e.g. $K_1$ XOR ($K_1$ XOR $K_4$)=$K_4$) to decrypt/retrieve $K_4$.

At time step, $T_5$, Alice 102*a* and Bob 102*b* create a classically encrypted channel 110, (e.g. TLS), which Alice 102*a* uses at 110*a* to send her receiving measurement bases (i.e. the random receiving basis set used by Alice 102*a* to receive the bitstring $K_4$ from Evan 104*c* over communication link 106*a*) to Bob 102*b*. Bob 102*b* uses Alice's receiving measurement bases and Evan's transmitting bases used to transmit the original random bitstring $K_4$ to filter $K_4$ to form the same filtered version of $K_4$, namely, $K'_4$ that Alice 102*a* has.

At time step $T_6$, Alice 102*a* and Bob 102*b* then perform at 110*b* any reconciliation operations/processing that may be required including, without limitation, for example error detection/correction and/or information reconciliation and privacy amplification (IR/PA), which may transforms $K'_4$ into the final shared key $K^F$ between Alice 102*a* and Bob 102*b*.

Referring to FIG. 4*a*, all the devices (e.g. Evan 104*a*, David 104*b*, Carol 104*c*, and Bob 102*b*) on communication links 108*a*, 108*b* and 106*b* with quantum channels except those on communication link 106*a* are configured to, without limitation, for example perform a full BB84 exchange when sharing keys $K_1$, $K_2$, and $K_3$ with each other. The communication link 106*a* with the quantum channel between Evan 104*a* and Alice 102*a* is used to perform another QKD protocol, e.g. a first QKD protocol, such as, without limitation, for example a portion of the hybrid-BB84-based protocol 310, 314*a*, 322*a* as described with reference to FIGS. 3*a* to 4*a* and/or any other QKD protocol in which Alice 102*a* withholds key information (e.g. transmitting or receiving basis information/sets) from Evan 104*a* in which only a partial exchange is performed. The full exchange of the first key exchange protocol (e.g. the hybrid-BB84-based protocol 310 is performed once Bob 102*b* has securely received the required first intermediate key information, $K_4$, for completing the secure exchange of the shared final key, $K^F$, between Alice 102*a* and Bob 102*b* over the secure communication link/channel 110. The initial partial exchange also ensures a level of security such that none of Evan 104*a*, David 104*b*, Carol 104*c* or even Bob 102*b* (until the final key exchange with Alice 102*a* over the secure communication channel 110) know what bits/symbols of the bitstring $K_4$ that Alice 102*a* received, thus none of these devices should be able to derive the final shared key, $K^F$, should they (e.g. Evan 104*a*, David 104*b*, Carol 104*c*) be deemed untrustworthy devices or untrusted for any reason. Each intermediary device will not have the full bitstring and/or symbols received/transmitted by Alice 102*a* due to the partial exchange between Alice 102*a* and Evan 104*a*. As long as the communication channel 110 is secure between Alice 102*a* and B0*b* 102*b* and Alice 102*a* and Bob 102*b* the endpoint devices do not reveal the withheld key information (e.g. receiving or measured bases, random receiving basis set), then the intermediary devices should not be able to derive the final shared key, $K^F$, between Alice 102*a* and Bob 102*b*. However, the partial exchange does not have to be performed on the communication link 106*a* between Evan 104*a* and Alice 102*a*, rather, it could instead be reversed in which the partial exchange is performed on the connection or communication link 106*b* between Bob 102*b* and Carol 104*c*, which may depend on the reliability of the quantum channel of the communication links 106*a* or 106*b*. For simplicity, it is noted that the endpoint (e.g. Alice 102*a*) that has the full key information from the partial exchange should be considered trusted and so, such an endpoint should be at the start or end of the chain of intermediary devices, since the parties/endpoints that are communicating and sharing the final key to ensure secure communications therebetween have to be able to trust themselves.

Given the potentially large number of nodes/intermediary devices 104*a*-104*n* (e.g. in FIG. 4*a* there are 3 intermediary devices 104*a*, 104*b* and 104*c*) that can be placed in the chain of devices between Alice 102*a* and Bob 102*b* it will be difficult for Alice 102*a* and Bob 102*b* to be completely satisfied about the identity of every intermediary device therebetween. One strategy is for each intermediary device is to authenticate with its nearest neighbours (e.g. using classical MAC) but Alice 102*a* and Bob 102*b* will still need to trust that the intermediary devices are properly interrogating their nearest neighbours. This is slightly mitigated if one organisation owns the entire network infrastructure of the intermediary devices, but in reality there might be boundaries between network portions, for example, the satellite intermediary devices (e.g. David 104*b*) may be operated and owned by one organisation and the regional hub intermediary devices (e.g. Evan 104*a* and Carol 104*c*) may be operated and owned by another organisation.

Hypothetically, any of the intermediary communication links 108*a*-108*m* and/or corresponding intermediary nodes 104*a*-104*n* (e.g. communication links 108*a* and 108*b* connecting Evan 104*a*, David 104*b* and Carol 104*c*) could be replaced by an insecure link/intermediary device that revealed the contents; that information could be combined with eavesdropped information on the encrypted communication link 110 between Alice 102*a* and Bob 102*b*, in order to reveal the keys. Thus, for higher security, it may be necessary for Alice 102*a* and Bob 102*b* to trust the operators of the network that such substitution has not been performed. This can be mitigated by the equipment manufacturer, who could provide a resilient process to individually authenticate each intermediary device/node, for example by secure functions to read a per-device identifier, or my Message Authentication Codes (MAC) on each classical channel message. These authenticated messages are required as part of standard BB84 and similar QKD protocols. If the messages are also sent or relayed to the endpoints (e.g. Alice 102*a* and Bob 102*b*) or end node, those endpoints can also be assured that the intermediary devices/node are authorised.

As noted, the BB84 protocol requires pairs of devices to be authenticated. Existing techniques would be used for this, especially use of pre-shared keys for provably quantum safe information theoretic authentication, and which are refreshed from the shared QKD key bits. These pair-wise authentication processes will therefore require additional protocol exchanges between each pair of nodes.

Referring to FIG. 4*a*, all the devices on communication links 108*a*, 108*b* and 106*b* with quantum channels except those on communication link 106*a* are configured to, without limitation, for example perform a full BB84 exchange when sharing keys with each other. The communication link 106*a* with the quantum channel between Evan 104*a* and Alice 102*a* is used to perform another QKD protocol, e.g. a first QKD protocol, such as, without limitation, for example a portion of the hybrid-BB84-based protocol 310, 314*a*, 322*a* as described with reference to FIGS. 3*a* to 4*a* and/or any other QKD protocol in which the endpoint device withholds key information (e.g. transmitting or receiving basis information/sets) from the intermediary device in which only a partial exchange is performed, where the full exchange is performed once the other endpoint device has securely received the required first intermediate key information to complete the secure exchange of the shared final key between the devices over a secure communication link/channel 110. The partial exchange also ensures a level of security should the intermediary devices be untrustworthy devices, as each intermediary device will not have the full bitstring and/or symbols received/transmitted by the endpoint device it performed the partial exchange with. As long as the communication channel 110 is secure between the endpoint devices and the endpoint devices do not reveal the withheld key information (e.g. receiving or measured bases, random receiving basis set), then the intermediary devices should not be able to derive the final shared key between the endpoint devices. However, this partial exchange does not have to be performed on the communication link 106*a* between Evan 104*a* and Alice 102*a*, rather, it could instead be reversed in which the partial exchange is performed on the connection or communication link 106*b* between Bob 102*b* and Carol 104*c*. As an option, the highest quality (i.e. most lossless) quantum channel on the communication link between one of the endpoint devices and an intermediary device may be selected as the one that does the partial exchange since that is the one that's most sensitive to loss. The network can be organised in this manner to maximise efficiency.

Although each of the intermediary devices 104*a*-104*c* of the key exchange system 400 of FIG. 4*a* may not know the bitstring that Alice 102*a* receives from Evan's bitstring, each of the intermediary devices 104*a*-104*c* decrypts and encrypts the first intermediate key information (e.g. Evan's original bitstring $K_4$) and thus knows the entire bitstring $K_4$. This may pose a problem as Evan's bitstring is transmitted to each intermediary device 104*b* and 104*c* in the chain of intermediary devices 104*a*-104*c* and Bob 102*b*, where each intermediary device 104*b* and 104*c* decrypts it in turn then re-encrypts it. That means every intermediary device 104*b*-104*c* (e.g. 104*b*-104*n* should there be N intermediary devices) has knowledge of Evan's original bitstring $K_4$ at some point. As mentioned, while this information is useless without knowing the measurement bases used by Alice 102*a*, it does mean that more of the intermediary devices 104*b* and 104*c* have been given some level of trust. An alternative approach may be to change the order of classical transmissions so that all the key information is given to Bob 102*b* directly, who can then apply each key in turn to recover the original bitstring $K_4$.

Figure 4B:
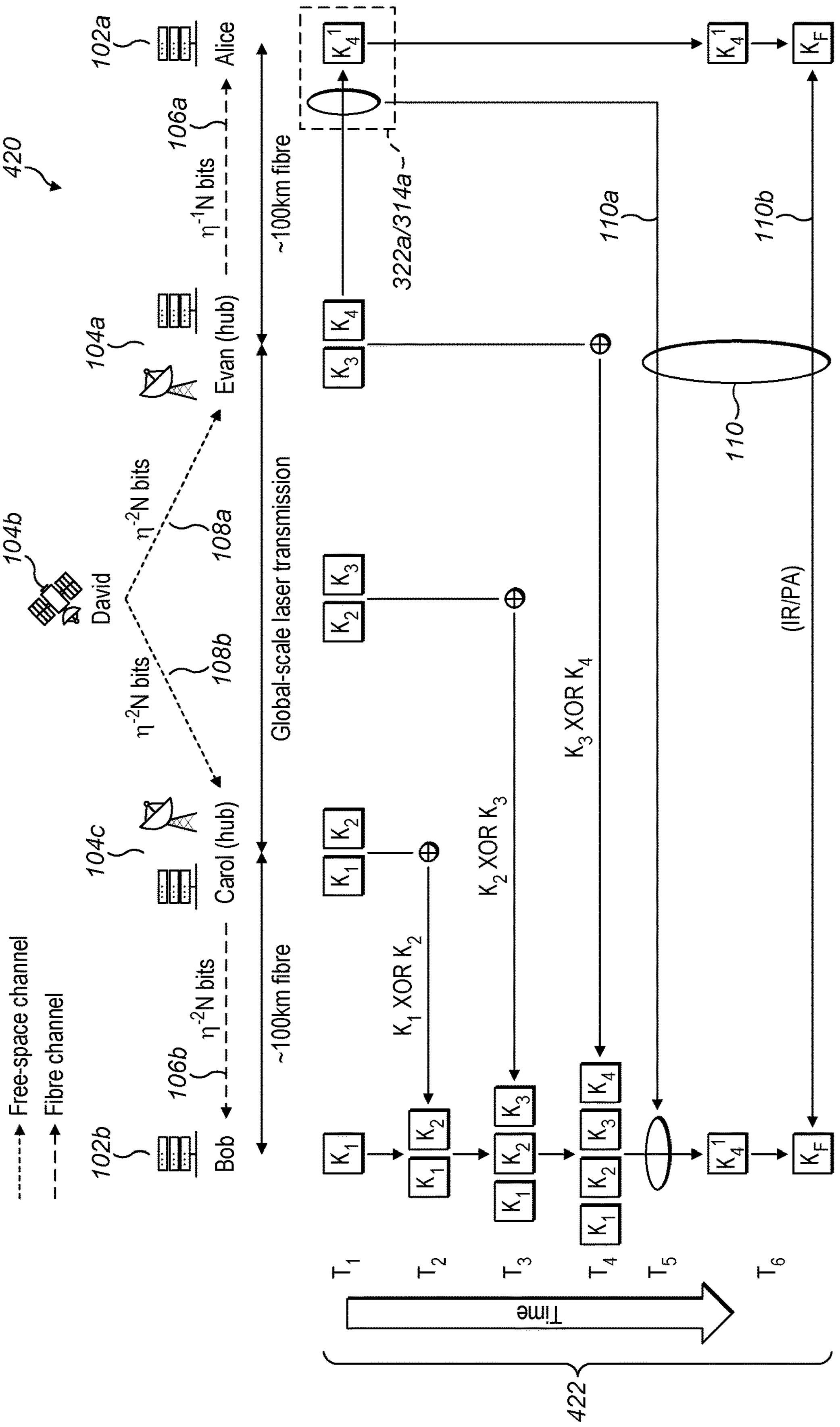
FIG. 4*b* is a schematic diagram illustrating another example key exchange system and associated shared key accumulation/processing according to the invention based on the key exchange system and process(es) of FIGS. 1*a* to 4*a;*

FIG. 4*b* is a schematic and flow diagram illustrating a further example key exchange system 420 and key exchange process 422 based on the key exchange system 400 and process(es) thereof of FIG. 4*a*, and/or the key exchange systems of FIGS. 1*a* to 2*d* and 3*a*-3*c* using a quantum-classical key exchange protocol according to the invention. The key exchange systems 100, 120, 130, 200, 210, 220, 230, 300, 310, 320, 400 and process(es) 140, 150, 160, 170 of FIGS. 1*a* to 1*g*, 2*a* to 2*d*, and 3*a* to 4*a* are further modified based on key exchange system 420. For simplicity, the reference numerals of FIGS. 1*a* to 1*c* and 3*a*-3*c* and 4*a* will be referred to for the same and/or similar components and/or features and the like in relation to FIG. 4*b*. The key exchange system 420 includes a first endpoint device 102*a* (e.g. Alice) and a second endpoint device 102*b* (e.g. Bob) in communication with each other via one or more intermediary devices 104*a*-104*c* (e.g. Evan, David and Carol) over communication links 106*a*, 108*a*, 108*b* and 106*b* connected therebetween.

As described with reference to FIG. 4*a*, the BB84 protocol and also a part of the hybrid-BB84-based protocol (e.g. see FIGS. 4*a* and 3*b*) are used in this example, this is by way of example only and the invention is not so limited, the skilled person in the art would appreciate that any QKD protocol/process that allows the generation of a shared key between two devices that provides OTP and/or XOR encryption of the raw key material as it is relayed between intermediary devices (e.g. intermediate nodes) may be used as a key exchange protocol used between devices. The first device 102*a* is referred to as Alice, the second device 102*b* is referred to as Bob, the first intermediary device 104*a* is referred to as Evan, the second intermediary device 104*b* is referred to as David, and the last or N-th intermediary device 104*c* (third intermediary device) is referred to as Carol (e.g. N=3 in this example).

In this example, rather than the David 104*b* and Carol 104*c* decrypting and re-encrypting the first intermediate key information using their shared keys as described with reference to FIG. 4 and/or as described herein (e.g. Evan's original random bitstring or the first set of symbols and the like), the key exchange process 422 may modify key exchange process 402 such that all shared keys $K_1$, $K_2$, and $K_3$ accumulate at Bob 102*b*, meaning that only he is able to decrypt Evan's bitstring $K_4$. In this way, only Bob 102*b* and Evan 104*a* only ever end up knowing the original bitstring $K_4$, reducing the trust requirement in the network. A further advantage of key exchange process 422 may be that sending and accumulating shared keys at Bob 102*b* may allow alterative classical communication channels to be used between Evan 104*a* and Bob 102*b* when sending the encrypted bitstring $K_4$. For example, when the classical communication from Evan 104*a* to David 104*b* (e.g. satellite) is likely more difficult than from Evan 104*a* to Alice 102*a* or even from Evan 104*a* to Bob 102*b*, since both Evan 104*a* and Alice 102*a* and/or Bob 102*b* are terrestrial and have access to internet infrastructure, then when David 104*b* is in range, David 104*b* sends to Bob 102*b* data representative of David's shared keys with Carol 104*c* and Evan 104*a* in encrypted form, which Bob 102*b* can decrypt and retrieve once Bob 102*b* has received from Carol 104*c* Carol's shared keys with David 104*b* and Bob 102*b*. This is because, communication between Evan 104*a* and David 104*b* and/or David 104*b* to Carol 104*c* is perhaps not even possible at certain times of day when the satellite of David 104*b* is not overhead (although could be achieved using a relay of satellites of a mesh satellite network and the like—i.e. communication links 108*a* or 108*b* may include further intermediary satellites that may act as a relay to David 104*b* and the like.) Furthermore, accumulating the shared keys $K_1$, $K_2$, and $K_3$ at Bob 102*b* also allows the Bob 102*b* to authenticate each of the intermediary devices 104*a*, 104*b* and 104*c*, without needing messages to be relayed between them. Additionally or alternatively, two or more shared keys $K_1$, $K_2$, and $K_3$ may also accumulate at other intermediary devices, e.g. Carol 104*c*, if this was practically easier than accumulating them at Bob 102*b*, or if the keys $K_2$ and $K_3$ were to be reused by Carol 104*c* and David 104*b*.

In any event, in this example as illustrated in FIG. 4*b*, the key exchange process 422 for accumulating shared keys $K_1$, $K_2$, and $K_3$ at Bob 102*b* may include the following steps of: At time step $T_1$, Evan 104*a*, David 104*b*, Carol 104*c* and Bob 102*b* establish secret keys $K_1$, $K_2$, and $K_3$ between their nearest neighbours using a QKD protocol such as, without limitation, for example the BB84 protocol. For example, Bob 102*b* exchanges shared key $K_1$ with Carol 104*c*, Carol 104*c* exchanges shared key $K_2$ with David 104*b* $K_2$, and David 104*b* exchanges shared key $K_3$ with Evan 104*a*. The shared keys $K_1$, $K_2$, and $K_3$ are long enough to encrypt the bitstring $K_4$ (first intermediate key information) that Evan 104*a* sends to Alice 102*a* over communication link 106*a*. In this example, since David 104*c* is a satellite, he transmits along two channels: one over communication link 108*b* to Carol 104*c*, and one over communication link 108*a* to Evan 104*a*. Note that, in this example, the direction of quantum transmissions on the quantum channels of communication links 106*a* and 106*b* to Alice 102*a* and Bob 102*b*, respectively, mean that Alice 102*a* and Bob 102*b* only need quantum receiving equipment, not quantum transmitting equipment, simplifying the quantum apparatus required at the endpoints of Alice 102*a* and Bob 102*b*. Similarly, as David 104*b* is a satellite, in this example, the direction of quantum transmissions on the quantum channels of communication links 108*a* and 108*b* to Evan 104*a* and Carol 104*c*, respectively, mean that Evan 104*a* and Carol 104*c* only need an quantum receiving equipment such as, without limitation, for example an OGR, not quantum transmitting equipment such as, without limitation, for example an optical ground based laser, which also simplifies the quantum apparatus required at the satellite David 104*c* and hubs of Evan 104*a* and Carol 104*c*.

As well, in time step $T_1$, Evan 104*a* performs a partial key exchange with Alice 102*a* by sending his bitstring $K_4$ (e.g. first intermediate set of symbols, first set of symbols or first intermediate key information) to Alice 102*a* and as a quantum transmission over quantum channel of communication link 106*a*, where Alice 102*a* receives the quantum transmissions by measuring in random receiving bases, i.e. a random receiving basis set, to receive the transmitted symbols/bits of the bitstring $K_4$. As well, Evan 104*a* shares his transmitted bases, i.e. a random transmitting basis set, with Alice 102*a* over the classical channel of communication link 106*a* (and/or can do so publicly so that Bob 102*b* also has access to Evan's transmitted bases), but Alice 102*a* withholds sharing her random receiving basis set (e.g. random receiving bases) and so does not share her measured bases with Evan 104*a* at all. Alice 102*a* makes measurements using her and recording the results to generate a received first set of symbols/bits. When Evan 104*a* announces the transmitting bases he prepared his states in for transmitting the bitstring $K_4$ over the quantum channel to Alice 102*a*, Alice 102*a* is able to determine the bits/symbols where Alice 102*a* measured in the same basis as Evan 104*a* prepared. For Alice 102*a*, the received first set of symbols/bits are effectively passed through a filter 322*a*/314*a*, where the bits/symbols of the received first set of symbols/bits that were measured in the same basis that Carol 104*c* prepared them in for transmission are allowed to pass through, and other bits/symbols are not. The bits/symbols that pass through form a first received intermediate set of symbols/bits $K'_4$ at Alice 102*a*. It is noted that the first received intermediate set of symbols/bits $K'_4$ is not a perfect copy of the original random bitstring $K_4$ transmitted from Evan 104*a* to Alice 102*a*.

At time step $T_2$, Carol 104*c* encrypts her shared keys $K_1$ and $K_2$ (e.g. Carol 104*c* exchanged shared key $K_1$ with Bob 102*b* using BB84 protocol and the like, and Carol 104*c* exchanged shared key $K_2$ with David 104*b* using BB84 protocol and the like) together using OTP operations forming an encrypted shared key $K_1$ XOR $K_2$, also denoted as $K_1 \oplus K_2$. Carol 104*c* sends the encrypted shared keys $K_1$ XOR $K_2$ to Bob 102*b* over the classical channel of communication link 106*b*. Bob 102*b* similarly applies his shared key $K_1$ to the encrypted shared key $K_1$ XOR $K_2$ from Carol 104*c* to retrieve shared key $K_2$ (e.g. $K_1$ XOR ($K_1$ XOR $K_2$)=$K_2$).

At time step $T_3$, David 104*b* encrypts his shared keys $K_2$ and $K_3$ (e.g. Carol 104*c* exchanged shared key $K_2$ with David 104*b* using BB84 protocol and the like, and David 104*b* exchanged shared key $K_3$ with Evan 104*a* using BB84 protocol and the like) together using OTP operations forming an encrypted shared key $K_2$ XOR $K_3$, also denoted as $K_2 \oplus K_3$. David 104*b* sends the encrypted shared keys $K_2$ XOR $K_3$ to Bob 102*b* via Carol 104*c* over the classical channel of communication links 108*b* and 106*b*. Bob 102*b* similarly applies his accumulated shared key $K_2$ to the encrypted shared key $K_2$ XOR $K_3$ from David 104*b* to retrieve shared key $K_3$ (e.g. $K_2$ XOR ($K_2$ XOR $K_3$)=$K_3$).

At time step $T_4$, Evan 104*a* encrypts the random bitstring $K_4$ by XORing (e.g. represented by $\oplus$ operator) it with the shared key $K_3$ that Evan 104*a* exchanged with David 104*b* (e.g. $K_3$ XOR $K_4$ also denoted as $K_3 \oplus K_4$). Evan 104*a* sends the encrypted random bitstring $K_3$ XOR $K_4$ to Bob 102*b* via David 104*b* and Carol 104*c* over the classical channels of communication links 108*a*, 108*b* and 106*b*. Alternatively, Evan 104*a* may send the encrypted random bitstring $K_3$ XOR $K_4$ to Bob 102*b* via another terrestrial communication channel to Bob 102*b* should David 104*b* not be in range, or via relay satellites through to Carol 104*c* then to Bob 102*b*. This is because the random bitstring is encrypted with the shared key $K_3$, so any communication path should be sufficiently secure as long as no-one else, apart from Bob 102*b* or David 104*b*, has the shared key $K_3$. Bob 102*b* similarly applies his accumulated shared key $K_3$ to the encrypted random bitstring $K_3$ XOR $K_4$ from Evan 104*a* to retrieve the original random bitstring $K_4$ (e.g. $K_3$ XOR ($K_3$ XOR $K_4$)=$K_4$) that was used in the partial key exchange between Evan 104*a* and Alice 102*a*.

At time step, $T_5$, Alice 102*a* and Bob 102*b* create a classically encrypted channel 110, (e.g. TLS), which Alice 102*a* uses at 110*a* to send her receiving measurement bases (i.e. the random receiving basis set used by Alice 102*a* to receive the bitstring $K_4$ from Evan 104*c* over communication link 106*a*) to Bob 102*b*. Bob 102*b* uses Alice's receiving measurement bases and Evan's transmitting bases used to transmit the original random bitstring $K_4$ to filter $K_4$ to form the same filtered version of $K_4$, namely, $K'_4$ that Alice 102*a* has.

At time step $T_6$, Alice 102*a* and Bob 102*b* then perform at 110*b* any reconciliation operations/processing that may be required including, without limitation, for example error detection/correction and/or information reconciliation and privacy amplification (IR/PA), which may transforms $K'_4$ into the final shared key $K^F$ between Alice 102*a* and Bob 102*b*.

Alternatively, rather than accumulating shared keys at Bob 102*b* or any other intermediary device such as Carol 104*c*, each of the intermediary devices Carol 104*c* and David 104*b* other than Evan 104*a* may combine their shared keys to each form a "super" key, and simply re-encrypt Evan's encrypted original bitstring as it passes through said intermediary device towards Bob 102*b*. Thus, based on the property of XORs, all Bob 102*b* has to do is use his shared key with Carol 104*c* to decrypt the re-encrypted original bitstring. In particular, the key exchange process 422 may be further modified based on the following steps of: At time step $T_1$, Evan 104*a*, David 104*b*, Carol 104*c* and Bob 102*b* establish secret keys $K_1$, $K_2$, and $K_3$ between their nearest neighbours using a QKD protocol such as, without limitation, for example the BB84 protocol. For example, Bob 102*b* exchanges shared key $K_1$ with Carol 104*c*, Carol 104*c* exchanges shared key $K_2$ with David 104*b* $K_2$, and David 104*b* exchanges shared key $K_3$ with Evan 104*a*. The shared keys $K_1$, $K_2$, and $K_3$ are long enough to encrypt the bitstring $K_4$ (first intermediate key information) that Evan 104*a* sends to Alice 102*a* over communication link 106*a*. Thus, Bob 102*b* only has one shared key $K_1$, Carol 104*c* has a pair of shared keys $K_1$ and $K_2$, David also has a pair of shared keys $K_2$ and $K_3$. Thus, each of Carol 104*c* and David 104*b* create a "super" key $K_C$ and $K_D$, respectively, by XORing their pairs of shared keys. For example, Carol 104*c* creates key $K_C$=$K_1$ XOR $K_2$ and David creates $K_D$=$K_2$ XOR $K_3$. At this point, Carol 104*c* and David 104*b* might simply destroy their pairs of keys $K_1$ and $K_2$ and $K_2$ and $K_3$, where Carol 104*c* uses key $K_C$ for encryption and David uses key $K_D$ for encryption.

As well, in time step $T_1$, Evan 104*a* performs a partial key exchange with Alice 102*a* by sending his bitstring $K_4$ (e.g. first intermediate set of symbols, first set of symbols or first intermediate key information) to Alice 102*a* and as a quantum transmission over quantum channel of communication link 106*a*, where Alice 102*a* receives the quantum transmissions by measuring in random receiving bases, i.e. a random receiving basis set, to receive the transmitted symbols/bits of the bitstring $K_4$. As well, Evan 104*a* shares his transmitted bases, i.e. a random transmitting basis set, with Alice 102*a* over the classical channel of communication link 106*a* (and/or can do so publicly so that Bob 102*b* also has access to Evan's transmitted bases), but Alice 102*a* withholds sharing her random receiving basis set (e.g. random receiving bases) and so does not share her measured bases with Evan 104*a* at all. Alice 102*a* makes measurements using her and recording the results to generate a received first set of symbols/bits. When Evan 104*a* announces the transmitting bases he prepared his states in for transmitting the bitstring $K_4$ over the quantum channel to Alice 102*a*, Alice 102*a* is able to determine the bits/symbols where Alice 102*a* measured in the same basis as Evan 104*a* prepared. For Alice 102*a*, the received first set of symbols/bits are effectively passed through a filter 322*a*/314*a*, where the bits/symbols of the received first set of symbols/bits that were measured in the same basis that Carol 104*c* prepared them in for transmission are allowed to pass through, and other bits/symbols are not. The bits/symbols that pass through form a first received intermediate set of symbols/bits $K'_4$ at Alice 102*a*. It is noted that the first received intermediate set of symbols/bits $K'_4$ is not a perfect copy of the original random bitstring $K_4$ transmitted from Evan 104*a* to Alice 102*a*.

At time step $T_2$, Evan 104*a* encrypts the random bitstring $K_4$ by XORing (e.g. represented by $\oplus$ operator) it with the shared key $K_3$ that Evan 104*a* exchanged with David 104*b* (e.g. $K_3$ XOR $K_4$ also denoted as $K_3 \oplus K_4$). This result, the encrypted random bit string $K_3$ XOR $K_4$, is sent to David 104*b*.

At time step $T_3$, David 104*b* then re-encrypts the encrypted random bitstring $K_3$ XOR $K_4$ with the "superkey" $K_D$ that David 104*b* created (e.g. $K_D$ XOR ($K_3$ XOR $K_4$)) and sends the resulting encrypted random bitstring $K_D$ XOR ($K_3$ XOR $K_4$) to Carol 104*c*.

At time step $T_4$, Carol 104*c* then re-encrypts the received encrypted random bitstring $K_D$ XOR ($K_3$ XOR $K_4$) with her "superkey" $K_C$ that Carol 104*c* created (e.g. $K_C$ XOR ($K_D$ XOR ($K_3$ XOR $K_4$))) and sends the resulting encrypted random bitstring $K_C$ XOR ($K_D$ XOR ($K_3$ XOR $K_4$)) to Bob 102*b* over communication link 106*b*. Bob 102*b* similarly applies his shared key $K_1$ to the encrypted random bit string to retrieve the original bit string $K_4$. For example, given $K_C$=$K_1$ XOR $K_2$ and $K_D$=$K_2$ XOR $K_3$, then $K_1$ XOR [$K_C$ XOR ($K_D$ XOR ($K_3$ XOR $K_4$))]=$K_1$ XOR [($K_1$ XOR $K_2$) XOR (($K_2$ XOR $K_3$) XOR ($K_3$ XOR $K_4$))]$K_4$)=$K_1$ XOR [($K_1$ XOR $K_4$))]=$K_1$ XOR [($K_1$ XOR $K_4$)]=$K_4$.

At time step, $T_5$, Alice 102*a* and Bob 102*b* create a classically encrypted channel 110, (e.g. TLS), which Alice 102*a* uses at 110*a* to send her receiving measurement bases (i.e. the random receiving basis set used by Alice 102*a* to receive the bitstring $K_4$ from Evan 104*c* over communication link 106*a*) to Bob 102*b*. Bob 102*b* uses Alice's receiving measurement bases and Evan's transmitting bases used to transmit the original random bitstring $K_4$ to filter $K_4$ to form the same filtered version of $K_4$, namely, $K'_4$ that Alice 102*a* has.

At time step $T_6$, Alice 102*a* and Bob 102*b* then perform at 110*b* any reconciliation operations/processing that may be required including, without limitation, for example error detection/correction and/or information reconciliation and privacy amplification (IR/PA), which may transforms $K'_4$ into the final shared key $K^F$ between Alice 102*a* and Bob 102*b*.

Several of the steps in the key exchange processes 402 and/or 422 of FIGS. 4*a* and 4*b* and/or those the key exchange systems 100, 120, 130, 200, 210, 220, 230, 300, 310, 320, 400, 420 and/or process(es) 140, 150, 160, 170 of FIGS. 1*a* to 1*g*, 2*a* to 2*d*, and 3*a* to 4*b* can be performed well in advance of the final key agreement between Alice and Bob. For example, let's assume that Carol 104*c* is accumulates shared keys, then in principle, Evan 104*a*, David 104*b* and Carol 104*c* can perform their steps before a choice has been made about which two endpoints want to communicate, i.e. before Alice 102*a* and Bob 102*b* even want to communicate. This takes advantage of the satellite David 104*c* while it is available and provides extra flexibility in the network and key exchange system 400, 420 and the like. This is further illustrated in FIG. 4*c*.

Figure 4C:
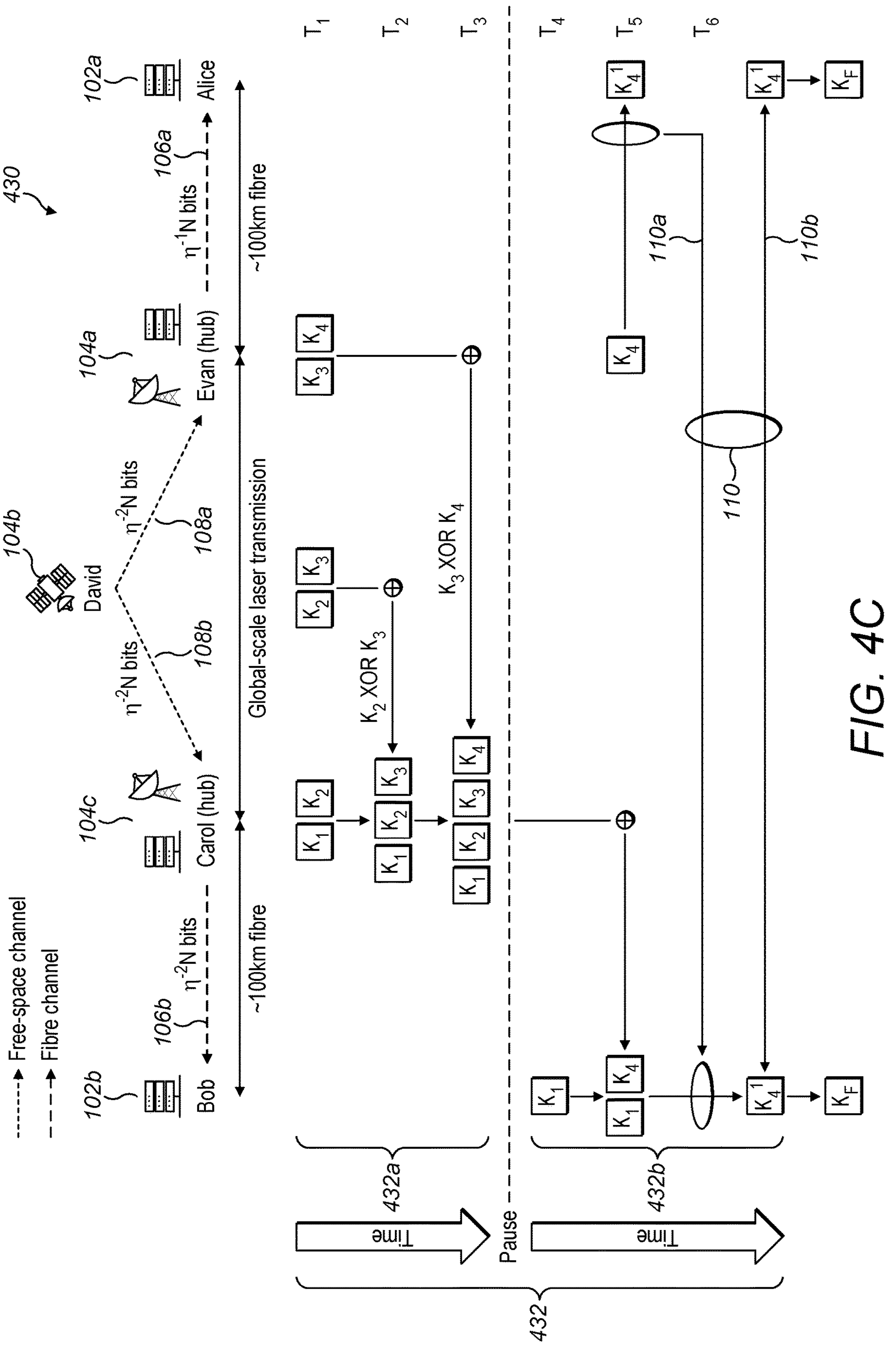
FIG. 4*c* is a schematic diagram illustrating a further example key exchange system and associated shared key accumulation/processing according to the invention based on the key exchange system and process(es) of FIGS. 1*a* to 4*b;*

FIG. 4*c* is a schematic and flow diagram illustrating a further example key exchange system 430 and key exchange process 432 based on the key exchange system 400 and 420 and process(es) thereof of FIGS. 4*a* and 4*b*, and/or the key exchange systems of FIGS. 1*a* to 2*d* and 3*a*-3*c* using a quantum-classical key exchange protocol according to the invention. The key exchange systems 100, 120, 130, 200, 210, 220, 230, 300, 310, 320, 400, 420 and process(es) 140, 150, 160, 170, 402, 422 of FIGS. 1*a* to 1*g*, 2*a* to 2*d*, and 3*a* to 4*b* are further modified based on key exchange system 430 and process 432. For simplicity, the reference numerals of FIGS. 1*a* to 1 *c* and 3*a*-3*c* and 4*a*-4*b* will be referred to for the same and/or similar components and/or features and the like in relation to FIG. 4*c*. The key exchange system 430 includes a first endpoint device 102*a* (e.g. Alice) and a second endpoint device 102*b* (e.g. Bob) in communication with each other via one or more intermediary devices 104*a*-104*c* (e.g. Evan, David and Carol) over communication links 106*a*, 108*a*, 108*b* and 106*b* connected therebetween.

As described with reference to FIG. 4*a*, the BB84 protocol and also a part of the hybrid-BB84-based protocol (e.g. see FIGS. 4*a* and 3*b*) are used in this example, this is by way of example only and the invention is not so limited, the skilled person in the art would appreciate that any QKD protocol/process that allows the generation of a shared key between two devices that provides OTP and/or XOR encryption of the raw key material as it is relayed between intermediary devices (e.g. intermediate nodes) may be used as a key exchange protocol used between devices. The first device 102*a* is referred to as Alice, the second device 102*b* is referred to as Bob, the first intermediary device 104*a* is referred to as Evan, the second intermediary device 104*b* is referred to as David, and the last or N-th intermediary device 104*c* (third intermediary device) is referred to as Carol (e.g. N=3 in this example).

As described, several of the steps in the key exchange processes 402 and/or 422 of FIGS. 4*a* and 4*b* and/or those the key exchange systems 100, 120, 130, 200, 210, 220, 230, 300, 310, 320, 400, 420 and/or process(es) 140, 150, 160, 170 of FIGS. 1*a* to 1*g*, 2*a* to 2*d*, and 3*a* to 4*b* can be performed well in advance of the final key agreement between Alice and Bob. In this example, it is assumed that an intermediary device, Carol 104*c*, is accumulating shared keys from the other intermediary devices, then in principle, Evan 104*a*, David 104*b* and Carol 104*c* can perform their steps before a choice has been made about which two endpoints want to communicate, i.e. before Alice 102*a* and Bob 102*b* even want to communicate. This takes advantage of the satellite David 104*c* while it is available and provides extra flexibility in the network and key exchange system 400, 420 and the like.

In this example, the key exchange process 432 may modify key exchange process 402 and 422 such that all shared keys $K_1$, $K_2$, and $K_3$ accumulate at Carol 104*c*, meaning that only she is able to decrypt Evan's bitstring $K_4$. In this way, only Carol 104*c* and Evan 104*a* (and later on Bob 102*b*) only ever end up knowing the original bitstring $K_4$. A further advantage of key exchange process 422 may be that sending and accumulating shared keys at Carol 104*c* may allow alterative classical communication channels to be used between Evan 104*a* and Bob 102*b* when sending the encrypted bitstring $K_4$.

In any event, in this example as illustrated in FIG. 4*c*, a first process 432*a* of the key exchange process 432 for accumulating shared keys $K_1$, $K_2$, and $K_3$ at Carol 102*c* may include the following steps of: At time step $T_1$, Evan 104*a*, David 104*b*, and Carol 104*c* establish secret keys $K_2$ and $K_3$ between their nearest neighbours using a QKD protocol such as, without limitation, for example the BB84 protocol. In this example, Carol 102*c* may also generate key $K_1$ or wait until Bob 102*b* is online and then establish shared key $K_1$ with Bob 102*b*, e.g. in time step $T_4$. For example, Carol 104*c* exchanges shared key $K_2$ with David 104*b*, and David 104*b* exchanges shared key $K_3$ with Evan 104*a*. The shared keys $K_1$, $K_2$, and $K_3$ are long enough to encrypt the bitstring $K_4$ (first intermediate key information) that Evan 104*a* also may generate in time step $T_1$, which will be sent at a later time, e.g. time step $T_5$ to Alice 102*a* over communication link 106*a*. In this example, since David 104*c* is a satellite, he transmits along two channels: one over communication link 108*b* to Carol 104*c*, and one over communication link 108*a* to Evan 104*a*. Note that, in this example, the direction of quantum transmissions on the quantum channels of communication links 106*a* and 106*b* to Alice 102*a* and Bob 102*b*, respectively, mean that Alice 102*a* and Bob 102*b* only need quantum receiving equipment, not quantum transmitting equipment, simplifying the quantum apparatus required at the endpoints of Alice 102*a* and Bob 102*b*. Similarly, as David 104*b* is a satellite, in this example, the direction of quantum transmissions on the quantum channels of communication links 108*a* and 108*b* to Evan 104*a* and Carol 104*c*, respectively, mean that Evan 104*a* and Carol 104*c* only need an quantum receiving equipment such as, without limitation, for example an OGR, not quantum transmitting equipment such as, without limitation, for example an optical ground based laser, which also simplifies the quantum apparatus required at the satellite David 104*c* and hubs of Evan 104*a* and Carol 104*c*.

At time step $T_2$, David 104*b* encrypts his shared keys $K_2$ and $K_3$ (e.g. Carol 104*c* exchanged shared key $K_2$ with David 104*b* using BB84 protocol and the like, and David 104*b* exchanged shared key $K_3$ with Evan 104*a* using BB84 protocol and the like) together using OTP operations forming an encrypted shared key $K_2$ XOR $K_3$, also denoted as $K_2 \oplus K_3$. David 104*b* sends the encrypted shared keys $K_2$ XOR $K_3$ to Carol 102*c* over the classical channel of communication link 108*b*. Carol 102*c* similarly applies her shared key $K_2$ to the encrypted shared key $K_2$ XOR $K_3$ from David 104*b* to retrieve shared key $K_3$ (e.g. $K_2$ XOR ($K_2$ XOR $K_3$)=$K_3$).

At time step $T_3$, Evan 104*a* generates random bitstring $K_4$ and encrypts the random bitstring $K_4$ by XORing (e.g. represented by $\oplus$ operator) it with the shared key $K_3$ that Evan 104*a* exchanged with David 104*b* (e.g. $K_3$ XOR $K_4$ also denoted as $K_3 \oplus K_4$). Evan 104*a* sends the encrypted random bitstring $K_3$ XOR $K_4$ to Carol 104*c* via David 104*b* over the classical channels of communication links 108*a* and 108*b*. Alternatively, Evan 104*a* may send the encrypted random bitstring $K_3$ XOR $K_4$ to Carol 104*c* via another terrestrial communication channel to Carol 104*c* should David 104*b* not be in range, or via relay satellites through to Carol 104*c*. This is because the random bitstring is encrypted with the shared key $K_3$, so any communication path should be sufficiently secure as long as no-one else, apart from Carol 104*c* or David 104*b*, has the shared key $K_3$. Carol 102*c* similarly applies her accumulated shared key $K_3$ to the encrypted random bitstring $K_3$ XOR $K_4$ from Evan 104*a* to retrieve the original random bitstring $K_4$ (e.g. $K_3$ XOR ($K_3$ XOR $K_4$)=$K_4$). $K_4$ will be used by Evan 104*a* in the partial key exchange between Evan 104*a* and Alice 102*a* at time step $T_5$.

Thus, first process 432*a* of process 432 has completed and Carol 104*c* and Evan 104*a* may wait until Bob 102*b* and/or Alice 102*a* request a key exchange for performing secure communications and the like with each other. The second process 432*b* of process 432 proceeds when Bob 102*b* or Alice 102*a* request secure communications, the second process 432*b* of process 432 may include the following steps of:

At time step, $T_4$, after a pause or once Bob 102*b* and/or Alice 102*a* request to communicate over a secure communications channel. In response, Carol 104*c* and Bob 102*b* exchange a shared key $K_1$ using the quantum channel of the communication link 106*b* and a QKD protocol such as, without limitation for example the BB84 protocol.

At time step, $T_5$, Carol 104*c* encrypts the accumulated original bitstring $K_4$ with the shared key $K_1$ to form encrypted bitstring $K_1$ XOR $K_4$ (e.g. $K_1$ XOR $K_4$ also denoted as $K_1 \oplus K_4$) and sends it to Bob 102*b* over communication link 106*b*. Bob 102*b* similarly applies his shared key $K_1$ to the encrypted random bit string $K_1$ XOR $K_4$ (e.g. $K_1$ XOR ($K_1$ XOR $K_4$)=$K_4$) to decrypt/retrieve $K_4$.

As well, at around the same time as time steps $T_4$ or $T_5$, Evan 104*a* performs a partial key exchange with Alice 102*a* by sending his bitstring $K_4$ (e.g. first intermediate set of symbols, first set of symbols or first intermediate key information) to Alice 102*a* as a quantum transmission over quantum channel of communication link 106*a*, where Alice 102*a* receives the quantum transmissions by measuring in random receiving bases, i.e. a random receiving basis set, to receive the transmitted symbols/bits of the bitstring $K_4$. As well, Evan 104*a* shares his transmitted bases, i.e. a random transmitting basis set, with Alice 102*a* over the classical channel of communication link 106*a* (and/or can do so publicly so that Bob 102*b* also has access to Evan's transmitted bases), but Alice 102*a* withholds sharing her random receiving basis set (e.g. random receiving bases) and so does not share her measured bases with Evan 104*a* at all. Alice 102*a* makes measurements using her and recording the results to generate a received first set of symbols/bits. When Evan 104*a* announces the transmitting bases he prepared his states in for transmitting the bitstring $K_4$ over the quantum channel to Alice 102*a*, Alice 102*a* is able to determine the bits/symbols where Alice 102*a* measured in the same basis as Evan 104*a* prepared. For Alice 102*a*, the received first set of symbols/bits are effectively passed through a filter 322*a*/314*a*, where the bits/symbols of the received first set of symbols/bits that were measured in the same basis that Carol 104*c* prepared them in for transmission are allowed to pass through, and other bits/symbols are not. The bits/symbols that pass through form a first received intermediate set of symbols/bits $K'_4$ at Alice 102*a*. It is noted that the first received intermediate set of symbols/bits $K'_4$ is not a perfect copy of the original random bitstring $K_4$ transmitted from Evan 104*a* to Alice 102*a*.

At time step $T_6$, Alice 102*a* and Bob 102*b* create a classically encrypted channel 110, (e.g. TLS), which Alice 102*a* uses at 110*a* to send her receiving measurement bases (i.e. the random receiving basis set used by Alice 102*a* to receive the bitstring $K_4$ from Evan 104*c* over communication link 106*a*) to Bob 102*b*. Bob 102*b* uses Alice's receiving measurement bases and Evan's transmitting bases used to transmit the original random bitstring $K_4$ to filter $K_4$ to form the same filtered version of $K_4$, namely, $K'_4$ that Alice 102*a* has. Alice 102*a* and Bob 102*b* also perform at 110*b* any reconciliation operations/processing that may be required including, without limitation, for example error detection/correction and/or information reconciliation and privacy amplification (IR/PA), which may transforms $K'_4$ into the final shared key $K^F$ between Alice 102*a* and Bob 102*b*.

The following describes further modifications that may be made to key exchange systems 400, 420, 430 as described with reference to FIGS. 4*a* to 4*c* and/or to the key exchange systems 100, 120, 130, 200, 210, 220, 230, 300, 310, 320, 400, 420 and process(es) 140, 150, 160, 170, 402, 422, 432 of FIGS. 1*a* to 1*g*, 2*a* to 2*d*, and 3*a* to 4*b*. For simplicity, the reference numerals of FIGS. 1*a* to 1 *c* and 3*a*-3*c* and 4*a*-4*b* will be referred to for the same and/or similar components and/or features and the like. Some efficiency can be gained if Carol 104*c*, David 104*b* and Evan 104*a* reuse the keys that they have agreed between themselves rather than OTP encrypting the relay of each raw bitstring. For example, consider two new endpoints, Adam and Betty, who also want to agree a secret key. If Adam is connected to the same hub as Bob 102*b*, and similarly Betty is connected to the same hub as Evan 104*a*, then in principle all intermediary devices/nodes (e.g. Evan 104*a*, David 104*b* and Carol 104*c*) can reuse the keys they used before for transmitting Evan's bitstring $K_4$ (or the first intermediate key information). Note that reusing keys will mean that there is more chance that an attacker could discover the key used to protect the raw bitstring using statistical methods as there is no longer information theoretic security. This however may be acceptable depending on the security requirements of the customer (noting that in principle Alice's measurement bases are required for an attack). The protection comes from "entropic security"—since the values being encrypted should have full entropy. This also "links together" the keys encrypted with the re-used key. If any of those keys is revealed, then all of them are potentially revealed.

Additionally or as an option, any secure channel/communication link may be used between the intermediary devices/nodes. In principle, any (quantum) secure channel in a communication link can be used between the intermediary nodes/devices, including post-quantum algorithms, and pre-shared keys (or re-used keys as described above). Ideally the pre-shared keys would be one time pad (OTP) keys (i.e. keys with the same length as the data being encrypted). If desired, and as an option, non-quantum-secure links can also be used such as, without limitation, for example Transport Layer Security (TLS) and/or any other classical form of security/secure communications, however, the downside of using non-quantum-secure links is that the key exchange system becomes non-quantum-secure since there is no eavesdropping protection on these non-quantum secure links and they could be broken with quantum computers.

Additionally and/or alternatively, the intermediary nodes have been described herein as satellites (e.g. David 104*b*) and/or terrestrial hubs (e.g. Evan 104*a* and Carol 104*c*), this is byway of example only and the invention is not so limited, the skilled person in the art would understand that the key exchange systems do not have to use satellite(s) as intermediary nodes/devices and the like, but rather the intermediary nodes may be any type of suitable device for operating and communication as an intermediary device in the key exchange systems as described herein. For example, the intermediate nodes/intermediary devices of a key exchange system may be composed entirely of terrestrial hubs connected via optical fibre; alternatively and/or additionally, all of the intermediate nodes/intermediary devices could be satellites, which could mean that a meshed network of satellites could allow two endpoints to negotiate keys in real-time, without having to wait for the satellite to complete an orbit; thus the intermediary devices/nodes can be any hardware that can establish a quantum channel with their nearest neighbours and be chained together with one or more endpoints for exchanging a final shared key between two endpoints in a key exchange process and/or key exchange system as described herein.

Additionally and/or alternatively, in the key exchange systems as described herein, rather than use a quantum resistant link or communication channel 110 between Alice 102*a* and Bob 102*b*, the communication link/channel 110 may be a QKD-protected link, which could also be used by Alice 102*a* and Bob 102*b* for the key exchange of the final shared key therebetween based on completing the first key exchange, key exchange or partial key exchange protocol used initially by Evan 104*a* and Alice 102*a* to exchange the first key information and/or first set of symbols therebetween and the like. The first key exchange, key exchange or partial key exchange protocol may be any QKD type protocol that enables the endpoint device, e.g. Alice 102*a*, to withhold key information and/or basis information or any other information that would prevent an intermediary device, e.g. Evan 104*a*, from deriving the bits/symbols that Alice 102*a* has received or transmitted during the partial key exchange, but where in the final part of the QKD protocol enables a key exchange to be performed in which Alice 102*a* reveals the withheld key information and/or basis information enabling the other endpoint device, e.g. Bob 102*b*, to participate in the key exchange for agreeing and/or determining the final shared key between Alice 102*a* and Bob 102*b*.

Figure 5A:
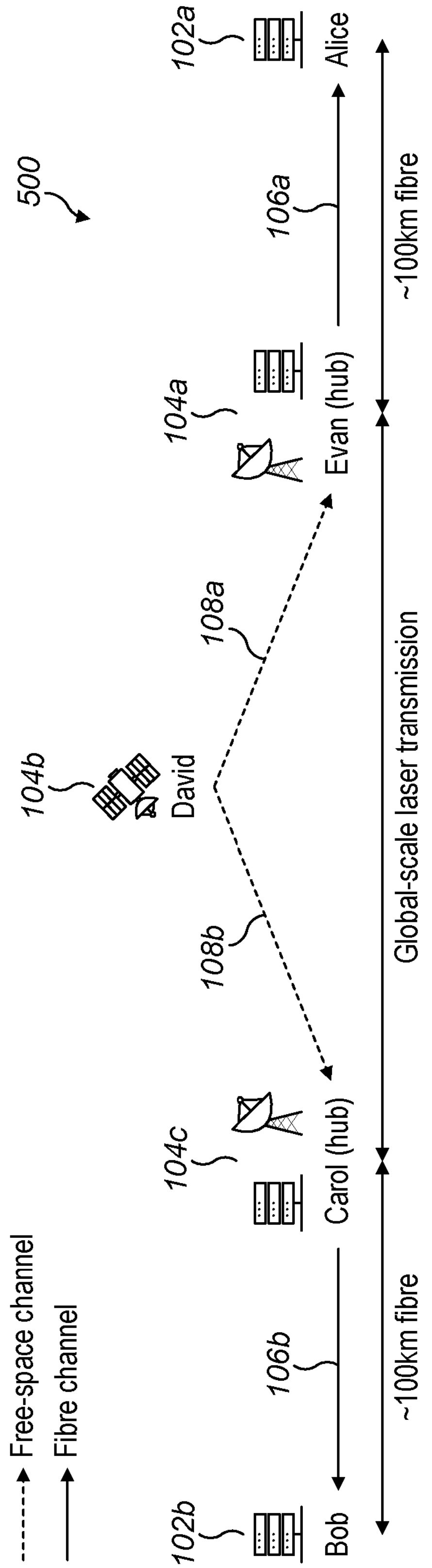
FIG. 5*a* is a schematic diagram illustrating an example satellite key exchange system according to the invention based on the key exchange system and process(es) of FIGS. 1*a* to 4*c;*

FIG. 5*a* is a schematic diagram illustrating an example satellite key exchange system 500 according to the invention for use the key exchange systems 100, 120, 130, 200, 210, 220, 230, 300, 310, 320, 400, 420, 430 and process(es) 140, 150, 160, 170, 402, 422, 432 of FIGS. 1*a* to 1*g*, 2*a* to 2*d*, and 3*a* to 4*c*; modifications thereto, combinations thereof, as herein described and/or as the application demands. For simplicity, the reference numerals of FIGS. 1*a* to 1*c* and 3*a*-3*c* and 4*a*-4*b* will be referred to for the same and/or similar components and/or features and the like. In this example, the satellite key exchange system 500 includes at least one hub intermediary device 104*a* and 104*c* (e.g. Evan, Carol) and a satellite intermediary device 104*b* connected therebetween (e.g. David) and first and second endpoint devices 102*a* and 102*b* (e.g. Alice and Bob) as described with reference to FIGS. 2*a* to 4*c* and/or as herein described. The intermediary devices 104*a*, 104*b* and 104*c* are connected together via satellite communication links 108*a* and 108*b* and are arranged to form a chain of intermediary devices. At a first end of the chain of intermediary devices 104*a*, 104*b* and 104*c*, a first hub intermediary device 104*a* is communicatively coupled with the first device 102*a* (e.g. Alice) via a fibre optical communication link 106*a*. At the other end of the chain of intermediary devices 104*a*, 104*b* and 104*c*, a third or last hub intermediary device 104*c* is communicatively coupled with the second device 102*b* (e.g. Bob) via a fibre optical communication link 106*b*. The intermediary devices may be part of, without limitation, for example an optical fibre and satellite network(s). Each of the communication links 108*a*, 108*b* are satellite communication links and each satellite communication link may include an optical free space quantum channel and an satellite communication classical channel for implementing the key exchange process(es)/system(s) as herein described. Each of the communication links 106*a*, 106*b* are optical fibre communication links and each communication link may include an optical fibre quantum channel and an optical fibre classical channel for implementing the key exchange process(es)/system(s) as herein described. Thus, the satellite key exchange system 500 may be configured to and/or operate to implement the key exchange process/protocol according to the invention as described with reference to FIGS. 1*a* to 4*c* and/or combinations thereof, modifications thereto, and/or as herein described.

Figure 5B:
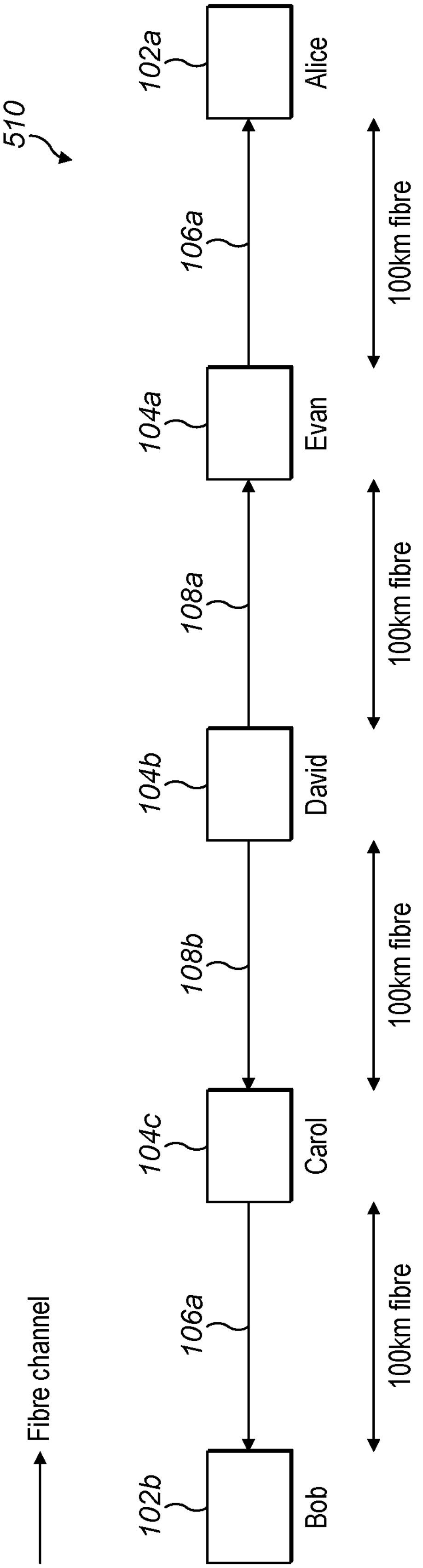
FIG. 5*b* is a schematic diagram illustrating an example terrestrial key exchange system according to the invention based on the key exchange system and process(es) of FIGS. 1*a* to 4*c;*

FIG. 5*b* is a schematic diagram illustrating an example terrestrial key exchange system 510 according to the invention for use the key exchange systems 100, 120, 130, 200, 210, 220, 230, 300, 310, 320, 400, 420, 430 and process(es) 140, 150, 160, 170, 402, 422, 432 of FIGS. 1*a* to 1*g*, 2*a* to 2*d*, and 3*a* to 4*c*; modifications thereto, combinations thereof, as herein described and/or as the application demands. For simplicity, the reference numerals of FIGS. 1*a* to 1*c* and 3*a*-3*c* and 4*a*-4*b* will be referred to for the same and/or similar components and/or features and the like. In this example, the terrestrial QKD system 510 includes at least one or a multiple of optical intermediary devices 104*a*, 104*b* and 104*c* (e.g. Evan, David, Carol) and first and second optical devices 102*a* and 102*b* (e.g. Alice and Bob). The optical intermediary devices 104*a*, 104*b* and 104*c* are connected together via optical fibre communication links 108*a* and 108*b* and are arranged to form a chain of optical intermediary devices. At a first end of the chain of optical intermediary devices 104*a*, 104*b* and 104*c*, a first optical intermediary device 104*a* is communicatively coupled with the first optical device 102*a* (e.g. Alice). At the other end of the chain of optical intermediary devices 104*a*, 104*b* and 104*c*, a third or last optical intermediary device 104*c* is communicatively coupled with the second optical device 102*a* (e.g. Alice). The intermediary optical devices may be part of, without limitation, for example an optical fibre and/or optical fibre network(s). Each of the communication links 106*a*, 108*a*, 108*b*, 106*b* are optical fibre communication links and each communication link may include an optical fibre quantum channel and an optical fibre classical channel for implementing the key exchange process(es)/system(s) as herein described. Thus, the terrestrial QKD system 510 may be configured to and/or operate to implement the key exchange process/protocol according to the invention as described with reference to FIGS. 1*a* to 4*c* and/or combinations thereof, modifications thereto, and/or as herein described.

Figure 5C:
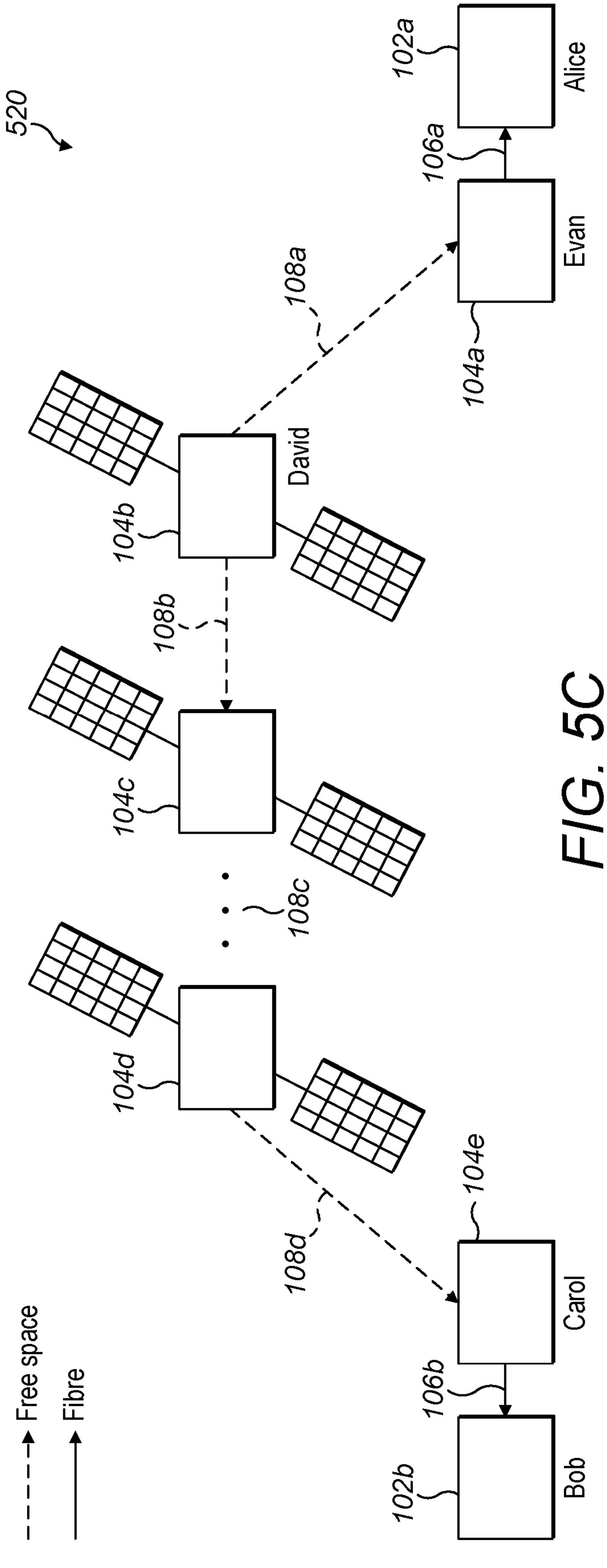
FIG. 5*c* is a schematic diagram illustrating an example satellite/terrestrial key exchange system according to the invention based on the key exchange system and process(es) of FIGS. 1*a* to 4*c;*

FIG. 5*c* is a schematic diagram illustrating an example satellite key exchange system 520 according to the invention for use the key exchange systems 100, 120, 130, 200, 210, 220, 230, 300, 310, 320, 400, 420, 430 and process(es) 140, 150, 160, 170, 402, 422, 432 of FIGS. 1*a* to 1*g*, 2*a* to 2*d*, and 3*a* to 4*c*; modifications thereto, combinations thereof, as herein described and/or as the application demands. For simplicity, the reference numerals of FIGS. 1*a* to 1*c* and 3*a*-3*c* and 4*a*-4*b* will be referred to for the same and/or similar components and/or features and the like. In this example, the satellite key exchange system 520 includes at least one hub intermediary device 104*a* and 104*e* (e.g. Evan and Carol) and two or more satellite intermediary devices 104*b*-104*d* connected therebetween (e.g. David, and others) and first and second endpoint devices 102*a* and 102*b* (e.g. Alice and Bob) as described with reference to FIGS. 2*a* to 4*c* and/or as herein described. The intermediary devices 104*a*-104*e* are connected together via satellite communication links 108*a*-108*d* and are arranged to form a chain of intermediary devices. At a first end of the chain of intermediary devices 104*a*-104*e*, a first hub intermediary device 104*a* (e.g. Evan) is communicatively coupled with the first device 102*a* (e.g. Alice) via a fibre optical communication link 106*a*. At the other end of the chain of intermediary devices 104*a*-104*e*, a third or last hub intermediary device 104*e* (e.g. Carol) is communicatively coupled with the second device 102*b* (e.g. Bob) via a fibre optical communication link 106*b*. The intermediary devices 104*a*-104*e* may be part of, without limitation, for example an optical fibre and satellite network(s). Each of the communication links 108*a*, 108*d* are satellite communication links and each satellite communication link may include an optical free space quantum channel and an satellite communication classical channel for implementing the key exchange process(es)/system(s) as herein described. Each of the communication links 108*b*, 108*c* are further satellite communication links and each satellite communication link may include an optical free space quantum channel and an satellite/radio communication classical channel for implementing the key exchange process(es)/system(s) as herein described. Each of the communication links 106*a*, 106*b* are optical fibre communication links and each communication link may include an optical fibre quantum channel and an optical fibre classical channel for implementing the key exchange process(es)/system(s) as herein described. Thus, the satellite key exchange system 520 may be configured to and/or operate to implement the key exchange process/protocol according to the invention as described with reference to FIGS. 1*a* to 4*c* and/or combinations thereof, modifications thereto, and/or as herein described.

Figure 5D:
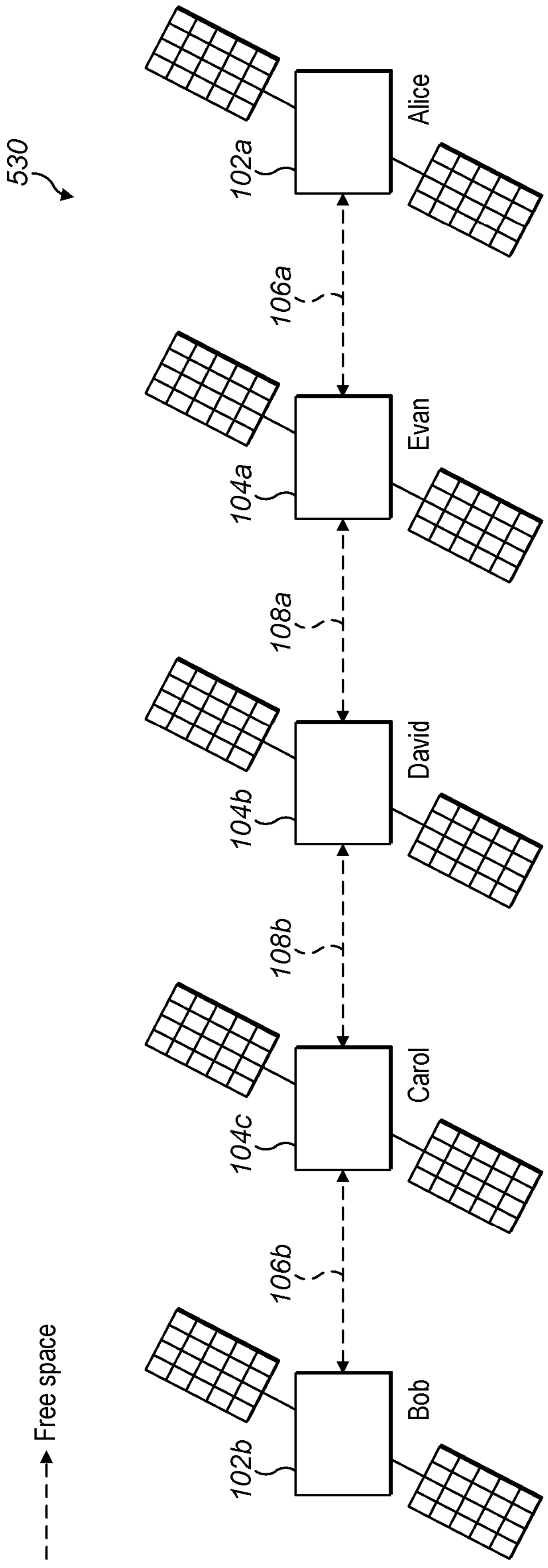
FIG. 5*d* is a schematic diagram illustrating an example satellite-satellite key exchange system according to the invention based on the key exchange system and process(es) of FIGS. 1*a* to 4*c;*

FIG. 5*d* is a schematic diagram illustrating an example satellite-satellite key exchange system 530 according to the invention for use the key exchange systems 100, 120, 130, 200, 210, 220, 230, 300, 310, 320, 400, 420, 430 and process(es) 140, 150, 160, 170, 402, 422, 432 of FIGS. 1*a* to 1*g*, 2*a* to 2*d*, and 3*a* to 4*c*; modifications thereto, combinations thereof, as herein described and/or as the application demands. For simplicity, the reference numerals of FIGS. 1*a* to 1*c* and 3*a*-3*c* and 4*a*-4*b* will be referred to for the same and/or similar components and/or features and the like. In this example, the satellite-satellite key exchange system 530 includes a plurality of satellite devices 102*a*, 104*a*-104*c* and 102*b* coupled together via communication links 106*a*, 108*a*, 108*b* and 106*b* to form a chain of satellites 102*a*, 104*a*-104*c* and 102*b*. The intermediary satellite devices 104*a*-104*c* are connected together via satellite communication links 108*a*-108*b* and are arranged to form a chain of satellite intermediary devices. At a first end of the chain of satellite intermediary devices 104*a*-104*c*, a satellite intermediary device 104*a* (e.g. Evan) is communicatively coupled with the first satellite device 102*a* (e.g. Alice) via a satellite communication link 106*a*. At the other end of the chain of satellite intermediary devices 104*a*-104*c*, a third or last satellite intermediary device 104*c* (e.g. Carol) is communicatively coupled with the second satellite device 102*b* (e.g. Bob) via another satellite communication link 106*b*. The satellite intermediary devices 104*a*-104*c* and/or satellite devices 102*a*-102*b* may be part of, without limitation, for example a satellite network(s) or satellite mesh network and the like. Each of the communication links 108*a*, 108*b* are satellite communication links and each satellite communication link may include an optical free space quantum channel and an satellite communication classical channel for implementing the key exchange process(es)/system(s) as herein described. Each of the communication links 106*a*, 106*b* are further satellite communication links and each satellite communication link may include an optical free space quantum channel and an satellite/radio communication classical channel for implementing the key exchange process(es)/system(s) as herein described. Thus, the satellite-satellite key exchange system 530 may be configured to and/or operate to implement the key exchange process/protocol according to the invention as described with reference to FIGS. 1*a* to 4*c* and/or combinations thereof, modifications thereto, and/or as herein described.

Further modifications and/or adjustments to the key exchange systems 100, 120, 130, 200, 210, 220, 230, 300, 310, 320, 400, 420, 430 and process(es) 140, 150, 160, 170, 402, 422, 432 of FIGS. 1*a* to 1*g*, 2*a* to 2*d*, and 3*a* to 4*c*; modifications thereto, combinations thereof, as herein described and/or as the application demands are described based on the following generalised chaining processes. In the context of generalised chaining processes the following generalised definitions may be defined: Nodes may comprise or represent locations in physical space, at which physical and mathematical operations pertaining to the data transmission and processing are carried out; Links may comprise or represent physical connections between the nodes. These are typically electrical, optical, or free-space; Information may comprise or represent data that is sent between the nodes and can be categorized as classical or quantum. Classical information can be quantified in bits, quantum information in qubits and ebits. It is possible to extract classical information from quantum information, or to convert the former to the latter, but not vice-versa; Physical systems may comprise or represent systems used to embody the information that is transmitted between the nodes and can be categorized as classical or quantum. A classical physical system can be used to embody classical information only, whilst a quantum system can be used to embody either quantum or classical information; Channels may comprise or represent embodiments or implementations of the links and can be categorized as classical or quantum. A classical channel can be used to transmit classical physical systems only, and hence can transport classical information only. A quantum channel can be used to send both quantum and classical physical systems and hence can transport both quantum and classical information; Physical operations at the nodes may comprise or represent, without limitation, for example measurements, carried out at the nodes. In a fully classical implementation, a measurement would equate to a simple observation of an information carrier encoding a bit, to facilitate the initial sharing of bits between nodes. Where quantum states are involved, a measurement could be carried out on a single qubit, or on a pair of qubits, In the latter case, entanglement can be created and swapped at the nodes; Mathematical operations at the nodes may comprise or represent, byway of example only but not limited to, typically XORs, which are purely mathematical operations carried out at the nodes, on two bitstrings of equal length; Correlations between information sets held at the nodes, where in some cases existing correlations between datasets are calculated at a node—this occurs when an XOR operation is carried out, in which case the correlation is classical in nature. In other cases, new correlations are created, distributed, and swapped at a node—this occurs when entanglement is created/swapped at a node, in which case the correlations are quantum in nature.

The chaining key exchange process may be thought of as spreading correlations. Initially physical systems are distributed between adjacent nodes in a chain, and measurements are then carried out on the physical systems at each node. This will result in states of physical systems at adjacent nodes that are correlated with each other, and datasets at adjacent nodes that are correlated with each other. Every node except for the first and last nodes in the chain will then hold two sets of physical systems/data, one of which is correlated with physical systems/data held by the node to its immediate left and one of which is correlated with physical systems/data held by the node to its immediate right. By carrying out physical measurements and/or mathematical operations at the nodes, it is possible to implement a process of spreading the correlations such that at the end of the process physical systems and/or data held at the first and last links of the chain will be correlated with each other.

An example of a purely classical chaining process may include the following: Classical physical systems are distributed between adjacent nodes, within a linked set of nodes; The systems are measured at each node, creating data, so that there are two datasets at all nodes except the first and last nodes in the chain, which will have one dataset each. Mathematical operations (typically XORs) are carried out on the two datasets held at each of the intermediate nodes. The results of these operations are communicated to the first and/or last node in the chain. Depending on the results received, the first and/or last nodes modify their datasets by carrying out mathematical operations (typically XORs). The datasets held by the first and last nodes will now be correlated with each other.

An example of a purely quantum chain may include the following: Entangled quantum states are distributed between adjacent nodes, within a linked set of nodes. Each of the nodes, except for the first and last nodes in the chain, will now have two sets of quantum systems, one of which will be entangled with a quantum system held by the node to the immediate left, and one of which will be entangled with a quantum system held by the node to the immediate right. Physical operations (measurements) are carried out on the two sets of quantum systems held at each of the intermediate nodes. The results of these operations are communicated to the first and/or last node in the chain. Depending on the results received, the first and last nodes discard some of their quantum systems. The quantum systems held by the first and last nodes will now be entangled with each other. The first and last nodes can use this entanglement to generate classically correlated datasets.

An example of a Quantum/classical hybrid chain may include the following: Quantum systems are transmitted between adjacent nodes, within a linked set of nodes. Physical operations (measurements) are carried out on the quantum systems before and after transmission. These operations will create classical data, so that there are now two datasets at all nodes except the first and last nodes in the chain, which will have one dataset each. Mathematical operations (typically XORs) are carried out on the two datasets held at each of the intermediate nodes. Sifting operations are also carried out between the nodes, by way of classical communication between the nodes. Depending on the protocol used, these sifting operations may be carried out before and/or after the mathematical operations. The results of the mathematical operations are transmitted along the nodes and/or to the first and/or last node in the chain (depending on the protocol). Depending on the results received, the first and/or last nodes modify their datasets by carrying out mathematical operations (typically XORs). The datasets held by the first and last nodes will now be correlated with each other.

An example of a Mixed Chains is now provided where it is possible to combine any two, or all three, of the above types of chain and/or key exchange process(es) and/or key exchange systems to make a single chain. For example, in the context of this generalised chaining paradigm all three types may combined in the following example chain: Consider a chain with 7 linked nodes, labelled A-G. Nodes A-B, B-C, E-F and F-G are linked by quantum and classical channels. Nodes C-D and D-E are linked by classical channels only. A fully quantum protocol is carried out between nodes A, B, and C. Nodes A and C will now share correlated datasets. A fully classical protocol is carried out between nodes C, D, and E. Nodes C and E will now share correlated datasets. A quantum/classical hybrid protocol is carried out between nodes E, F, and G. Nodes E and G will now share correlated datasets. Mathematical operations (typically XORs) are carried out on the two datasets held at C, and on the two datasets held at E, and the results of these operations are communicated to nodes A and/or G. Depending on the results received, the nodes A and G modify their datasets by carrying out mathematical operations (typically XORs). The datasets held by nodes A and G will now be correlated with each other.

Although the generalised chaining process has been described using the above-mentioned terminology, this is byway of example only and the invention is not so limited, it is to be appreciated by the skilled person that these generalised chaining concepts/process(es) and the like may be implemented in one or more aspects of the key exchange systems, apparatus, methods, key exchange process(es)/protocol(s) and/or subprocess(es), intermediary device(s), first and second device(s), use cases, and/or key exchange systems 100, 120, 130, 200, 210, 220, 230, 300, 310, 320, 400, 420, 430, 500 510, 520, 530 and process(es) 140, 150, 160, 170, 402, 422, 432 as described with reference to FIGS. 1*a* to 1*g*, 2*a* to 2*d*, and 3*a* to 5*d*; modifications thereto, combinations thereof, as herein described and/or as the application demands.

Figure 6A:
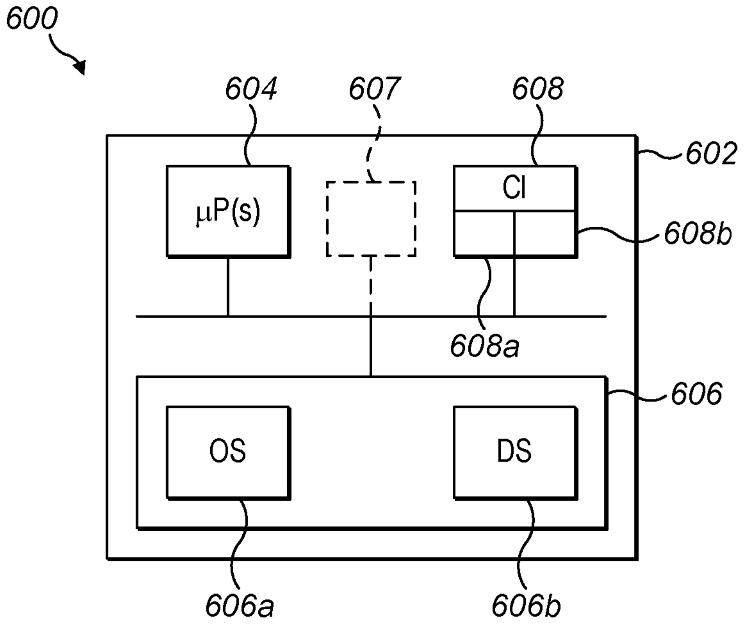
FIG. 6*a* is a schematic diagram illustrating an example computing system, device or apparatus for use in implementing one or more portions of an example key exchange system/protocol according to the invention.

FIG. 6*a* is a schematic diagram of an example computing system 600 for use in implementing and/or performing a key exchange process/protocol according to aspects of the invention. Computing system 600 may be used to implement one or more aspects of the key exchange systems, apparatus, methods, key exchange process(es)/protocol(s) and/or subprocess(es), intermediary device(s), first and second device(s), use cases, and/or key exchange systems 100, 120, 130, 200, 210, 220, 230, 300, 310, 320, 400, 420, 430, 500 510, 520, 530 and process(es) 140, 150, 160, 170, 402, 422, 432 as described with reference to FIGS. 1*a* to 1*g*, 2*a* to 2*d*, and 3*a* to 5*d*; modifications thereto, combinations thereof, as herein described and/or as the application demands. Computing system 600 includes a computing device or apparatus 602 (e.g. intermediary device, first and/or second device(s)). The computing device or apparatus includes one or more processor unit(s) 604, memory unit 606 and a communication interface 608 including, without limitation, for example, a first communication interface 608*a* and/or a second quantum communication interface 608*b*, a random symbol/number generator 607 in which the one or more processor unit(s) 604 are connected to the memory unit 606, the communication interface 608 (e.g. the first communication interface 608*a* and the second quantum communication interface 608*b*), and the random symbol/number generator 607. The communications interface 608 may connect the computing device or apparatus 602 with one or more other computing devices and/or apparatus (e.g. intermediary device, first and/or second device(s)) (not shown) to establish, form and/or communicate over one or more communication link(s) including a first and/or second communication channels via the first communication interface 608*a* and/or establish, form and/or communicate over said one or more communication link(s) including a first and/or second quantum channels via quantum communication interface 608*b*. The first communication interface 608*a* may connect to one or more communication networks, without limitation, for example one or more satellite networks, one or more telecommunication networks, one or more fibre optic networks and the like for implementing one or more aspects, features of the key exchange systems 100, 120, 130, 200, 210, 220, 230, 300, 310, 320, 400, 420, 430, 500, 510, 520, 530 and process(es) 140, 150, 160, 170, 402, 422, 432 as described with reference to FIGS. 1*a* to 1*g*, 2*a* to 2*d*, and 3*a* to 5*d*; modifications thereto, combinations thereof, as herein described and/or as the application demands. The quantum communication interface 608*b* may connect over one or more quantum communication channel(s) of a communication link, without limitation, for example with one or more other devices, quantum communication network and/or the like for implementing one or more aspects, features of the key exchange system and/or key exchange process(es)/ protocol(s) and/or subprocess(es) as described with reference to FIGS. 1*a* to 5*d* according to the invention as described herein, combinations thereof, modifications thereto as the application demands. The memory unit 606 may store one or more program instructions, code or components such as, byway of example only but not limited to, an operating system 606*a* for operating computing device 602, and a data store 606*b* for storing computer program instructions, executable code, random symbols, first and second sets of symbols, QKD keys, random streams of symbols and the like, code and/or components associated with implementing the functionality and/or one or more function(s) or functionality associated with one or more key exchange systems, one or more key exchange protocol(s); one or more key exchange process(es) and/or subprocess(es), one or more intermediary devices, one or more first and/or second devices, one or more method(s) and/or process(es) of performing a key exchange process/protocol according to the invention, system(s)/platforms, combinations thereof, modifications there to, and/or as described herein with reference to at least any one of figure(s) 1*a* to 5*d*.

Figure 6B:
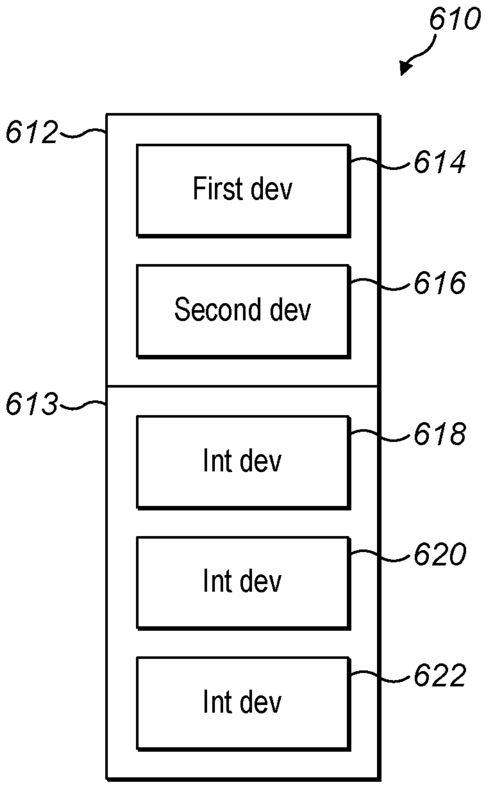
FIG. 6*b* is a schematic diagram illustrating an example key exchange system for use in implementing an example key exchange protocol according to the invention Common reference numerals are used throughout the figures to indicate similar features.

FIG. 6*b* is a schematic diagram of another example key exchange system 610 for facilitating and/or implementing the key exchange process/protocol and/or process(es) thereto according to the invention. The system 610 may include a plurality of computing devices or apparatus 612 that includes a group of one or more intermediary devices 613, at least one first device 614, at least one second device 616, and/or one or more of a plurality of devices including the functionality of a first and a second device that are configured to operate and/or implement the corresponding steps and/or functions of the key exchange process/protocol according to the invention for exchanging a shared key between at least one first device and at least one second device of the devices 614 to 616. In this example, the group of intermediary device(s) 613 includes a first intermediary device 618 for connecting to the first device 614, a second intermediary device 620 for connecting to a second device 616, and another intermediary device 622 connecting the first intermediary device 618 with the second intermediary device 620. As an option, or an alternative example, the group of intermediary device(s) 613 may only include one intermediary device 618, which connects to both the first and second devices 614 and 616, respectively. The system 610, apparatus 612, group of intermediary devices 613, first device 614, second device 616 may be configured to implement the key exchange protocol/process(es) and/or subprocesses, aspects thereof and/or further include functionality associated with the key exchange systems, intermediary device(s), first device(s) and/or second device(s), key exchange protocols/process(es), subprocess(es), systems, apparatus, one or more method(s) and/or process(es), combinations thereof, modifications thereto and/or as herein described with reference to any one of FIGS. 1*a* to 5*d*.

In the embodiment described above the server may comprise a single server or network of servers. In some examples the functionality of the server may be provided by a network of servers distributed across a geographical area, such as a worldwide distributed network of servers, and a user may be connected to an appropriate one of the network of servers based upon a user location.

The above description discusses embodiments of the invention with reference to a single user for clarity. It will be understood that in practice the system may be shared by a plurality of users, and possibly by a very large number of users simultaneously.

The embodiments described above are fully automatic. In some examples a user or operator of the system may manually instruct some steps of the method to be carried out.

In the described embodiments of the invention the system may be implemented as any form of a computing and/or electronic device. Such a device may comprise one or more processors which may be microprocessors, controllers or any other suitable type of processors for processing computer executable instructions to control the operation of the device in order to gather and record routing information. In some examples, for example where a system on a chip architecture is used, the processors may include one or more fixed function blocks (also referred to as accelerators) which implement a part of the method in hardware (rather than software or firmware). Platform software comprising an operating system or any other suitable platform software may be provided at the computing-based device to enable application software to be executed on the device.

Various functions described herein can be implemented in hardware, software, or any combination thereof. If implemented in software, the functions can be stored on or transmitted over as one or more instructions or code on a computer-readable medium. Computer-readable media may include, for example, computer-readable storage media. Computer-readable storage media may include volatile or non-volatile, removable or non-removable media implemented in any method or technology for storage of information such as computer readable instructions, data structures, program modules or other data. A computer-readable storage media can be any available storage media that may be accessed by a computer. By way of example, and not limitation, such computer-readable storage media may comprise RAM, ROM, EEPROM, flash memory or other memory devices, CD-ROM or other optical disc storage, magnetic disc storage or other magnetic storage devices, or any other medium that can be used to carry or store desired program code in the form of instructions or data structures and that can be accessed by a computer. Disc and disk, as used herein, include compact disc (CD), laser disc, optical disc, digital versatile disc (DVD), floppy disk, and blu-ray disc (BD). Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber/fibre optic cable, twisted pair, DSL, or wireless technologies such as infrared, radio, and microwave are included in the definition of communication medium. Combinations of the above should also be included within the scope of computer-readable media.

Alternatively, or in addition, the functionality described herein can be performed, at least in part, by one or more hardware logic components. For example, and without limitation, hardware logic components that can be used may include Field-programmable Gate Arrays (FPGAs), Application-Program-specific Integrated Circuits (ASICs), Application-Program-specific Standard Products (ASSPs), System-on-a-chip systems (SOCs), Complex Programmable Logic Devices (CPLDs), etc.

Although illustrated as a single system, it is to be understood that the computing device may be a distributed system. Thus, for instance, several devices may be in communication byway of a network connection and may collectively perform tasks described as being performed by the computing device.

Although illustrated as a local device it will be appreciated that the computing device may be located remotely and accessed via a network or other communication link (for example using a communication interface).

The term 'computer' is used herein to refer to any device with processing capability such that it can execute instructions. Those skilled in the art will realise that such processing capabilities are incorporated into many different devices and therefore the term 'computer' includes PCs, servers, mobile telephones, personal digital assistants and many other devices.

Those skilled in the art will realise that storage devices utilised to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realise that by utilising conventional techniques known to those skilled in the art that all, or a portion of the software instructions may be carried out by a dedicated circuit, such as a DSP, programmable logic array, or the like.

It will be understood that the benefits and advantages described above may relate to one embodiment or may relate to several embodiments. The embodiments are not limited to those that solve any or all of the stated problems or those that have any or all of the stated benefits and advantages. Variants should be considered to be included into the scope of the invention.

Any reference to 'an' item refers to one or more of those items. The term 'comprising' is used herein to mean including the method steps or elements identified, but that such steps or elements do not comprise an exclusive list and a method or apparatus may contain additional steps or elements.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something".

Further, to the extent that the term "includes" is used in either the detailed description or the claims, such term is intended to be inclusive in a manner similar to the term "comprising" as "comprising" is interpreted when employed as a transitional word in a claim.

The figures illustrate exemplary methods. While the methods are shown and described as being a series of acts that are performed in a particular sequence, it is to be understood and appreciated that the methods are not limited by the order of the sequence. For example, some acts can occur in a different order than what is described herein. In addition, an act can occur concurrently with another act. Further, in some instances, not all acts may be required to implement a method described herein.

Moreover, the acts described herein may comprise computer-executable instructions that can be implemented by one or more processors and/or stored on a computer-readable medium or media. The computer-executable instructions can include routines, sub-routines, programs, threads of execution, and/or the like. Still further, results of acts of the methods can be stored in a computer-readable medium, displayed on a display device, and/or the like.

The order of the steps of the methods described herein is exemplary, but the steps may be carried out in any suitable order, or simultaneously where appropriate. Additionally, steps may be added or substituted in, or individual steps may be deleted from any of the methods without departing from the scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. What has been described above includes examples of one or more embodiments. It is, of course, not possible to describe every conceivable modification and alteration of the above devices or methods for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims.

The invention claimed is:

1. A computer-implemented method of key exchange between a first endpoint device and a second endpoint device communicatively coupled over communication links via a plurality of intermediary devices, wherein the first endpoint device is coupled by a first communication link to a first of the plurality of intermediary devices, and the second endpoint device and the plurality of intermediary devices form a group of devices, wherein each of the plurality of intermediary devices is communicatively coupled to at least one other of the plurality of intermediary devices via at least one of the communication links and the second endpoint device is coupled to a last of the plurality of intermediary devices in the group via a second communication link, the method comprising:

exchanging intermediate key information between the first intermediary device and the first endpoint device based on a first key exchange protocol; and securely sending data representative of the exchanged intermediate key information from the first intermediary device to the second endpoint device via the other intermediary devices, the secure communications over the communication links of the group of devices based on shared keys exchanged using one or more key exchange protocols over the communication links of the group of devices;

wherein the first and second endpoint devices use a further communication channel therebetween for processing and transforming said intermediate key information into a final shared key;

wherein each shared key is used for securing the communication of the intermediate key information from one device to next;

wherein each intermediary device sends its shared key to the second endpoint device, and only encrypts any incoming communications associated with the intermediate key information with its shared key before forwarding towards the second endpoint device via its nearest neighbour device, wherein the second endpoint device uses the shared keys to decrypt the encrypted intermediate key information.

2. The computer-implemented method as claimed in claim 1, wherein there are N intermediary devices, N>1, and the first endpoint device, the N intermediary devices and the second endpoint device form a chain, line network or linear array topology with the first endpoint device being communicatively coupled to the second endpoint device via said N intermediary devices, wherein the first endpoint device is connected via a first communication link to the first of the N intermediary devices in the chain, and the second endpoint device is connected via a second communication link to an N-th intermediary device in the chain, each of the N intermediary devices coupled to an adjacent intermediary device via a further communication link.

3. The computer-implemented method as claimed in claim 1, wherein the one or more key exchange protocols used between one or more of the devices in the group of devices for secure communications therebetween are selected from a group of key exchange protocols based on a desired or required trust level in relation to the one or more intermediary devices of the group of devices.

4. The computer-implemented method as claimed in claim 3, wherein when the level of trust is a trust level that is considered an untrusted level, then the one or more key exchange protocols selected include QKD protocols for use in sharing keys with untrusted parties.

5. The computer-implemented method as claimed in claim 1, wherein exchanging intermediate key information between the first intermediary device and the first endpoint device based on the first key exchange protocol further comprising:

the first key exchange protocol configured for performing at least the steps of:

transmitting or receiving, by the first intermediary device, a first set of random symbols over a first quantum channel with the first endpoint device;

transmitting, from the first intermediary device to the first endpoint device, the basis set used by the first intermediary device for transmitting or receiving the first set of random symbols over the first quantum channel;

generating, by the first intermediary device, first endpoint device intermediate key information comprising data representative of a first intermediate set of symbols based on the validly transmitted or received first set of symbols using the transmitting or receiving basis set used by the first intermediary device when transmitting or receiving the first set of symbols over the first quantum channel;

wherein the first endpoint device withholds the first transmitting or receiving basis set used by the first endpoint device for transmitting or receiving the first set of random symbols over the first quantum channel with the first intermediary device.

6. The computer-implemented method as claimed in claim 5, wherein determining the final shared key, by the first and second endpoint devices, based on the exchanged first endpoint device intermediate key information securely sent via the one or more intermediary devices to the second endpoint device, further comprising:

exchanging, between the first and second endpoint devices over a secure communication channel therebetween, the basis set used by the first endpoint device for transmitting or receiving the first set of random symbols;

determining, by the second endpoint device using the basis set used by the first endpoint device for transmitting or receiving the first set of random symbols and the first endpoint device intermediate key information, a common set of symbols corresponding to at least a portion of the first set of random symbols transmitted or received by the first endpoint device;

exchanging, by the first and second devices over the secure communication channel therebetween, a shared key based on the common set of symbols and the first set of random symbols transmitted or received by the first endpoint device.

7. The computer-implemented method as claimed in claim 1, wherein the one or more key QKD exchange protocols used between one or more of the devices in the group of devices for secure communications therebetween are selected from a group of key exchange protocols based on a desired or required trust level in relation to the one or more intermediary devices of the group of devices.

8. The computer-implemented method as claimed in claim 7, wherein when the level of trust is a trust level that is considered an untrusted level, then the one or more key exchange protocols selected include QKD protocols for use in sharing keys with untrusted parties.

9. The computer-implemented method as claimed in claim 1, wherein:

each of the devices in the group of devices is connected to each of its nearest neighbour devices via a quantum channel, wherein each quantum channel is unidirectional depending on the selected one or more key exchange protocols used between said each device and its nearest neighbour devices;

the first and the second endpoint devices have a classically-secured classical channel therebetween;

each of the intermediary devices have a classical channels with each of their nearest neighbour intermediary devices, the method further comprising:

said exchanging first intermediate key information using the first key exchange protocol further comprising:

transmitting or receiving, by the first intermediary device, a first set of random symbols over a first quantum channel with the first endpoint device;

transmitting, from the first intermediary device to the first endpoint device, the basis set used by the first intermediary device for transmitting or receiving the first set of random symbols over the first quantum channel;

generating, by the first intermediary device, first intermediate key information comprising data representative of a first intermediate set of symbols based on the validly transmitted or received first set of symbols using the transmitting or receiving basis set used by the first intermediary device when transmitting or receiving the first set of symbols over the first quantum channel;

wherein the first endpoint device withholds the first transmitting or receiving basis set used by the first endpoint device for transmitting or receiving the first set of random symbols over the first quantum channel with the first intermediary device;

said securely sending data representative of the exchanged first intermediate key information from the first intermediary device to the second endpoint device further comprising:

encrypting the first intermediate key information with a shared key of a neighbouring device of the group of devices;

sending the encrypted first endpoint device intermediate key information to the second endpoint device via said neighbouring device(s) over said communication link therebetween, wherein any remaining intermediary devices securely send the first intermediate key information to said second endpoint device over said communication links therebetween;

wherein said second endpoint device receives the encrypted first intermediate key information and decrypts said encrypted first intermediate key information using a shared key exchanged with one of the intermediary devices to retrieve said first intermediate set of symbols determined by the first intermediary device;

said determining of the final shared key, by the first and second endpoint devices further comprising:

exchanging, between the first and second endpoint devices over a secure communication channel therebetween, the transmitting or receiving basis set used by the first endpoint device for transmitting or receiving the first set of random symbols;

determining, by the second endpoint device using the transmitting or receiving basis set used by the first endpoint device for transmitting or receiving the first set of random symbols and the first intermediate set of symbols, a second set of symbols corresponding to at least a portion of the first set of random symbols transmitted or received by the first endpoint device; and exchanging, by the first and second devices over the classically-secured communication channel therebetween, a shared key based processing and transforming the first set of random symbols and second set of symbols.

10. The computer-implemented method as claimed in claim 1, wherein the first key exchange protocol and the one or more key exchange protocols are classical or post-quantum key exchange protocols.

11. The computer-implemented method as claimed in claim 10, wherein:

exchanging intermediate key information between the first intermediary device and the first endpoint device based on the first key exchange protocol, wherein the intermediate key information is a first shared key between the first intermediary device and the first endpoint device;

for each of the intermediary devices and the second endpoint device exchanging a shared key with each of the nearest neighbouring devices, wherein each of the intermediary devices have a pair of shared keys and the second endpoint device has a shared key exchanged with the intermediary device it is connected to, and the first intermediary device has a second shared key with another intermediary device it is connected to;

securely sending data representative of the exchanged intermediate key information from the first intermediary device to the second endpoint device via the intermediary device(s) based on:

encrypting, by the intermediary device, the intermediate key information with the second shared key of the intermediary device, and sending to the second endpoint device;

for each other intermediary device, cryptographically combining their pairs of shared keys and sending to the second endpoint device;

wherein the second endpoint device uses its shared key and the received cryptographically combined pairs of shared keys from the intermediary devices to decrypt the encrypted intermediate key information, the first and second endpoint devices use the further communication channel to share the knowledge that the first shared key has been received and decrypted by the second endpoint device, said first shared key comprising the final shared key.

12. The computer-implemented method as claimed in claim 1, wherein one or more of the intermediary devices is a satellite apparatus, one or more terrestrial intermediary devices are satellite ground stations of hubs, and the first and second endpoint devices are connected via a terrestrial network to said satellite ground stations or hubs, wherein the first quantum communication channel between the first endpoint device and the first terrestrial intermediary device is a fibre optical quantum communication channel, the second quantum communication channel between the second endpoint device and the last terrestrial intermediary device is a fibre optical quantum communication channel, and the classical communication channel between the first and second endpoint devices is a non-quantum communications channel.

13. The computer-implemented method as claimed in claim 1, wherein one or more of the intermediary devices is a satellite and the first endpoint device and second endpoint device are satellites, wherein the first quantum communication channel between the first endpoint device and the first intermediary device is a free-space optical quantum communication channel, the second quantum communication channel between the second endpoint device and the last intermediary device is a free-space optical quantum communication channel, and the classical communication channel between the first and second endpoint devices is a non-quantum communications channel.

14. An intermediary device comprising a processor unit, a memory unit, and a communication interface, the processor unit connected to the memory unit and the communication interface, wherein the processor unit, memory unit and communication interface are adapted to implement a computer-implemented method of key exchange between a first endpoint device and a second endpoint device communicatively coupled over communication links via the intermediary device, wherein the first endpoint device is coupled by a first communication link to the intermediary device, and the second endpoint device, the intermediary device, and one or more other intermediate devices form a group of devices, wherein the intermediary device is communicatively coupled to at least one of the one or more other intermediary devices via at least one of the communication links and the second endpoint device is coupled to a last of the one or more other intermediary devices in the group via a second communication link, the intermediary device configured to:

exchange intermediate key information between the intermediary device and the first endpoint device based on a first key exchange protocol; and securely send data representative of the exchanged intermediate key information from the intermediary device to the second endpoint device via the one or more other intermediary devices, the secure communications over the communication links of the group of devices based on shared keys exchanged using one or more key exchange protocols over the communication links of the group of devices;

wherein the first and second endpoint devices use a further communication channel therebetween for processing and transforming said intermediate key information into a final shared key;

wherein each shared key is used for securing the communication of the intermediate key information from one device to next;

wherein the intermediary device and each of the one or more other intermediary devices sends its shared key to the second endpoint device, and only encrypts any incoming communications associated with the intermediate key information with its shared key before forwarding towards the second endpoint device via its nearest neighbour device, wherein the second endpoint device uses the shared keys to decrypt the encrypted intermediate key information.

* * * * *